United States Patent [19]

Iguchi et al.

[11] Patent Number: 5,736,980
[45] Date of Patent: Apr. 7, 1998

[54] COORDINATE INPUTTING APPARATUS WITH SHARED LINE COMBINATIONS OF POWER, POSITION AND SWITCH SIGNALS

[75] Inventors: Shigeki Iguchi, Ikoma-gun; Katsumi Hirano, Tenri; Tomohiko Nishimura, Yamato-Koriyama; Kunio Hiromoto, Yamato-Koriyama; Kazuyoshi Nomiya, Yamato-Koriyama, all of Japan

[73] Assignee: Sharp Kabushiki Kaisha, Osaka, Japan

[21] Appl. No.: 421,358

[22] Filed: Apr. 13, 1995

[30] Foreign Application Priority Data

| Apr. 28, 1994 | [JP] | Japan | 6-092137 |
| Apr. 28, 1994 | [JP] | Japan | 6-092312 |
| May 23, 1994 | [JP] | Japan | 6-108174 |
| Jul. 8, 1994 | [JP] | Japan | 6-157015 |

[51] Int. Cl.$^6$ ............................................. G06F 3/033
[52] U.S. Cl. ................................................ 345/179; 178/20
[58] Field of Search ............................ 345/156, 157, 345/104, 173, 179; 178/18–20; 341/5; 349/1, 12

[56] References Cited

U.S. PATENT DOCUMENTS

| 4,866,602 | 9/1989 | Hall . | |
| 4,890,096 | 12/1989 | Taguchi et al. | 345/156 |
| 5,247,138 | 9/1993 | Landmeier . | |
| 5,298,918 | 3/1994 | Yen-Chen et al. . | |
| 5,369,228 | 11/1994 | Faust | 345/156 |
| 5,396,443 | 3/1995 | Mese et al. | 345/156 |
| 5,528,002 | 6/1996 | Katabami | 345/156 |
| 5,533,141 | 7/1996 | Futatsugi et al. | 382/119 |
| 5,534,892 | 7/1996 | Tagawa | 345/173 |

FOREIGN PATENT DOCUMENTS

| 0504728A3 | 9/1992 | European Pat. Off. . |
| 60-8926 | 1/1985 | Japan . |
| 64-53222 | 3/1989 | Japan . |
| 1-254975 | 10/1989 | Japan . |
| 2-161511 | 6/1990 | Japan . |
| 2-211514 | 8/1990 | Japan . |
| 5-265650 | 10/1993 | Japan . |
| 2239581 | 7/1991 | United Kingdom . |

*Primary Examiner*—Mark R. Powell
*Attorney, Agent, or Firm*—David G. Conlin; David D. Lowry

[57] ABSTRACT

A coordinate inputting apparatus has a separating circuit, a cable and a position indicating pen. The separating circuit has a low pass filter for removing an alternating current component from a signal transmitted to a signal line and a band pass filter for passing only a position information signal in a predetermined frequency band with respect to the signal transmitted to the signal line. The cable is constructed by a signal line, a switching signal line and a ground line. The signal line is used to supply power to the position indicating pen and transmit a detecting signal from the position indicating pen to each of an X-coordinate detecting circuit and a Y-coordinate detecting circuit. The position indicating pen has a low pass filter for removing an alternating current component from a signal transmitted through the signal line and a band pass filter for passing only a position information signal in a predetermined frequency band. A signal transmitting system of this coordinate inputting apparatus and other coordinate inputting apparatuses are also shown.

6 Claims, 38 Drawing Sheets

FIG. 8

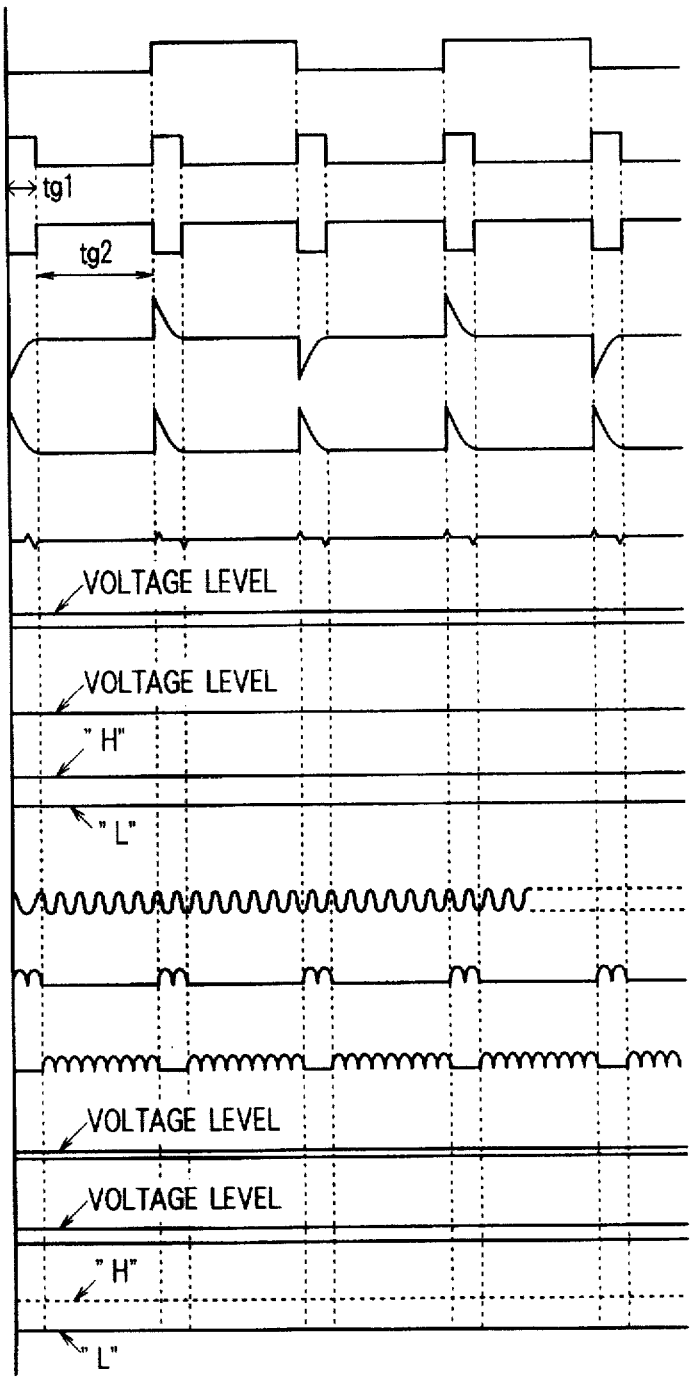

(A) INVERTING SIGNAL as (B) FIRST GATE SIGNAL g1

(C) SECOND GATE SIGNAL g2

(D) SPIKE-SHAPED INDUCED VOLTAGE sk (E) SAMPLING SIGNAL sp1 BY g1

(F) SAMPLING SIGNAL sp2 BY g2

(G) DIRECT CURRENT VOLTAGE dv1

(H) DIRECT CURRENT VOLTAGE dv2

(I) DETECTING MODE SIGNAL pm1

(J) NOISE SIGNAL ns (K) SAMPLING SIGNAL sp3 BY g1

(L) SAMPLING SIGNAL sp4 BY g2

(M) DIRECT CURRENT VOLTAGE dv3

(N) DIRECT CURRENT VOLTAGE dv4

(O) DETECTING MODE SIGNAL pm2

VCC ─────────────────

POSITION INFORMATION SIGNAL 0V

VCC

0V ·········································

VCC ─────────────────

POSITION INFORMATION SIGNAL (0V)

(1) INVERTING SIGNAL as (2) FIRST GATE SIGNAL g1

(3) SECOND GATE SIGNAL g2

(4) SPIKE-SHAPED INDUCED VOLTAGE sk (5) SAMPLING SIGNAL sp1 BY g1

(6) SAMPLING SIGNAL sp2 BY g2

(7) DIRECT CURRENT VOLTAGE dv1

(8) DIRECT CURRENT VOLTAGE dv2

(9) DETECTING MODE SIGNAL pm1

(10) NOISE SIGNAL ns

(11) SAMPLING SIGNAL sp3 BY g1

(12) SAMPLING SIGNAL sp4 BY g2

(13) DIRECT CURRENT VOLTAGE dv3

(14) DIRECT CURRENT VOLTAGE dv4

(15) DETECTING MODE SIGNAL pm2

FIG. 29a
($\theta = 90°$)
FIG. 29b
($\theta = 45°$)
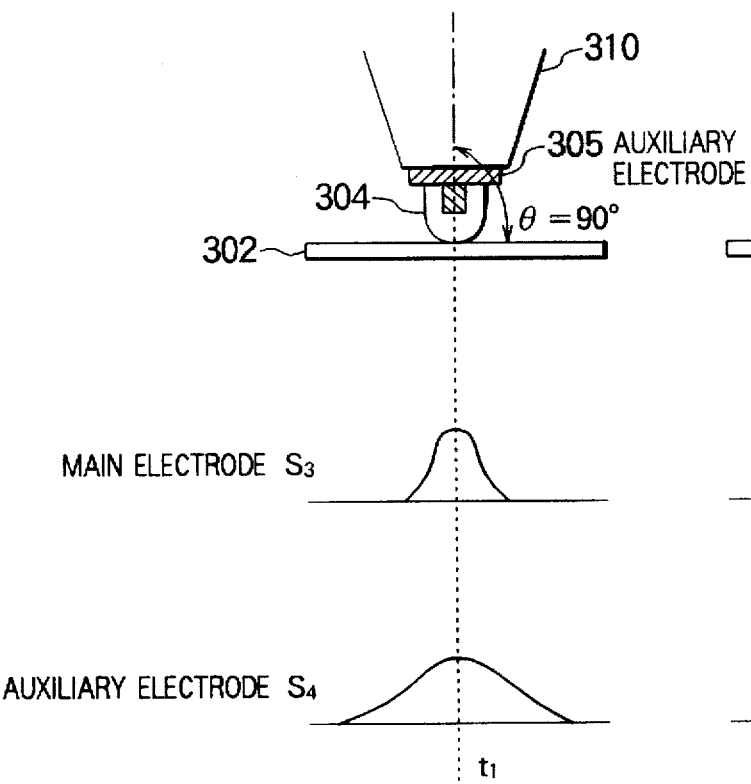
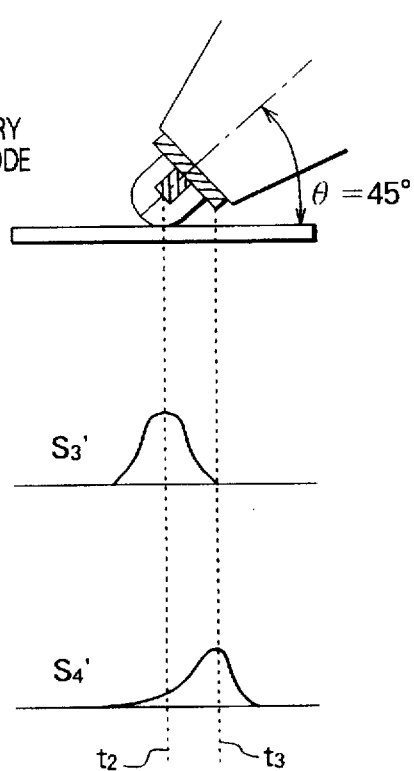

5,736,980

COORDINATE INPUTTING APPARATUS WITH SHARED LINE COMBINATIONS OF POWER, POSITION AND SWITCH SIGNALS

BACKGROUND OF THE INVENTION

1. Field of the Invention

The present invention relates to an apparatus for inputting coordinates. More particularly, the present invention relates to a coordinate inputting apparatus of a tablet, etc. used when characters, figures, etc. are inputted to a personal computer, a word processor, etc.

The present invention also relates to a pen inputting apparatus for inputting handwritten characters and figures to a tablet arranged on a display screen of a display unit as inputting means of a personal computer, a word processor, etc.

The present invention also relates to an improvement of a tablet inputting apparatus used in a personal computer, a word processor, etc. More particularly, the present invention relates to means for faithfully expressing a line width, a density, etc. of characters inputted according to a writing pressure.

The present invention further relates to a signal transmitting system of a coordinate inputting apparatus in which coordinate information detected by a coordinate detecting pen and additional information of the coordinate detecting pen except for the coordinate information are transmitted by time division on the same signal line or a radio of the same channel, etc. For example, this signal transmitting system is generally applied to a coordinate detector and an information processor applying this coordinate detector thereto.

2. Description of the Related Art

It is generally known that a coordinate inputting apparatus of a tablet, etc. is used when characters, figures, etc. are inputted to a personal computer, a word processor, etc. As shown in FIG. 1, this coordinate inputting apparatus has a liquid crystal panel 42. This liquid crystal panel 42 is arranged such that plural segment electrodes X1 to Xm and plural common electrodes Y1 to Yn are perpendicular to each other. The liquid crystal panel 42 has a liquid crystal layer filled with a liquid crystal between the segment electrodes X1 to Xm and the common electrodes Y1 to Yn. Each of pixels in display is constructed by a portion of the liquid crystal layer in which the segment electrodes respectively intersect the common electrodes. A segment driving circuit 23 for operating the segment electrodes X1 to Xm is connected to the segment electrodes X1 to Xm. A common driving circuit 22 for operating the common electrodes Y1 to Yn is connected to the common electrodes Y1 to Yn. A display control circuit 25 and a position detecting control circuit 26 are connected to the common driving circuit 22 and the segment driving circuit 23 through a switching circuit 24 for switching transmitting directions of signals. The display control circuit 25 displays an image on the liquid crystal panel 42 in a display period by controlling operations of the common driving circuit 22 and the segment driving circuit 23 through the switching circuit 24. The position detecting control circuit 26 sequentially applies a scanning voltage to each of the common and segment electrodes in a coordinate detecting period by controlling the operations of the common driving circuit 22 and the segment driving circuit 23 through the switching circuit 24. A switching operation of the switching circuit 24 is controlled by a control circuit 27. The switching circuit 24 is constructed such that this switching circuit 24 outputs an output of the display control circuit 25 to each of the driving circuits 22 and 23 in the display period. The switching circuit 24 is also constructed such that this switching circuit 24 outputs an output of the position detecting control circuit 26 to each of the driving circuits 22 and 23 in the position detecting period. The control circuit 27 is connected to an X-coordinate detecting circuit 30 and a Y-coordinate detecting circuit 31 for detecting coordinates indicated by a position indicating pen 6. The X-coordinate detecting circuit 30 and the Y-coordinate detecting circuit 31 are connected to the position indicating pen 6 indicating X and Y coordinates through a cable 33. Power is supplied from a direct current power circuit 32 to each of the common driving circuit 22 and the segment driving circuit 23.

As shown in FIG. 2, the above position indicating pen 6 is constructed by a switch 57, a pen tip electrode 58 and an amplifier 29. The switch 57 is turned on and off by making the position indicating pen 6 come in contact with the liquid crystal panel 42. The amplifier 29 amplifies a voltage induced in the pen tip electrode 58. The above cable 33 is constructed by a power line VCC, a position information signal line POUT, a switching signal line SW and a ground line GND.

An operation of the above general coordinate inputting apparatus will next be explained.

The liquid crystal panel 42 has the display period for displaying an image and the coordinate detecting period for detecting coordinate positions indicated by the position indicating pen 6. In the display period, the display control circuit 25 outputs each of a starting signal S, an inverting signal M, clock signals CP1, CP2 and display data D0 to D3. The clock signal CP1 is a clock signal having a scanning period for scanning pixels in one row as a cycle. This clock signal CP1 is inputted to each of the common driving circuit 22 and the segment driving circuit 23 through the switching circuit 24. The starting signal S is a signal showing a start of the scanning period for display of the common electrodes. This starting signal S is inputted to the common driving circuit 22 through the switching circuit 24 in synchronization with the clock signal CP1. In accordance with a shift in the clock signal CP1, a driving signal is outputted from an output terminal of the common driving circuit 22 corresponding to a position of this shift to each of the common electrodes Y1 to Yn. This driving signal is made on the basis of bias voltages V0 to V5 supplied from the power circuit 32. The clock signal CP2 is constructed such that a scanning period for scanning pixels in one column is divided into a plurality of divisional periods and each of these divisional periods is set to a cycle. This clock signal CP2 is inputted to the segment driving circuit 23 through the switching circuit 24.

The display data D0 to D3 are inputted to the segment driving circuit 23 through the switching circuit 24 and are sequentially inputted to a register arranged within the segment driving circuit 23. When display data corresponding to pixels in one row are inputted to the register, these display data are latched in timing of the clock signal CP1 and a driving signal corresponding to each of the display data is outputted from an output terminal of the segment driving circuit 23 to each of the segment electrodes X1 to Xm. This driving signal is also made on the basis of the bias voltages V0 to V5 supplied from the power circuit 32. The inverting signal M is a signal for periodically inverting polarities of a voltage applied to the liquid crystal so as to prevent the liquid crystal from being deteriorated by electrolysis. The pixels of the liquid crystal panel 42 are operated in accordance with a row order thereof by the operations of the common driving circuit 22 and the segment driving circuit 23 so that an image corresponding to the display data is displayed on the liquid crystal panel 42.

In the coordinate detecting period, the position detecting control circuit 26 outputs each of a starting signal Sd, an inverting signal Md, clock signals CP1d, CP2d and driving data D0d to D3d. The clock signal CP1d is a clock signal having a scanning period for scanning common electrodes in one row as a cycle. This clock signal CP1d is inputted to each of the common driving circuit 22 and the segment driving circuit 23 through the switching circuit 24. The starting signal Sd is a signal for indicating a start of scanning of the common electrodes. This starting signal Sd is inputted to the common driving circuit 22 through the switching circuit 24 in synchronization with the clock signal CP1d. In accordance with a shift in the clock signal CP1d, a scanning signal is outputted from an output terminal of the common driving circuit 22 corresponding to a position of this shift to each of the common electrodes. This scanning signal is made on the basis of the bias voltages V0 to V5 supplied from the power circuit 32.

The clock signal CP2d is constructed such that a scanning period for scanning segment electrodes in one column is set to a cycle. This clock signal CP2d is inputted to the segment driving circuit 23 through the switching circuit 24. When the driving data D0d to D3d are sequentially inputted to a register arranged within the segment driving circuit 23, these driving data are latched in timing of the clock signal CP1d and a driving signal with respect to each of the driving data is inputted from an output terminal of the segment driving circuit 23 to each of the segment electrodes. This driving signal is made on the basis of the bias voltages V0 to V5 supplied from the power circuit 32. Voltages applied to each of the common electrodes and each of the segment electrodes in this coordinate detecting period are changed as shown in FIG. 3. The inverting signal Md is a signal for periodically inverting polarities of a voltage applied to the liquid crystal so as to prevent the liquid crystal from being deteriorated by electrolysis.

When the position indicating pen 6 approaches a surface of the liquid crystal panel 42, a voltage is induced in the electrode 58 arranged in an end tip portion of the indicating pen 6 by a floating capacity between the electrode 58 of the indicating pen 6 and each of the segment and common electrodes to which the voltage is applied. The voltage induced in the indicating pen 6 is amplified by the amplifier 29 within the indicating pen 6 and is provided to the X-coordinate detecting circuit 30 and the Y-coordinate detecting circuit 31 through the cable 33. X and Y coordinates are respectively calculated by the X-coordinate detecting circuit 30 and the Y-coordinate detecting circuit 31 on the basis of generating timing of the induced voltage of the indicating pen 6 and a timing signal from the control circuit 27.

As shown in FIG. 4, an input voltage is amplified by an amplifying circuit 51 in the X-coordinate detecting circuit 30. In the X-coordinate detecting circuit 30, the X-coordinate is calculated by a comparator 53 from voltage timing for providing a voltage equal to or higher than a reference voltage Vsx. In the Y-coordinate detecting circuit 31, an input voltage is amplified by an amplifying circuit 52 and the Y-coordinate is calculated by a comparator 54 from voltage timing for providing a voltage equal to or higher than a reference voltage Vsy.

A coordinate detecting operation of the coordinate inputting apparatus using the position indicating pen 6 will next be explained with reference to FIGS. 5a to 5c.

A detecting electrode 58 having high impedance is arranged in an end tip portion of the position indicating pen 6. When the position indicating pen 6 approaches a display face of the liquid crystal panel 42 as a detecting panel surface, a small capacity is formed between electrodes of the liquid crystal panel 42 and the indicating pen 6 as shown in FIG. 5a. When a pulse voltage is applied to each of the segment electrodes X1 to Xm and the common electrodes Y1 to Yn of the liquid crystal panel 42, a small voltage is induced in the electrode 58 of the indicating pen 6 by electrostatic induction as shown in FIG. 5b. This electrostatic voltage has a peak value when a scanning voltage is applied to an electrode just below the indicating pen 6. Accordingly, as shown in FIG. 5c, a position of the indicating pen 6 is known by sequentially applying the scanning voltage to a group of display electrodes from an end portion thereof and calculating timing from this voltage application to the peak value of the electrostatic voltage.

In the general coordinate inputting apparatus, it is necessary to arrange four signal lines composed of the power line VCC, the position information signal line POUT, the switching signal line SW and the ground line GND in the cable 33 for connecting the position indicating pen 6 to the coordinate detecting circuits 30 and 31. Therefore, when these four signal lines are bound, a diameter of the cable 33 becomes large. Accordingly, it is difficult to soften the cable when the cable is formed as a curl cord. Further, it is impossible to cope with an automatic reel mechanism required in view of operability.

For example, a tablet apparatus is practically used generally as a means for inputting handwritten characters and figures to a personal computer, a word processor, etc. In this tablet apparatus, a liquid crystal display and an electrostatic induction type tablet are laminated on the display screen of a display unit. A user of this tablet apparatus inputs characters and figures with a sense of writing on a sheet of paper with a pen.

However, in this tablet apparatus, reflectivities and transmittances in existing and nonexisting portions of electrodes are respectively different from each other. Therefore, the electrodes are seen in a grid shape on the display screen so that the grade or quality of a liquid crystal display is reduced.

For example, a display integral type tablet for solving the above problems is proposed in Japanese Patent Application Laying Open (KOKAI) No. 05-265650. This display integral type tablet has both a display electrode of a liquid crystal panel and a position detecting electrode of the electrostatic induction type tablet.

FIG. 6 is a block diagram showing one example of the circuit construction of a general pen inputting apparatus. FIG. 6 shows a circuit construction for detecting a detecting mode signal in the display integral type tablet described in Japanese Patent Application Laying Open (KOKAI) No. 05-265650.

A liquid crystal panel 121 is constructed by a liquid crystal and an electrode functioning as a display electrode for operating this liquid crystal and a position detecting electrode of the electrostatic induction type tablet.

A detecting pen 122 has an end tip electrode electrostatically coupled to the electrode of the liquid crystal panel. The detecting pen 122 detects an induced voltage induced at each of rising and falling times of an inverting signal for operating the liquid crystal when the detecting pen 122 approaches the liquid crystal panel 121.

A preamplifier 123 amplifies the induced voltage induced in the end tip electrode of the detecting pen 122 in voltage and/or electric current.

An inverting signal generating circuit 124 generates an inverting signal for operating the liquid crystal of the liquid crystal panel 121 and setting an inverting time point of applying directions of a voltage applied to the liquid crystal.

A gate signal generating circuit 125 generates a first gate signal synchronized with rise and/or fall of the inverting signal and a second gate signal provided except for a transmitting time of this first gate signal.

A first analog gate circuit 126 samples the induced voltage amplified in voltage and/or electric current by the first gate signal. A second analog gate circuit 127 samples the induced voltage amplified in voltage and/or electric current by the second gate signal.

A first processing circuit 128 is constructed by a full wave rectifying circuit 128a for making a full wave rectification with respect to the induced voltage sampled by the first gate signal. The first processing circuit 128 is also constructed by an integrating circuit 128b for converting the rectified induced voltage to a direct current voltage.

A second processing circuit 129 is constructed by a full wave rectifying circuit 129a for making a full wave rectification with respect to the induced voltage sampled by the second gate signal. The second processing circuit 129 is also constructed by an integrating circuit 129b for converting the rectified induced voltage to a direct current voltage.

A comparing circuit 130 compares a level of the direct current voltage converted by the first processing circuit 128 with a level of the direct current voltage converted by the second processing circuit 129. The comparing circuit 130 judges by this comparison whether or not an end tip of the detecting pen approaches the display screen of the liquid crystal panel 121. The comparing circuit 130 outputs a detecting mode/nondetecting mode signal at a high or low voltage level by this comparison.

FIG. 7 is a circuit diagram showing one example of the general circuit construction of the pen inputting apparatus. As shown in FIG. 7, the pen inputting apparatus has the first analog gate circuit 126 and the second analog gate circuit 127 each constructed by an analog switch (for example, a FET), the full wave rectifying circuits 128a and 129a each constructed by a diode bridge, etc., the integrating circuits 128b and 129b each constructed by an operational amplifier, etc. and the comparing circuit 130.

FIG. 8 is a timing chart showing each of waveforms of signals in the circuit construction shown in FIG. 6 and timings of these signals. These signals shown in FIG. 8 will next be explained.

An inverting signal "as" of (A) is generated from the inverting signal generating circuit 124. This inverting signal "as" is used to periodically invert applying directions of a voltage applied to the liquid crystal so as to prevent the liquid crystal of the liquid crystal panel from being deteriorated by electrolysis. At this time, the voltages of driving signals applied to the electrode of the liquid crystal panel are simultaneously changed.

A first gate signal g1 of (B) and a second gate signal g2 of (C) are generated from the gate signal generating circuit 125 and are respectively transmitted to the first analog gate circuit 126 and the second analog gate circuit 127. A duty ratio (tg1:tg2) of the first and second gate signals is set in advance at a designing time point of the pen inputting apparatus.

An induced voltage sk of (D) is obtained by inducing an electrostatic induced voltage having a spike shape and depending on a distance between the end tip electrode of the detecting pen 122 and the electrode of the liquid crystal panel 121 every time the applying directions of the voltage applied to the liquid crystal are inverted by the inverting signal "as" when the detecting pen 122 approaches the display screen of the liquid crystal panel 121.

A waveform of a sampling signal sp1 of (E) is obtained by sampling the induced voltage sk by the first gate signal g1 using the first analog gate circuit 126 and making a full wave rectification of this induced voltage sk by the full wave rectifying circuit 128a.

A waveform of a sampling signal sp2 of (F) is obtained by sampling the induced voltage sk by the second gate signal g2 using the second analog gate circuit 127 and making a full wave rectification of this induced voltage sk by the full wave rectifying circuit 129a.

A waveform of a signal dv1 of (G) is obtained by converting the full wave rectified sampling signal sp1 to a direct current voltage by the integrating circuit 128b.

A waveform of a signal dv2 of (H) is obtained by converting the full wave rectified sampling signal sp2 to a direct current voltage by the integrating circuit 129b.

An output signal pm1 of (I) is obtained by comparing levels of the direct current voltages dv1 and dv2 with each other by the comparing circuit 130. The level of the direct current voltage dv1 is greater than the level of the direct current voltage dv2 so that a high ("H") voltage signal is outputted as a detecting mode signal. At this time, it can be judged that the detecting pen 122 approaches the liquid crystal panel 121.

For example, a noise signal ns of (J) shows a high frequency induced voltage. This noise signal ns shows one example of a signal waveform induced when the detecting pen 122 is separated from the display screen of the liquid crystal panel 121.

A waveform of a sampling signal sp3 of (K) is obtained by sampling the noise signal ns by the first gate signal g1 using the first analog gate circuit 126 and making a full wave rectification with respect to this noise signal by the full wave rectifying circuit 128a.

A waveform of a sampling signal sp4 of (L) is obtained by sampling the noise signal ns by the second gate signal g2 using the second analog gate circuit 127 and making a full wave rectification with respect to this noise signal by the full wave rectifying circuit 129a.

A waveform of a direct current voltage signal dv3 of (M) is obtained by converting the full wave rectified sampling signal sp3 to a direct current voltage by the integrating circuit 128b.

A waveform of a direct current voltage signal dv4 of (N) is obtained by converting the full wave rectified sampling signal sp4 to a direct current voltage by the integrating circuit 129b.

A detecting mode signal pm2 of (O) is an output signal obtained by comparing levels of the direct current voltages dv1 and dv2 with each other by the comparing circuit 130. The level of the direct current voltage dv1 is lower than the level of the direct current voltage dv2 so that a low ("L") voltage signal is outputted as a nondetecting mode signal. At this time, it can be judged that the detecting pen 122 is separated from the liquid crystal panel 121.

Accordingly, the detecting pen 122 can correctly extract the detecting mode signal pm by removing the noise signal ns therefrom even when the detecting pen 122 is separated from the liquid crystal panel 121 and the noise signal ns is induced.

When the detecting pen 122 approaches the liquid crystal panel 121 in detection of the detecting mode signal pm, a high ("H") voltage signal is outputted as a detecting mode signal ns from the induced voltage sk having a spike shape. Conversely, when the detecting pen 122 is separated from the liquid crystal panel 121, no high ("H") voltage signal is outputted even when the noise signal ns is induced. A duty ratio (showing distribution of a sampling time) of the first gate signal g1 and the second gate signal g2 outputted from the gate signal generating circuit 125 is set in advance such that the high voltage signal is outputted when the detecting pen 122 approaches the liquid crystal panel 121 and no high voltage signal is outputted when the detecting pen 122 is separated from the liquid crystal panel 121 as mentioned above.

Namely, an S/N ratio is improved by setting a time interval (tg1) of the first gate signal g1 to be equal to or greater than three times a discharging time constant of the spike-shaped induced voltage sk so as to reliably detect that the detecting pen 122 approaches the liquid crystal panel 121.

The S/N ratio is further improved by greatly setting a time interval (tg2) of the second gate signal g2 in comparison with the time interval (tg1) of the first gate signal g1 so as to reliably detect that the detecting pen 122 is separated from the liquid crystal panel 121.

Accordingly, the duty ratio of the gate signals is determined at a designing time point of electric circuits of the pen inputting apparatus such that the duty ratio becomes a suitable numeric value from various conditions and the above relation of the S/N ratio. These conditions include an electrostatic capacity (shown by a detected waveform of the spike-shaped induced voltage) between the electrode of the liquid crystal panel and the end tip electrode of the detecting pen, an amplifying degree of the preamplifier 123, time constants of capacitors C1, C2, resistors R1, R2 of the integrating circuits 128b, 129b as shown in FIG. 7, etc.

The duty ratio of the gate signals is set at the designing time point of these electric circuits in consideration of dispersion in accuracy of parts. However, an unexpectable dispersion in accuracy of parts is caused every lot when the number of produced pen inputting apparatuses is increased. Therefore, there is a possibility that no pen inputting apparatus is normally operated by reducing the S/N ratio in detection of the above detecting mode/nondetecting mode signal.

Further, when parts having high accuracy are used to reduce the dispersion in accuracy of parts, cost of the pen inputting apparatus is increased and the number of compensating parts is increased.

For example, Japanese Patent Application Laying Open (KOKAI) No. 2-211514 shows a device for converting a line width and a density of characters according to a writing pressure in a tablet inputting apparatus. This Japanese laid-open patent explains an electromagnetic tablet plate. The writing pressure is detected by a moving magnet and a coil arranged within an input pen.

In this Japanese Patent Application Laying Open (KOKAI) No. 2-211514, a means for detecting the writing pressure is constructed by the moving magnet and the coil so that outputted data are composed of one kind of data. Accordingly, a line width and a density of characters corresponding to a certain writing pressure are constant. Therefore, it is impossible to display characters having a wide line and a thin density and characters having a thin line and a thick density in a state in which these characters are discriminated from each other. Accordingly, no characters can be inputted with a feeling of writing on a sheet of paper.

For example, Japanese Patent Application Laying Open (KOKAI) No. 5-80921 shows a well-known literature describing a general coordinate inputting apparatus. In this Japanese laid-open patent, an electrostatic induced voltage induced by a detecting pen is applied to a mode detecting circuit by inverting polarities of a voltage for displaying an image during a display period so as to prevent an error in operation of the coordinate inputting apparatus caused by noises on the detecting pen. The mode detecting circuit compares this electrostatic induced voltage with a preset reference voltage. When the electrostatic induced voltage is higher than the reference voltage, the mode detecting circuit judges that it is a detecting mode for detecting coordinates. In contrast to this, when the electrostatic induced voltage is lower than the reference voltage, the mode detecting circuit judges that it is a nondetecting mode for undetecting the coordinates. In this nondetecting mode, the mode detecting circuit outputs a mode signal showing results of this judgment. A coordinate output discriminating circuit outputs each of the coordinates as it is when this mode signal shows the detecting mode. In contrast to this, the coordinate output discriminating circuit stops the output of the coordinates when the above mode signal shows the nondetecting mode. Namely, this Japanese laid-open patent shows a system for transmitting a coordinate signal and a switch turning-on/turning-off signal on independent signal lines.

Japanese Patent Application Laying Open (KOKAI) No. 1-254975 shows another system for outputting a coordinate signal. In this system, an original arranging base has a coordinate signal generating means on an original arranging face. A coordinate designating pen is used to come in contact with the original arranging face at an arbitrary designating point. The coordinate designating pen generates a timing signal for deciding a coordinate signal when the coordinate designating pen comes in contact with the original arranging face. A plurality of color designating switches are arranged in a body of the coordinate designating pen. Each of the color designating switches generates a color designating signal for designating a printed color. In this system, the coordinate signal is outputted only when a pen down switch is turned on, namely, only when a pen tip is pressed against a tablet.

FIG. 9 is a view showing the entire construction of a general coordinate inputting apparatus. In this coordinate inputting apparatus, each of the systems described in the above laid-open patents is corrected in a form similar to that in each of embodiments of the present invention. In FIG. 9, reference numerals 431, 432 and 433 respectively designate a control circuit, a common driving circuit and a segment driving circuit. Reference numerals 434, 435 and 436 respectively designate common electrodes Y1 to Ym, segment electrodes X1 to Xn and a wire pen. Reference numerals 437, 438 and 439 respectively designate a cordless pen, a signal receiving unit and a coordinate detecting circuit.

A tablet has a grid of n×m units constructed by the common electrodes 434 arranged in a Y-direction and the segment electrodes 435 arranged in an X-direction. These common and segment electrodes are respectively turned on or off by the common driving circuit 432 and the segment driving circuit 433. The control circuit 431 performs timing control of each of the common and segment driving circuits. The detecting pen is classified into a pen 436 of a wire system connected to an apparatus body through a cable and a pen 437 of a cordless system for transmitting and receiving data by a radio, an infrared ray, etc. A body of the cordless system using the pen 437 has the signal receiving unit 438 for receiving a signal from the pen 437. A signal directly transmitted from the pen 437 or transmitted through the signal receiving unit 438 is converted to coordinate data by the coordinate detecting circuit 439.

FIG. 10 is a view showing operating timings of the coordinate inputting apparatus shown in FIG. 9.

One cycle of a systematic operation of the coordinate inputting apparatus is shown as one frame in FIG. 10 and is composed of a Y-coordinate detecting period and an X-coordinate detecting period. The control circuit 431 outputs a signal YDET for prescribing the Y-coordinate detecting period as shown in FIG. 10(a) and a signal XDET for prescribing the X-coordinate detecting period as shown in FIG. 10(b), and controls the systematic operation of the coordinate inputting apparatus. As shown in FIG. 10(c), the electrodes Y1 to Ym at Y-coordinates are sequentially turned on in the Y-coordinate detecting period, and the electrodes X1 to Xn at X-coordinates are sequentially turned on in the X-coordinate detecting period. As shown in FIG. 10(d), a detecting portion of the detecting pen outputs a signal when an electrode closest to a pen tip is turned on. Accordingly, it is possible to discriminate a position of the pen tip on the tablet by timing of the signal from the detecting pen. Concretely, a Y-coordinate is shown by a time from rise of the signal YDET to rise of the pen signal, and an X-coordinate is shown by a time from rise of the signal XDET to rise of the pen signal.

When the pen signal never has a high voltage during the period of a high voltage level of the signal YDET, it can be judged that the pen tip is separated from the tablet. The same arguments can also hold true with respect to the signal XDET. The output signal of the detecting pen is converted to coordinate information by the coordinate detecting circuit 439. The coordinate detecting circuit 439 obtains the Y-coordinate from the time from rise of the signal YDET to rise of the pen signal and obtains the X-coordinate from the time from rise of the signal XDET to rise of the pen signal.

FIG. 11 is a view showing one example of the detecting pen. In FIG. 11, reference numerals 441, 442 and 443 respectively designate a pen tip as a detecting portion, a comparator and a first switch as a pen down switch. Reference numerals 444 and 445 respectively designate a second switch as a push switch and a pen connecting cable.

The end tip portion 441 of the detecting pen is capacity-coupled to each of electrodes 434 and 435 of a tablet. The comparator 442 detects a peak of an induced voltage caused in the end tip portion of the detecting pen by a scanning signal of a tablet electrode. The comparator 442 then outputs a logic signal having each of high and low voltage levels. The comparator 442 outputs a high voltage signal at a peak detecting time. The detecting pen has a pen down switch 443 for detecting a press in the end tip portion of the detecting pen. The detecting pen also has a push switch 444 operated by a user and used to perform setting operations, etc. in accordance with applications. These pen switches 443 and 444 are connected to independent signal lines. Accordingly, the pen connecting cable 445 has a total of five lines composed of a coordinate output signal line, a signal line of the pen down switch, a signal line of the push switch and two power lines. If the number of push switches, etc. are increased, it is necessary to further increase the number of signal lines.

FIG. 12 is a view showing one example of the detecting pen of a general cordless system. In FIG. 12, reference numerals 446, 447 and 448 respectively designate a battery, a power circuit and a signal transmitting unit. Reference numerals 449 and 450 respectively designate a power switch and a low battery indicator. The other constructional portions each performing the same operation as FIG. 11 are designated by the same reference numerals.

The detecting pen and an apparatus body are not connected to each other through a cable. A signal is transmitted from the signal transmitting unit 448 built in the detecting pen to a signal receiving unit 438 of a tablet body by a radio, an infrared ray, etc. This signal transmitting unit 448 outputs a coordinate signal only when the pen down switch 443 is turned on. If the pen down switch 443 is turned off in a first frame and is turned on in a second frame as shown in FIG. 10(e), no output signal of the detecting pen is transmitted in the first frame as shown in FIG. 10(f) and the coordinate signal is outputted in the second frame. In this example, no push switch is arranged so that a signal transmitting channel is constructed by only one coordinate information. No circuit power is supplied from the apparatus body in the cordless system. Accordingly, the battery 446, the power circuit 447 and the power switch 449 are built in the detecting pen itself. The power circuit 447 supplies a stabilized power voltage to an electric circuit of the detecting pen. Further, the power circuit 447 detects a reduction in voltage of the battery 446 and turns on the low battery indicator 450.

As mentioned above, in the general first system, it is necessary to add dedicated signal lines to the coordinate inputting apparatus so as to transmit information except for coordinate data. Therefore, many pen switches are arranged and the number of cores of connecting cords of the detecting pen is increased in a system for transmitting many additional information so that cost of the coordinate inputting apparatus is increased. Further, each of the connecting cords is thickened so that no detecting pen is easily operated.

As shown in the general second system, there is a method in which no coordinate detecting signal is outputted if a pen switch is turned off. However, only one switch signal line can be reduced at most in this method.

As shown in FIG. 13, a system for pointing an icon on a display screen without using any pen switch is known as a functional selecting means. However, a portion of the display screen is occupied by an icon display in this system so that an effective working region on the display screen is narrowed. Further, it is necessary to perform a complicated operation in which the detecting pen is once separated from the working region and comes in contact with the icon and is again returned to the working region in functional selection.

In a low battery warning system of the detecting pen of the cordless system, an indicator is arranged in the detecting pen so as not to add a signal transmitting channel independent of a channel for transmitting a coordinate signal in the above-mentioned general example. However, a user of the coordinate inputting apparatus pays attention to the display screen and the tablet during an operation of the tablet. Accordingly, there is a possibility that an indicator display of the detecting pen is not seen and is missed.

SUMMARY OF THE INVENTION

It is therefore a first object of the present invention to provide a coordinate inputting apparatus for reducing the diameter of a cable by reducing the number of signal lines so that a soft curl cord can be realized and it is possible to cope with an automatic reel mechanism.

A second object of the present invention is to provide a pen inputting apparatus having means for controlling a duty ratio of gate signals for determining two sampling times as a setting condition for detecting a detecting mode signal so that dispersion in accuracy of parts is absorbed and an optimum duty ratio is determined with respect to each of manufactured products, and a stable detecting mode/nondetecting mode signal can be detected and a function for automatically setting the duty ratio is also provided.

A third object of the present invention is to provide a tablet inputting apparatus for faithfully expressing a line width, a density, etc. of inputted characters and figures according to a writing pressure.

A fourth object of the present invention is to provide a signal transmitting system of a coordinate inputting apparatus in which coordinate information detected by a coordinate detecting pen and additional information of the coordinate detecting pen except for the coordinate information are transmitted by time division on the same signal line or a radio of the same channel, etc.

In accordance with a first construction of the present invention, the above first object can be achieved by a coordinate inputting apparatus comprising:

liquid crystal panel means having a liquid crystal layer interposed between plural segment electrode means and plural common electrode means perpendicular to each other;

position indicating means electrostatically coupled to the segment electrode means and the common electrode means in an indicated position;

coordinate detecting means for detecting coordinates in the indicated position on the basis of an induced voltage induced in the position indicating means and application timing of a scanning voltage applied to the segment electrode means and the common electrode means; and cable means having a signal line for supplying power from the coordinate detecting means to the position indicating means and transmitting a detecting signal from the position indicating means to the coordinate detecting means.

In accordance with a second construction of the present invention, the above first object can be also achieved by a coordinate inputting apparatus comprising:

liquid crystal panel means having a liquid crystal layer interposed between plural segment electrode means and plural common electrode means perpendicular to each other;

position indicating means electrostatically coupled to the segment electrode means and the common electrode means in an indicated position;

switching means arranged in the vicinity of an end tip of the position indicating means and turned on and off by making the switching means come in contact with the liquid crystal panel means and separating this switching means from the liquid crystal panel means;

coordinate detecting means for detecting coordinates in the indicated position on the basis of an induced voltage induced in the position indicating means and application timing of a scanning voltage applied to the segment electrode means and the common electrode means; and cable means having a signal line for supplying power from the coordinate detecting means to the position indicating means and transmitting each of signals showing turning-on and turning-off states of the switching means from the position indicating means to the coordinate detecting means.

In accordance with a third construction of the present invention, the above first object can be also achieved by a coordinate inputting apparatus comprising:

liquid crystal panel means having a liquid crystal layer interposed between plural segment electrode means and plural common electrode means perpendicular to each other;

position indicating means electrostatically coupled to the segment electrode means and the common electrode means in an indicated position;

switching means arranged in the vicinity of an end tip of the position indicating means and turned on and off by making the switching means come in contact with the liquid crystal panel means and separating this switching means from the liquid crystal panel means;

coordinate detecting means for detecting coordinates in the indicated position on the basis of an induced voltage induced in the position indicating means and application timing of a scanning voltage applied to the segment electrode means and the common electrode means; and cable means having a signal line for supplying power from the coordinate detecting means to the position indicating means, transmitting each of signals showing turning-on and turning-off states of the switching means from the position indicating means to the coordinate detecting means, and transmitting a detecting signal from the position indicating means to the coordinate detecting means.

In the first construction of the coordinate inputting apparatus, when the position indicating means approaches a surface of the liquid crystal panel means, a voltage is induced in an electrode arranged in an end tip portion of the position indicating means by a floating capacity between the electrode of the position indicating means and each of the segment electrode means and the common electrode means to which a voltage is applied. The voltage induced in the position indicating means is amplified by an amplifier arranged within the position indicating means and is provided to the coordinate detecting means through the cable means. Coordinates in an indicated position are detected by the coordinate detecting means on the basis of generation of the induced voltage of the position indicating means and application timing of a scanning voltage. The cable means has a signal line for supplying power from the coordinate detecting means to the position indicating means and transmitting a detecting signal from the position indicating means to the coordinate detecting means. Accordingly, the number of signal lines is reduced so that the diameter of a cable can be reduced. Further, the cable can be made soft by reducing the diameter of the cable so that it is possible to cope with an automatic reel mechanism.

In the second construction of the coordinate inputting apparatus, when the position indicating means comes in contact with a surface of the liquid crystal panel means and the switching means is turned on, a voltage is induced in an electrode arranged in an end tip portion of the position indicating means by a floating capacity between the electrode of the position indicating means and each of the segment electrode means and the common electrode means to which a voltage is applied. The voltage induced in the position indicating means is amplified by an amplifier arranged within the position indicating means and is provided to the coordinate detecting means through the cable means. Coordinates in an indicated position are detected by the coordinate detecting means on the basis of generation of the induced voltage of the position indicating means and application timing of a scanning voltage. The cable means has a signal line for supplying power from the coordinate detecting means to the position indicating means and transmitting each of signals showing turning-on and turning-off states of the switching means from the position indicating means to the coordinate detecting means. Accordingly, the number of signal lines is reduced so that the diameter of a cable can be reduced. Further, the cable can be made soft by reducing the diameter of the cable so that it is possible to cope with an automatic reel mechanism.

In the third construction of the coordinate inputting apparatus, when the position indicating means comes in contact with a surface of the liquid crystal panel means and the switching means is turned on, a voltage is induced in an electrode arranged in an end tip portion of the position indicating means by a floating capacity between the electrode of the position indicating means and each of the segment electrode means and the common electrode means to which a voltage is applied. The voltage induced in the position indicating means is amplified by an amplifier arranged within the position indicating means and is provided to the coordinate detecting means through the cable means. Coordinates in an indicated position are detected by the coordinate detecting means on the basis of generation of the induced voltage of the position indicating means and application timing of a scanning voltage. The cable means has a signal line for supplying power from the coordinate detecting means to the position indicating means, transmitting each of signals showing turning-on and turning-off states of the switching means from the position indicating means to the coordinate detecting means, and transmitting a detecting signal from the position indicating means to the coordinate detecting means. Accordingly, the number of signal lines is reduced so that the diameter of a cable can be reduced. Further, the cable can be made soft by reducing the diameter of the cable so that it is possible to cope with an automatic reel mechanism.

The above second object can be achieved by a pen inputting apparatus comprising:

a liquid crystal panel constructed by a liquid crystal and an electrode for operating this liquid crystal;

a detecting pen having an end tip electrode electrostatically coupled to the electrode of the liquid crystal panel and detecting an induced voltage induced at each of rising and falling times of a signal for operating the liquid crystal;

inverting signal generating means for operating the liquid crystal of the liquid crystal panel and generating an inverting signal for inverting applying directions of a voltage applied to the liquid crystal;

gate signal generating means for generating a first gate signal synchronized with each of rise and fall of the inverting signal and a second gate signal provided except for a transmitting time of this first gate signal;

first sampling processing means for sampling the induced voltage induced in the end tip electrode of the detecting pen by the first gate signal and converting this induced voltage to a direct current voltage when the rise and fall of the inverting signal are changed;

second sampling processing means for sampling an induced voltage induced after the sampling of the first sampling processing means by the second gate signal;

the second sampling processing means converting this induced voltage to a direct current voltage;

judging means for judging whether or not an end tip of the detecting pen approaches a display screen of the liquid crystal panel on the basis of comparison of levels of the direct current voltages converted by the first and second sampling processing means;

the judging means outputting results of this judgment as a detecting mode/nondetecting mode signal; and duty ratio control means for controlling a duty ratio of the first and second gate signals generated by the gate signal generating means;

the pen inputting apparatus being constructed such that the duty ratio control means controls sampling times of the gate signals supplied to the first and second sampling processing means by controlling the duty ratio of the first and second gate signals, and adjusts the levels of the direct current voltages converted by the first and second sampling processing means so that the judging means stably judges the detecting mode/nondetecting mode signal.

In this pen inputting apparatus, the duty ratio control means preferably has duty ratio setting means for setting the duty ratio by numeric value data.

The pen inputting apparatus further preferably comprises an automatic setting functional key for indicating an automatic setting function of the duty ratio. The duty ratio control means controls an operation of the gate signal generating means such that the duty ratio of the gate signals is sequentially changed from predetermined numeric value data when the automatic setting function is indicated by the automatic setting functional key and the detecting pen approaches a predetermined region on the display screen of the liquid crystal panel. The duty ratio control means also detects the duty ratio of the gate signals when the judging means outputs the detecting mode signal. The duty ratio control means further controls the gate signals with numeric value data of this detected duty ratio as initial set data.

This pen inputting apparatus has means for controlling the duty ratio of the gate signals for determining two sampling times as a setting condition for detecting the detecting mode signal. Accordingly, dispersion in accuracy of parts is absorbed and an optimum duty ratio is determined with respect to each of manufactured products. Further, a stable detecting mode/nondetecting mode signal can be detected and a function for automatically setting the duty ratio is also provided.

The above third object of the present invention can be achieved by a tablet inputting apparatus comprising:

an input pen having a pen shaft, a main electrode attached to the pen shaft and an auxiliary electrode located in a position separated from the main electrode such that an electrostatic capacity of the auxiliary electrode with respect to a tablet can be changed in accordance with a writing pressure;

the tablet for sliding the input pen along a surface thereof;

means for detecting a change in signal output provided by the auxiliary electrode and caused by the writing pressure; and means for detecting a time difference between peaks of output signals of both the main and auxiliary electrodes by inclining the pen shaft.

In this tablet inputting apparatus, the auxiliary electrode is formed in a ring shape having a hollow portion and the main electrode is inserted into the hollow portion of the auxiliary electrode through an insulator.

In this tablet inputting apparatus, Position information of characters is inputted by the main electrode. The electrostatic capacity between the auxiliary electrode and the tablet is changed in accordance with strength of the writing pressure so that a line width or a density of characters can be adjusted. Since the auxiliary electrode is located in a position separated from the main electrode, coordinates of the main and auxiliary electrodes with respect to a tablet plate are separately detected when the pen shaft is inclined. Inclination data of the pen shaft can be taken out by a difference between timing signals caused by a difference between these coordinates. A density or a line width of characters can be adjusted by these data.

In accordance with a first construction of the signal transmitting system in the present invention, the above fourth object can be achieved by a signal transmitting system of a coordinate inputting apparatus for detecting a scanning signal of a tablet by a detecting pen and detecting a position of the detecting pen;

the signal transmitting system comprising the steps of:

transmitting information showing operating states of various kinds of pen switches built in the detecting pen to a body of the signal transmitting system by time division on the same signal line (by a radio of one channel, an infrared ray, etc. in the case of a cordless system pen) in addition to coordinate information detected by the detecting pen; and informing the signal transmitting system of an operating state and a functional set of the detecting pen, etc. by the operating states of the pen switches.

In accordance with a second construction of the signal transmitting system in the present invention, the above fourth object can be also achieved by a signal transmitting system of a coordinate inputting apparatus which also functions as a display unit and detects a scanning signal of a liquid crystal display unit by a detecting pen and detects a position of the detecting pen;

the signal transmitting system comprising the steps of:

transmitting information showing operating states of pen switches to a body of the signal transmitting system by time division on the same signal line (by a radio of one channel, an infrared ray, etc. in the case of a cordless system pen) in addition to coordinate information detected by the detecting pen;

transmitting the coordinate information during a coordinate detecting period; and transmitting the state information of the pen switches during a display period.

In accordance with a third construction of the signal transmitting system in the present invention, an ID code peculiar to the detecting pen is set and transmitted by adding the coordinate information to the operating states of the pen switches by the signal transmitting system having the first or second construction. Thus, this signal transmitting system discriminates a detecting pen used among plural existing detecting pens.

In accordance with a fourth solving means as a fourth construction of the signal transmitting system of the present invention, information with respect to the capacity of a battery built in a cordless system pen such as a voltage, a low battery state, etc. are transmitted by the signal transmitting system of the above first or second construction to the system of a coordinate detector using the cordless system pen having the built-in battery.

In the signal transmitting system of the coordinate inputting apparatus in the present invention, the following effects can be obtained.

(1) An operating cycle of a tablet is divided into a coordinate detecting period and an additional information transmitting period. The same output signal line is used for a coordinate data output in the coordinate detecting period and is used for an output of additional information such as operating states of pen switches, etc. in the additional information transmitting period. Thus, no independent signal line is required every additional information.

(2) A display period of an operating cycle of the coordinate inputting apparatus also capable of functioning as a display unit is allocated to the additional information transmitting period and the additional information is outputted in a period in which the signal transmitting system performs a display operation. It is possible to avoid problems about reductions in display contrast and follow-up property of coordinate detection tending to be caused when the operating cycle is extended to add the additional information transmitting period.

(3) The signal transmitting system can discriminate a detecting pen used among the plural prepared detecting pens by transmitting the ID code peculiar to each of the detecting pens in addition to the operating states of the pen switches as the additional information.

(4) A voltage of the battery built in the detecting pen is transmitted to the signal transmitting system as the additional information so that the signal transmitting system can know the battery voltage of the detecting pen. Accordingly, it is possible to provide a countermeasure means for displaying a low battery warning on the display screen, etc.

Further objects and advantages of the present invention will be apparent from the following description of the preferred embodiments of the present invention as illustrated in the accompanying drawings.

BRIEF DESCRIPTION OF THE DRAWINGS

FIG. 8 is a timing chart showing each of waveforms of signals in the circuit construction shown in FIG. 6 and timings of these signals;

FIGS. 19a to 19c are explanatory views showing signals of the coordinate inputting apparatus in the third embodiment of the present invention;

FIG. 29a is a graph showing an output waveform of each of the electrodes of the tablet inputting apparatus when the pen shaft is vertically located;

FIG. 29b is a graph showing an output waveform of each of the electrodes of the tablet inputting apparatus when the pen shaft is inclined 45° with respect to a tablet;

DESCRIPTION OF THE PREFERRED EMBODIMENTS

The preferred embodiments of a coordinate inputting apparatus and a signal transmitting system thereof in the present invention will next be described in detail with reference to the accompanying drawings.

Figure 1:
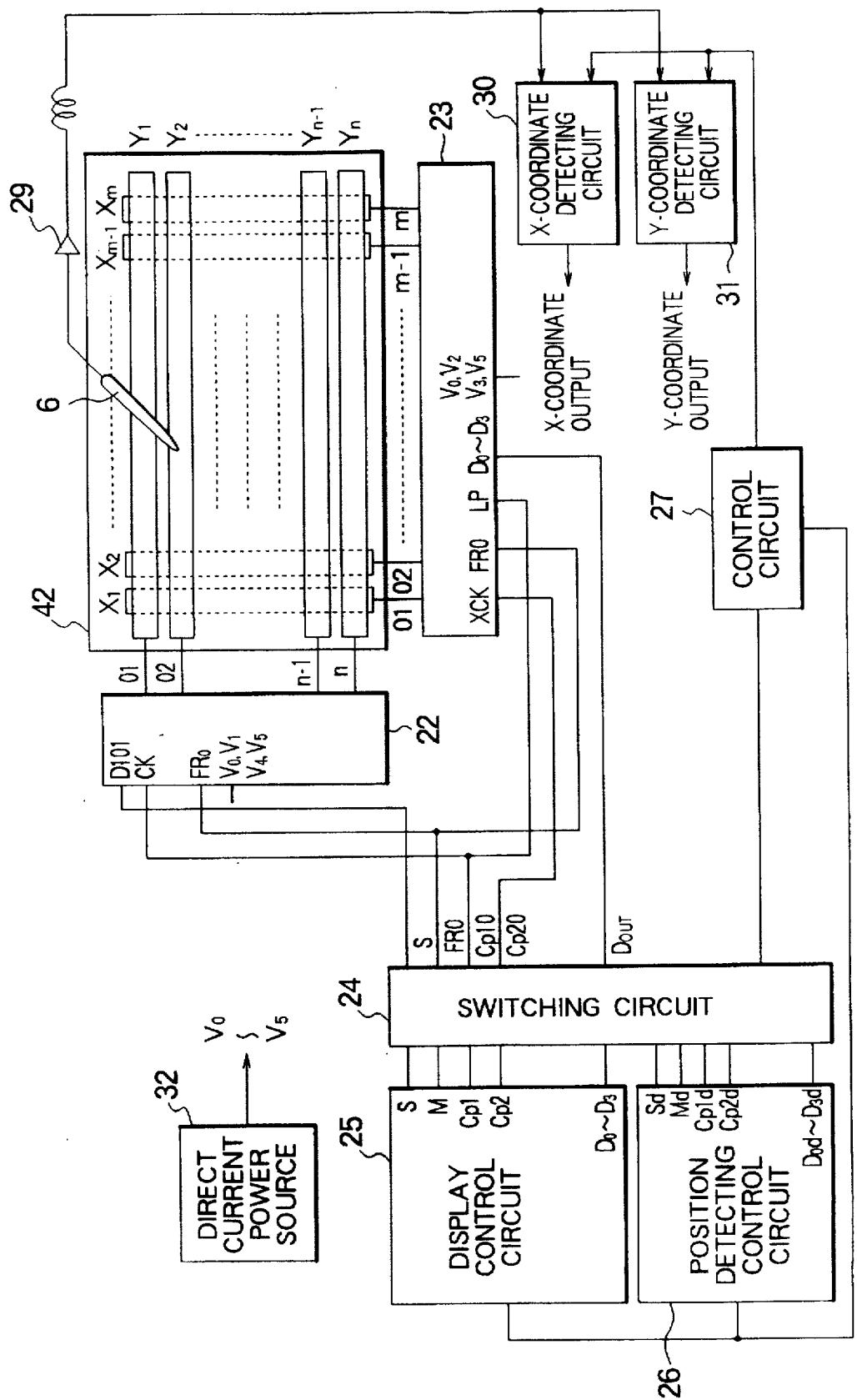
FIG. 1 is a block diagram showing a general coordinate inputting apparatus.
Figure 2:
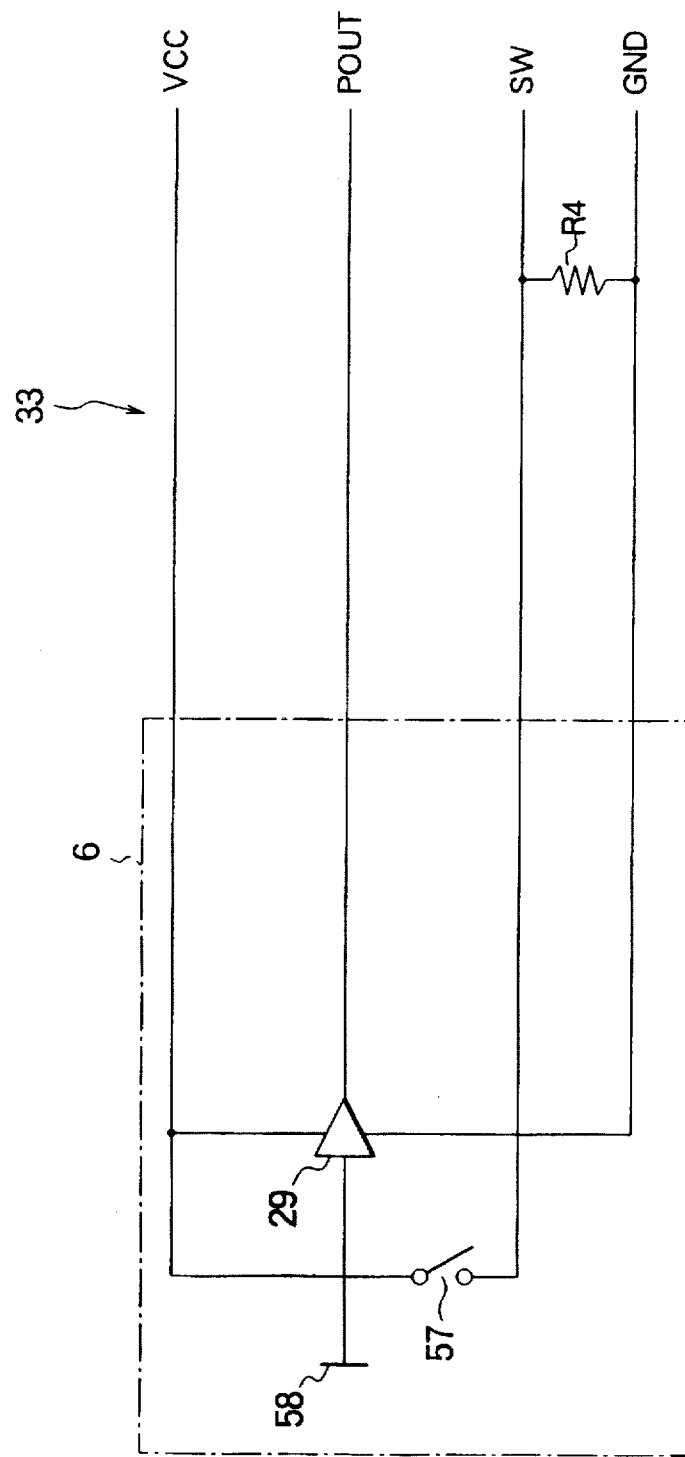
FIG. 2 is a block diagram showing a main portion of the general coordinate inputting apparatus.
Figure 3:
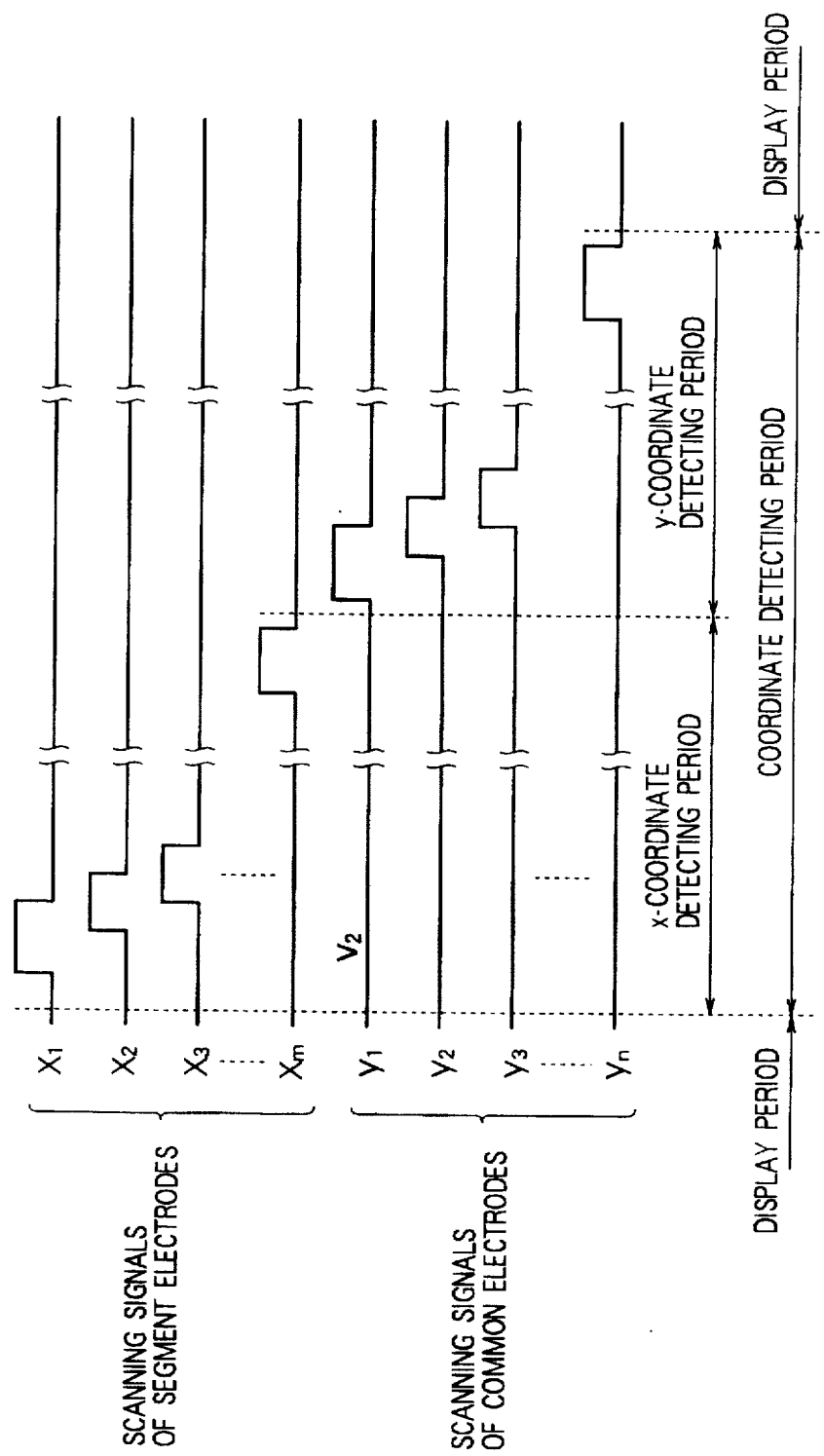
FIG. 3 is a view for explaining a coordinate detecting operation of the general coordinate inputting apparatus.
Figure 4:
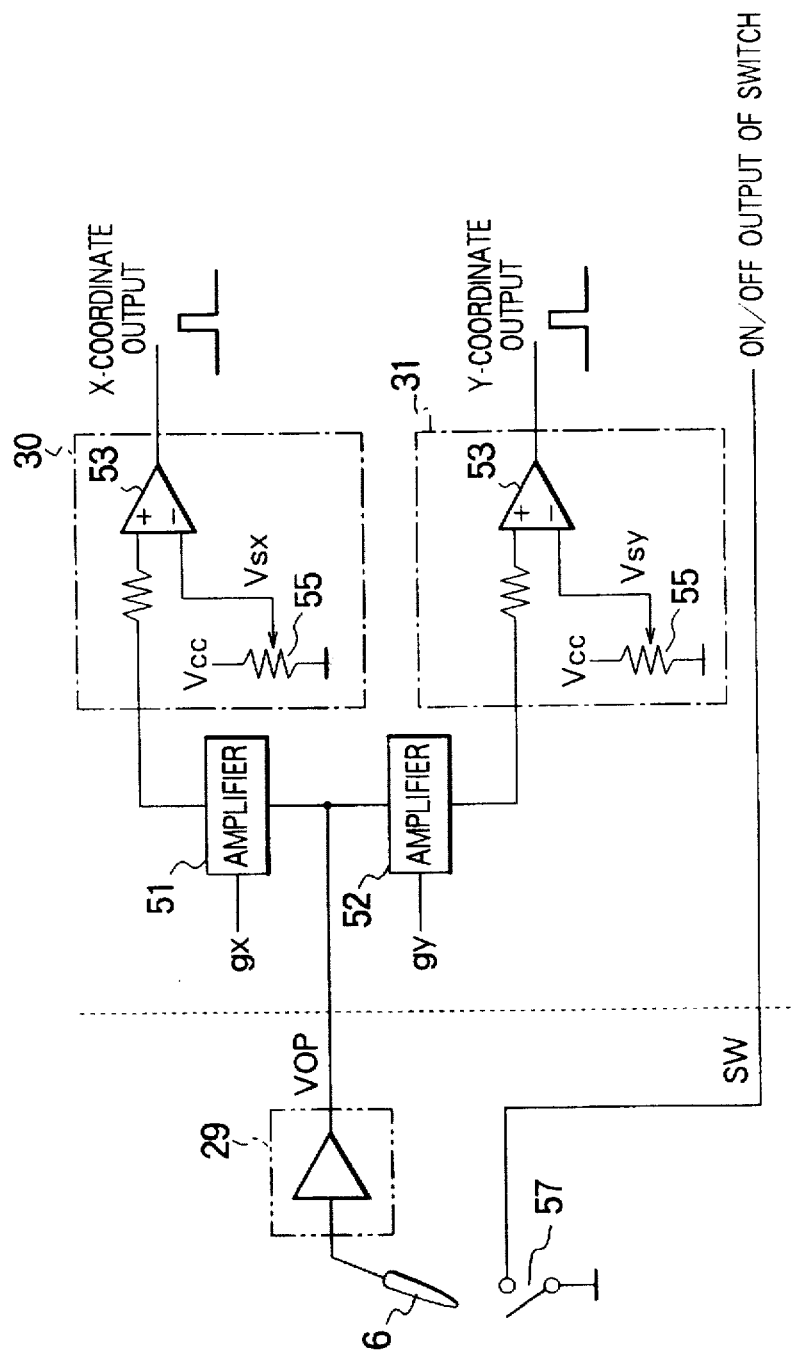
FIG. 4 is a view for explaining coordinate detecting circuits of the general coordinate inputting apparatus.
Figure 5A:
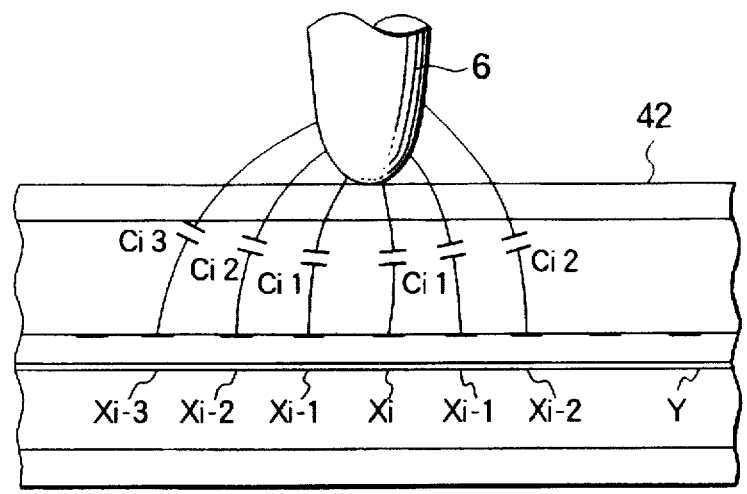
FIGS. 5a to 5c are views for explaining an operation of the general coordinate inputting apparatus.
Figure 5B:
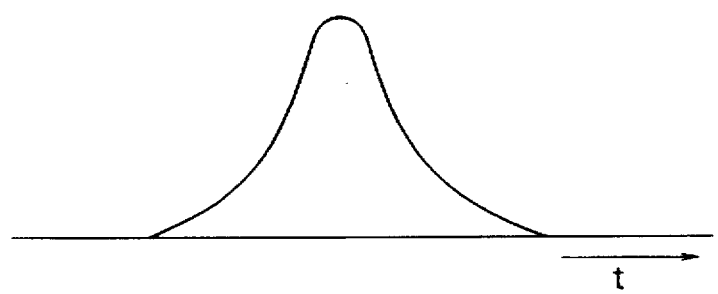
Figure 5C:
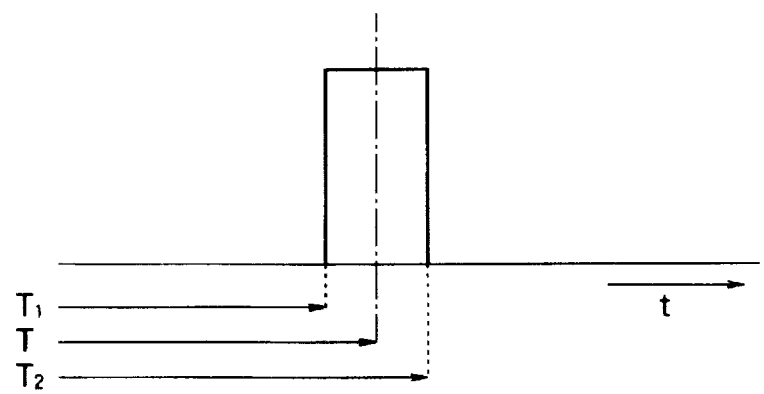
Figure 6:
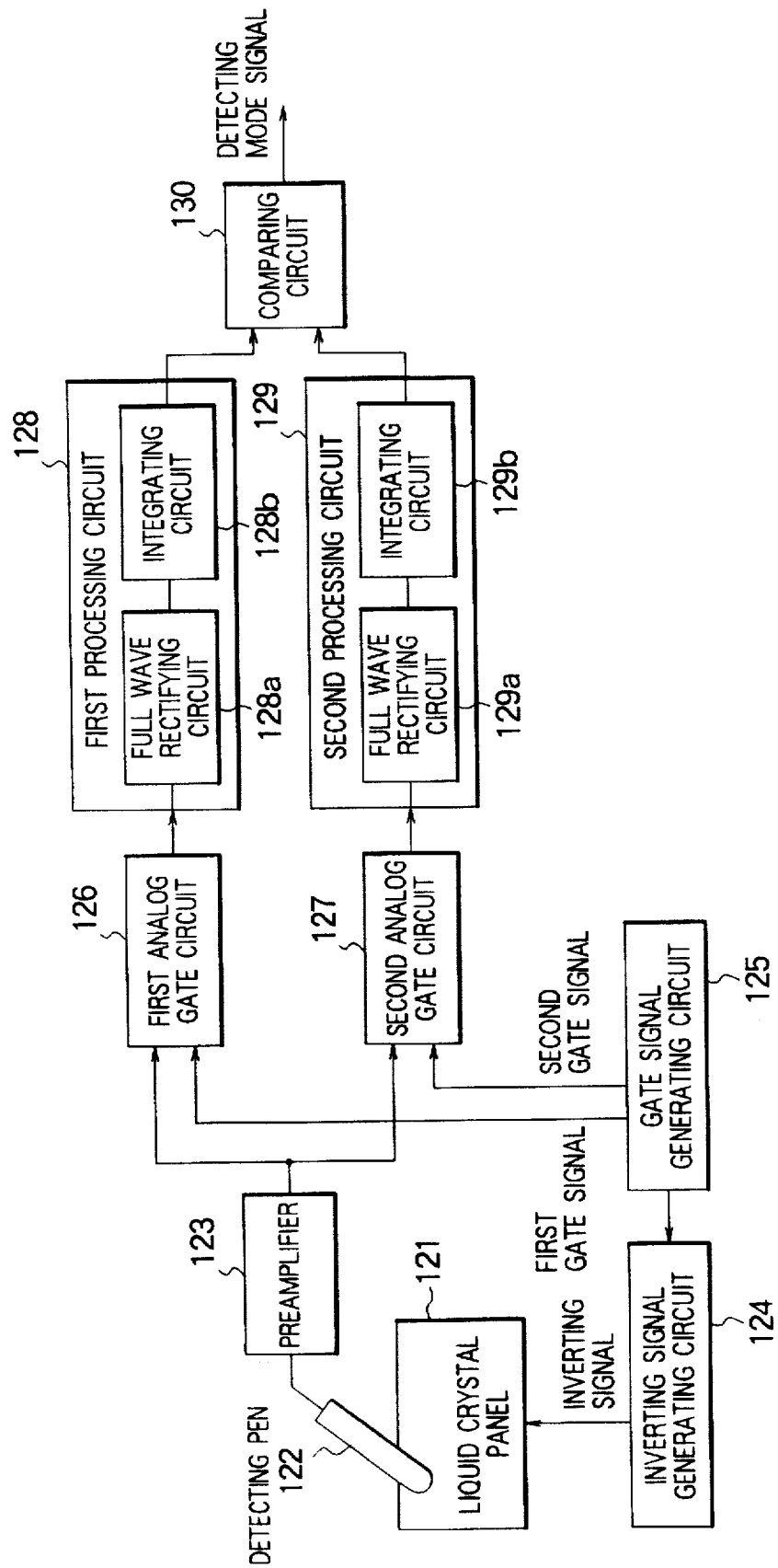
FIG. 6 is a block diagram showing one example of the circuit construction of a general pen inputting apparatus.
Figure 7:
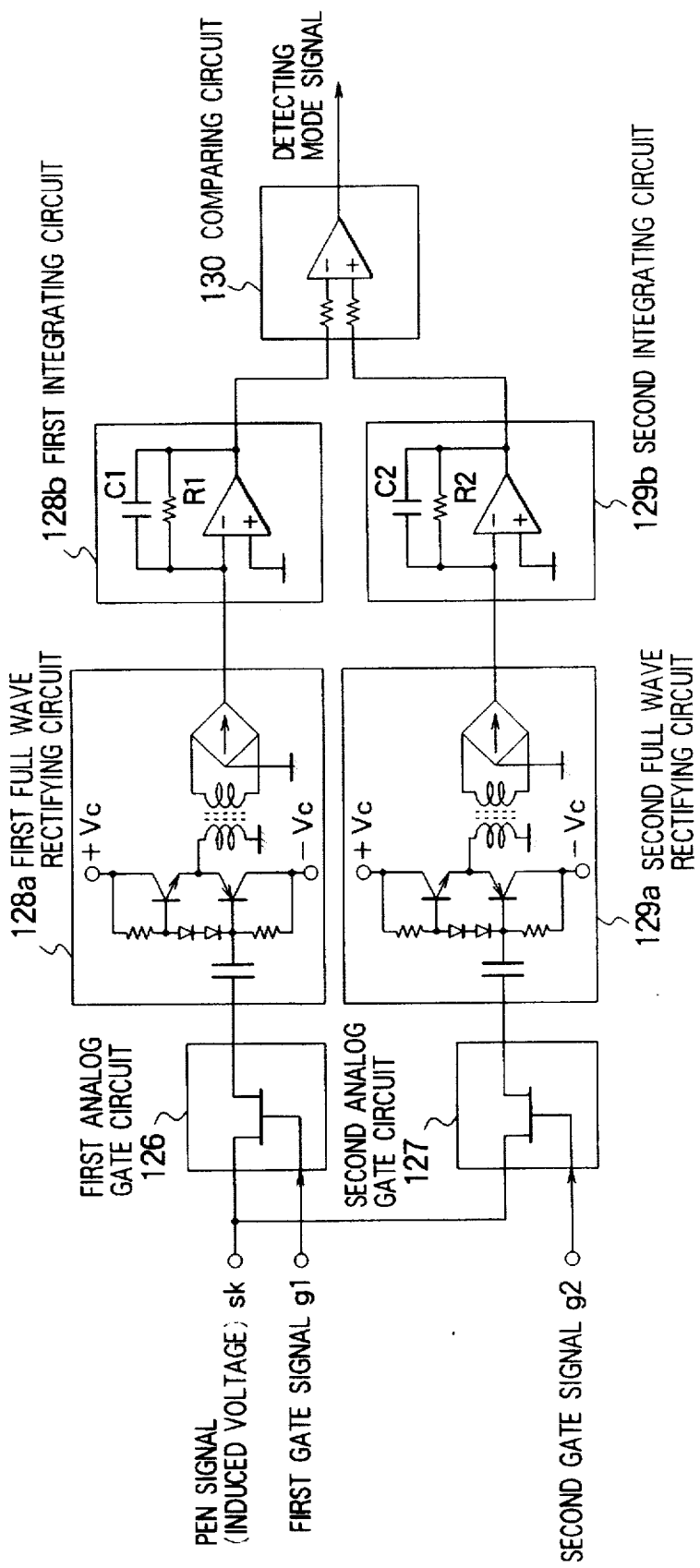
FIG. 7 is a circuit diagram showing one example of the circuit construction of the general pen inputting apparatus.
Figure 9:
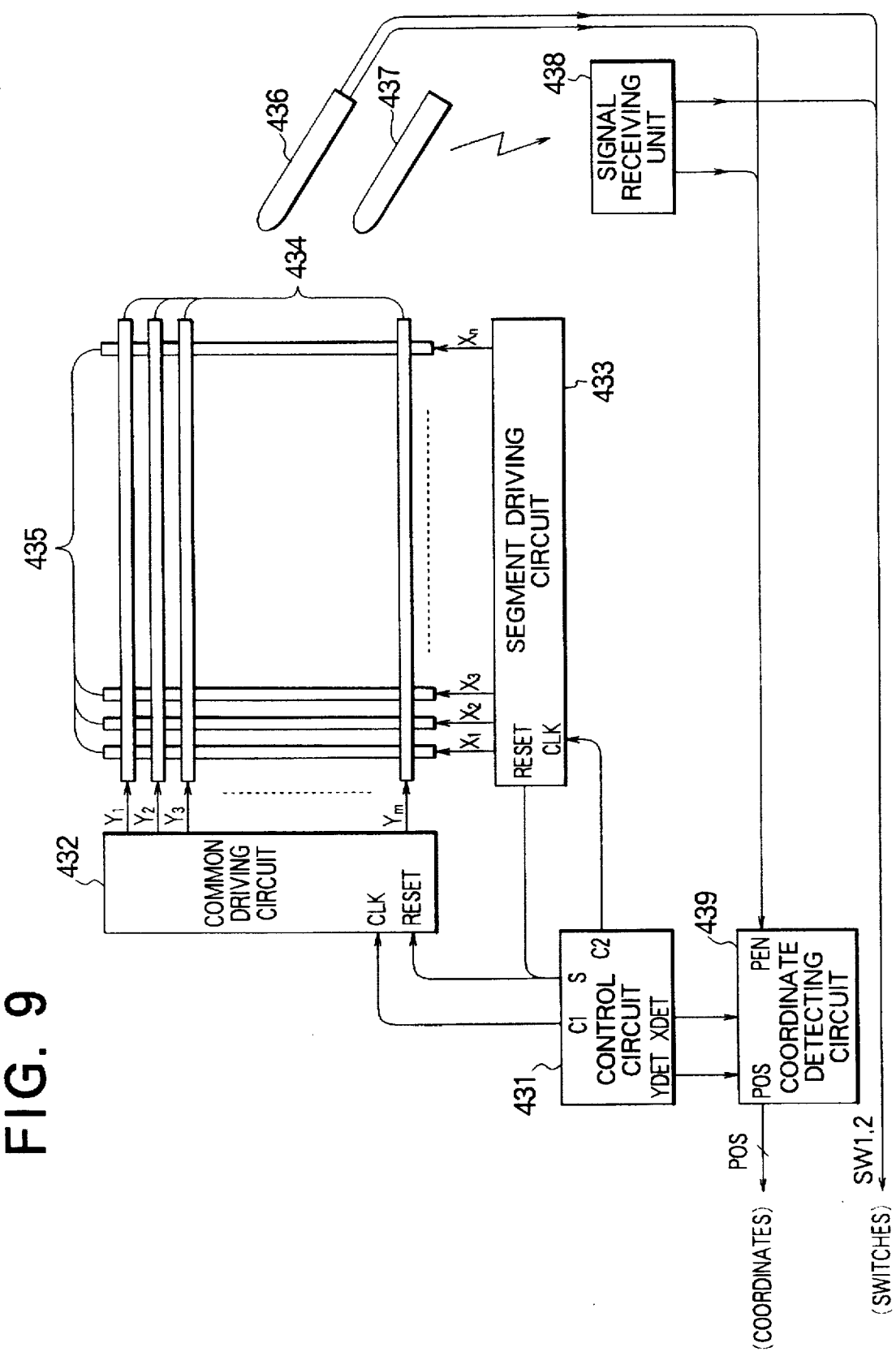
FIG. 9 is a view showing the construction of a general coordinate inputting apparatus.
Figure 10:
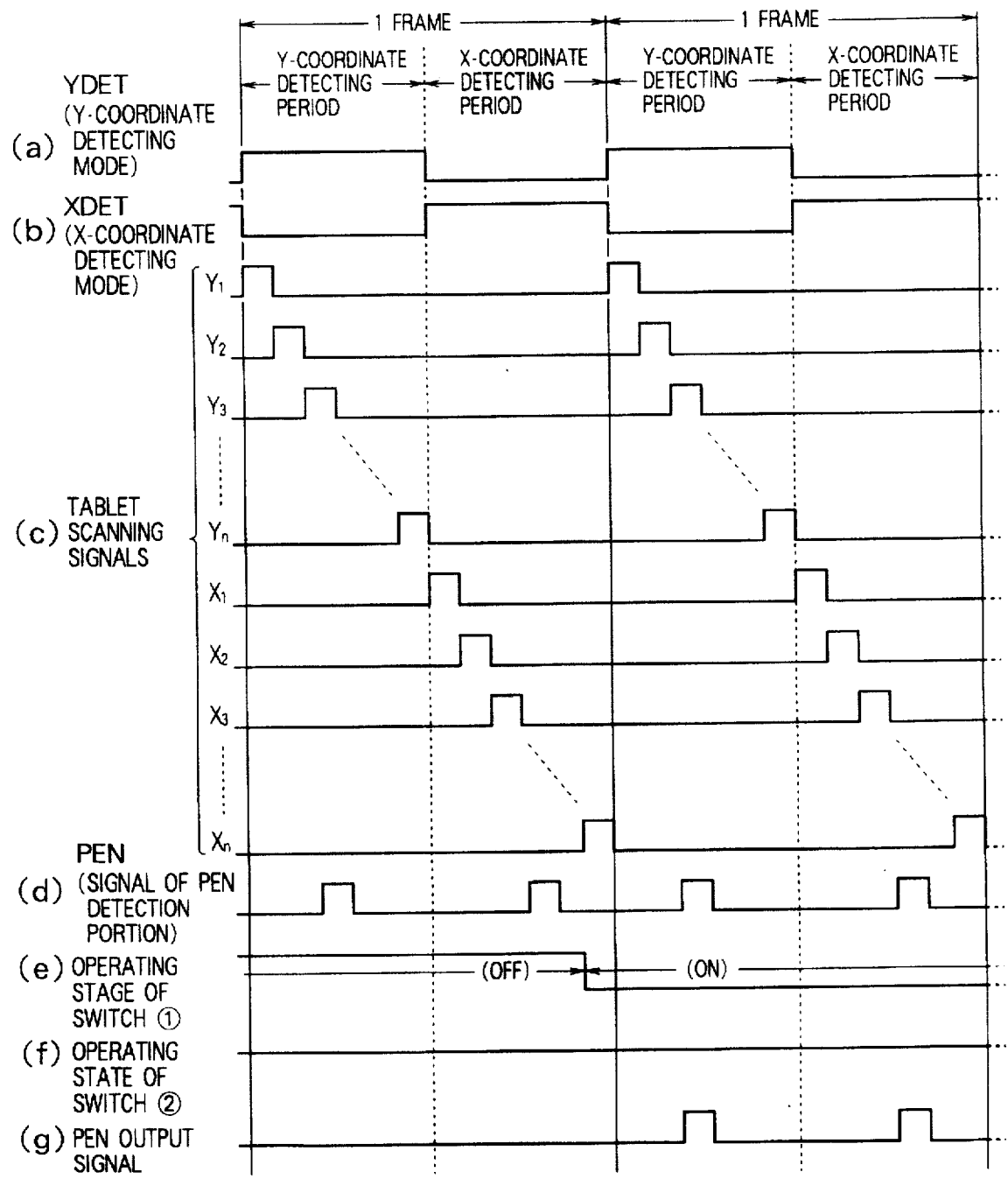
FIG. 10 is a view showing operating timings of signals in the coordinate inputting apparatus shown in FIG. 9.
Figure 11:
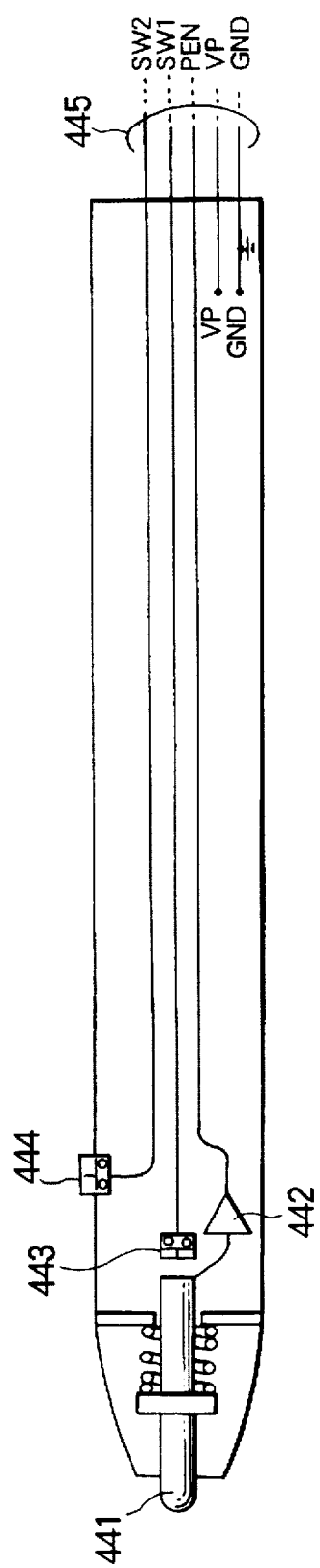
FIG. 11 is a view showing a general wire system detecting pen.
Figure 12:
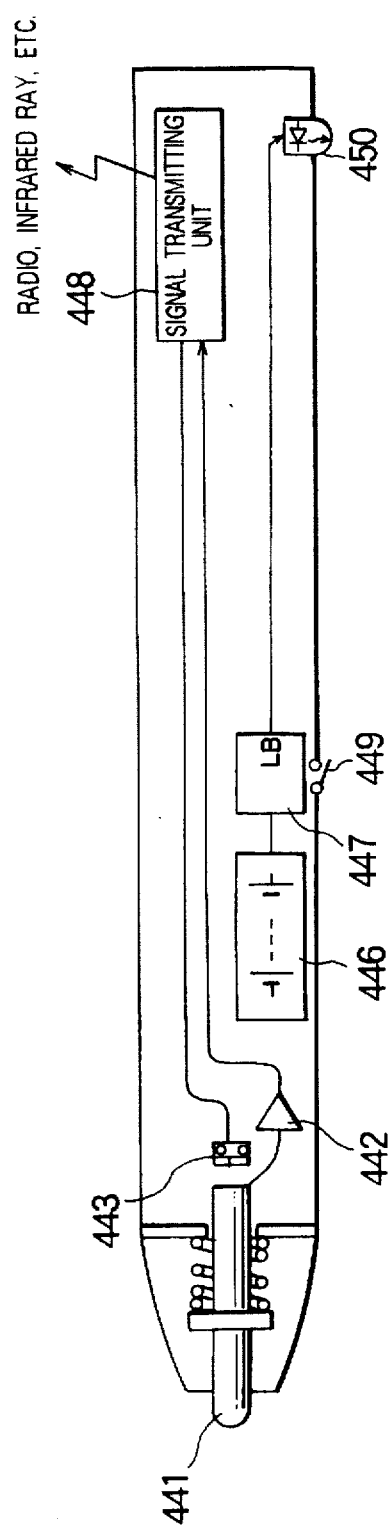
FIG. 12 is a view showing a general cordless system detecting pen.
Figure 13:
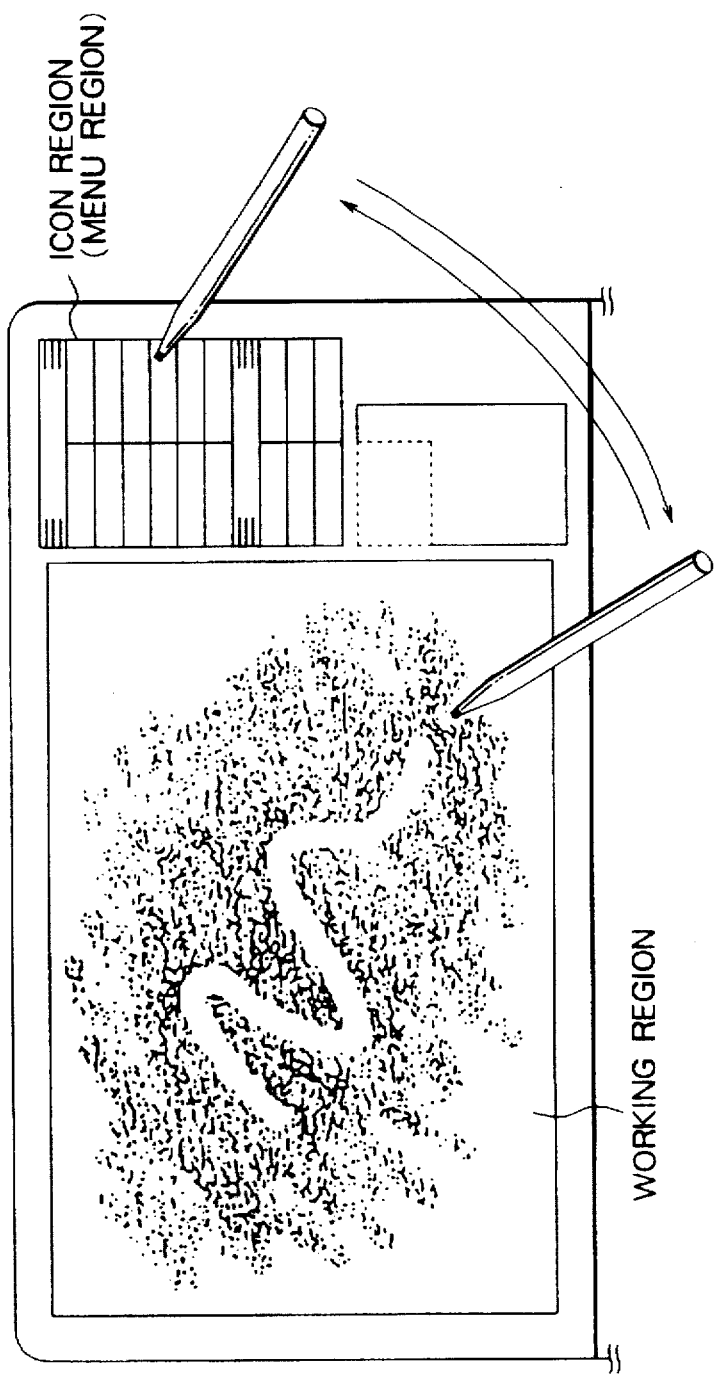
FIG. 13 is a view showing an example of a screen display in a general icon selecting system.
Figure 14:
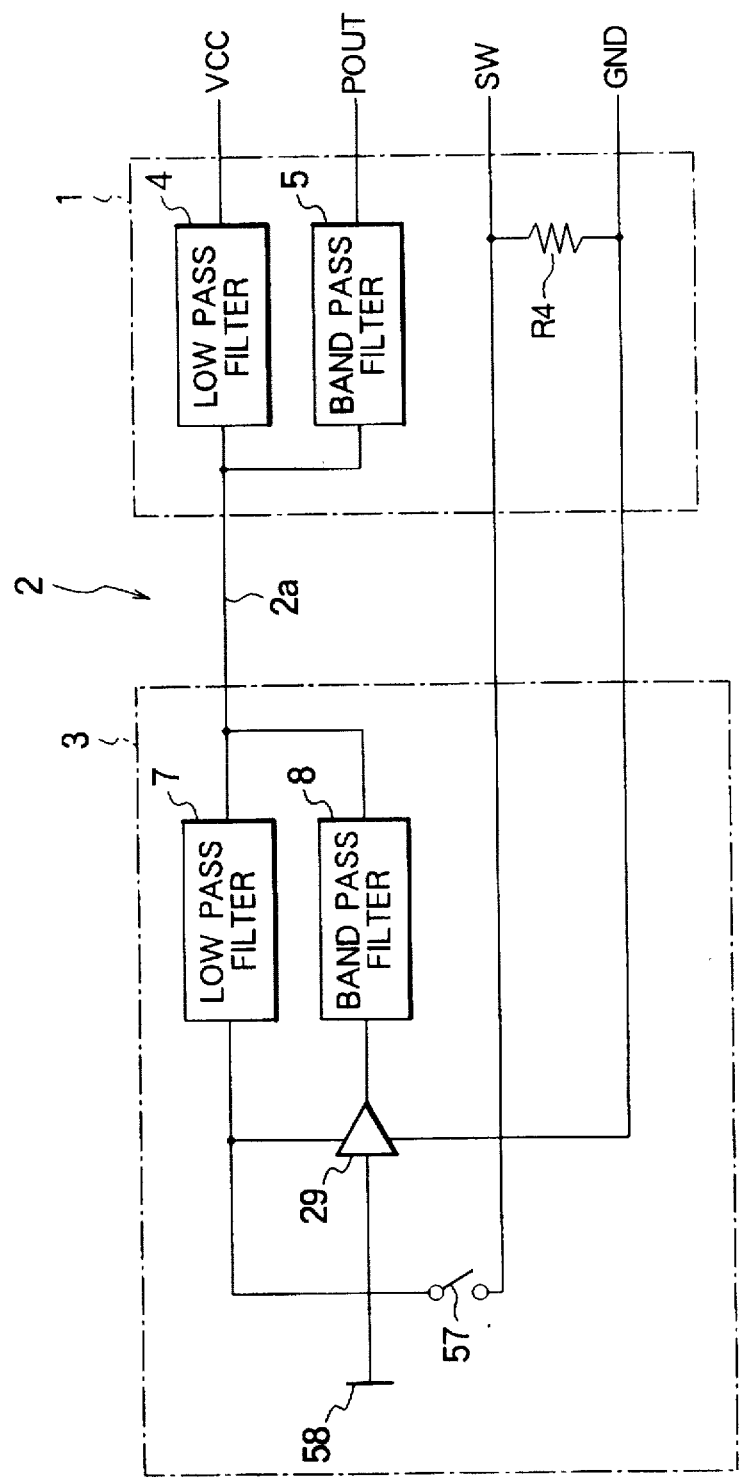
FIG. 14 is a block diagram showing a main portion of a coordinate inputting apparatus in accordance with a first embodiment of the present invention.

A coordinate inputting apparatus in accordance with a first embodiment of the present invention will first be described with reference to FIG. 14. This coordinate inputting apparatus approximately has the same entire schematic construction as the general coordinate inputting apparatus shown in FIG. 1. Accordingly, only constructional portions different from the general coordinate inputting apparatus will next be explained. The same constructional portions as FIG. 1 are designated by the same reference numerals and an explanation thereof is omitted in the following description.

The coordinate inputting apparatus in this embodiment has a separating circuit 1 for separating signals from each other, a cable 2 as a cable means and a position indicating pen 3 as a position indicating means. The cable 2 connects the separating circuit 1 and the position indicating pen 3 to each other. The separating circuit 1 has a low pass filter 4, a band pass filter 5 and a resistor R4. The low pass filter 4 removes an alternating current component from a signal transmitted to a signal line 2a. The band pass filter 5 passes only a position information signal in a frequency band from 10 kHz to 100 kHz with respect to the signal transmitted to the signal line 2a. The resistor R4 is connected to a switching signal line SW and a ground line GND. A power line VCC is connected to the low pass filter 4 and a position information signal line POUT is connected to the band pass filter 5. The cable 2 is constructed by the signal line 2a, the switching signal line SW and the ground line GND. The signal line 2a is used to supply power from an X-coordinate detecting circuit 30 and a Y-coordinate detecting circuit 31 as a coordinate detecting means to the position indicating pen 3. The signal line 2a is also used to transmit a detecting signal from the position indicating pen 3 to each of the X-coordinate detecting circuit 30 and the Y-coordinate detecting circuit 31. The position indicating pen 3 has a low pass filter 7 for removing an alternating current component from a signal transmitted through the signal line 2a and also has a band pass filter 8 for passing only a position information signal in a frequency band from 10 kHz to 100 kHz.

An operation of the coordinate inputting apparatus in this first embodiment will next be explained.

Figure 15A:
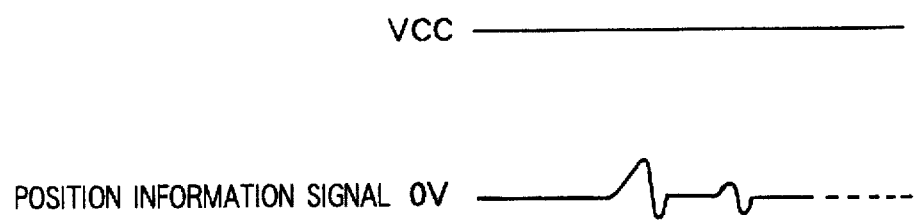
FIGS. 15a to 15c are explanatory views showing signals of the coordinate inputting apparatus in the first embodiment of the present invention.
Figure 15B:
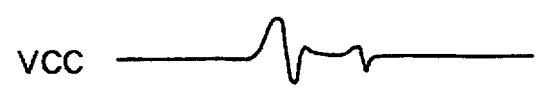
Figure 15C:
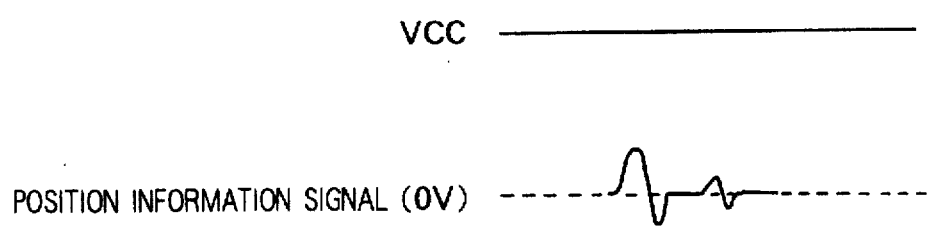

Only a low frequency band component of a power voltage from the power line VCC passes through the low pass filter 4 so that a signal waveform as shown in FIG. 15a is obtained. When the position indicating pen 3 comes in contact with the surface of a liquid crystal panel 42 and a switch 57 is turned on, a voltage having the signal waveform as shown in FIG. 15a is induced as a position information signal in an electrode 58 arranged in an end tip portion of the indicating pen 6 by a floating capacity between the electrode 58 of the indicating pen 6 and each of segment electrodes X1 to Xm and common electrodes Y1 to Yn to which a voltage is applied. The voltage induced in the indicating pen 6 is amplified by an amplifier 29 arranged within the indicating pen 6. Only a position information signal in the frequency band from 10 kHz to 100 kHz passes through the band pass filter 8 with respect to this amplified voltage signal. This position information signal is transmitted to the power line VCC and is superimposed on a power voltage signal. A signal transmitted to the signal line 2a has a signal voltage waveform as shown in FIG. 15b. In the separating circuit 1, the position information signal is separated from the signal on the signal line 2a by the band pass filter 5 as shown in FIG. 15c. This position information signal is then provided to each of the X-coordinate detecting circuit 30 and the Y-coordinate detecting circuit 31. X and Y coordinates are respectively calculated by the X-coordinate detecting circuit 30 and the Y-coordinate detecting circuit 31 on the basis of generation of the induced voltage of the indicating pen 6 and a timing signal from a control circuit 27.

Figure 16:
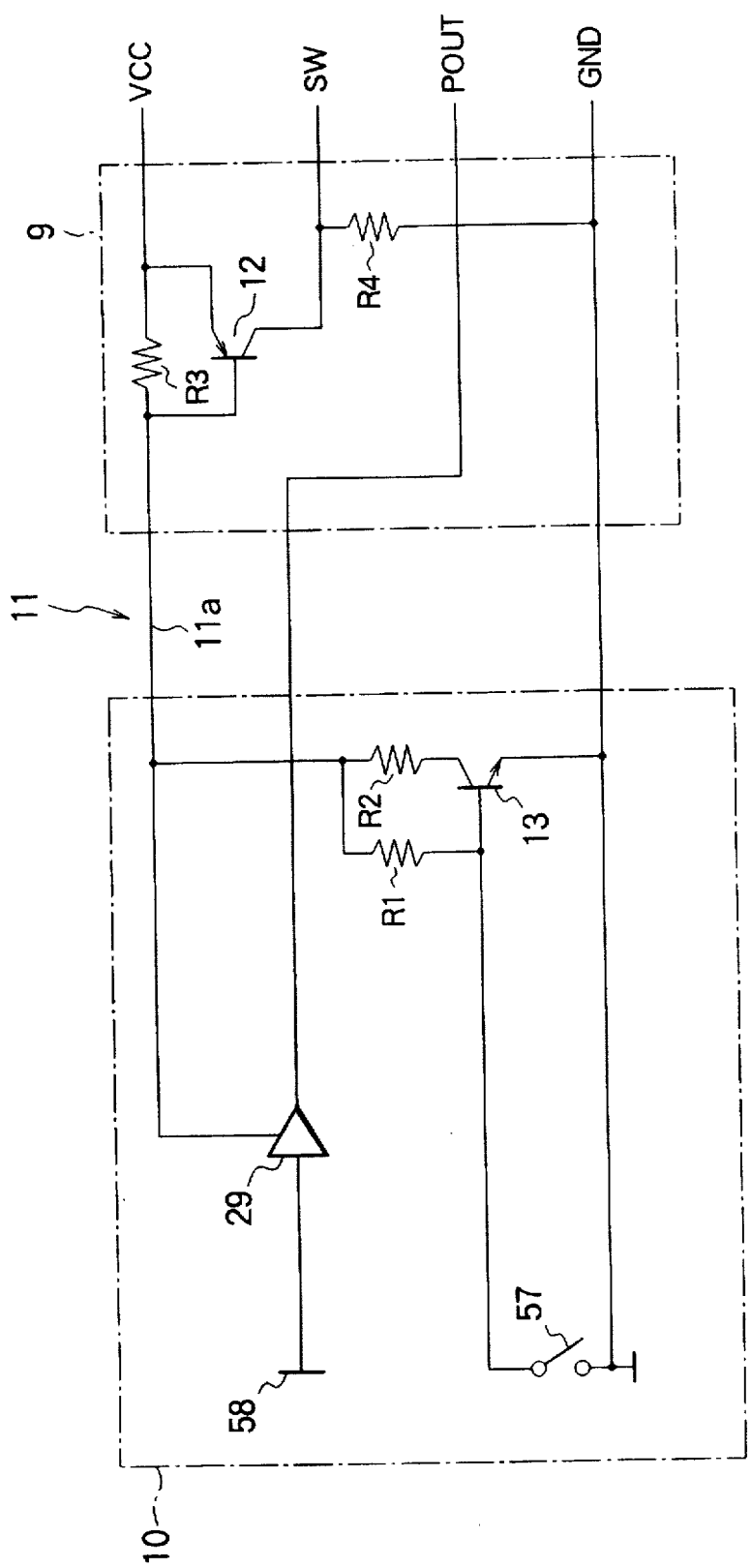
FIG. 16 is a block diagram showing a main portion of a coordinate inputting apparatus in accordance with a second embodiment of the present invention.

A coordinate inputting apparatus in accordance with a second embodiment of the present invention will next be explained with reference to FIG. 16.

The coordinate inputting apparatus in this second embodiment has a separating circuit 9 for separating signals from each other, a cable 11 as a cable means and a position indicating pen 10 as a position indicating means. The cable 11 connects the separating circuit 9 and the position indicating pen 10 to each other. The cable 11 is constructed by a signal line 11a used as both a power line VCC and a switching signal line SW, a position information signal line POUT and a ground line GND. The separating circuit 9 has a transistor 12. An emitter and a base of this transistor 12 are connected to the power line VCC. A collector of this transistor 12 is connected to the switching signal line SW. A resistor R3 is connected between the emitter and the base of the transistor 12. A resistor R4 is connected between the switching signal line SW and the ground line GND. A transistor 13 is arranged in the position indicating pen 10. An emitter of this transistor 13 is connected to the ground line GND. A collector of the transistor 13 is connected to the signal line 11a through a resistor R2. A base of the transistor 13 is connected to one terminal of a switch 57. A resistor R1 is connected between the base of the transistor 13 and the resistor R2.

An operation of the coordinate inputting apparatus in the second embodiment will next be explained.

Figure 17A:
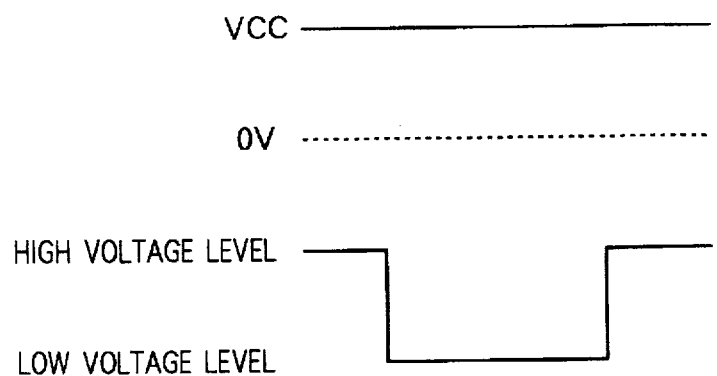
FIGS. 17a to 17c are explanatory views showing signals of the coordinate inputting apparatus in the second embodiment of the present invention.
Figure 17B:
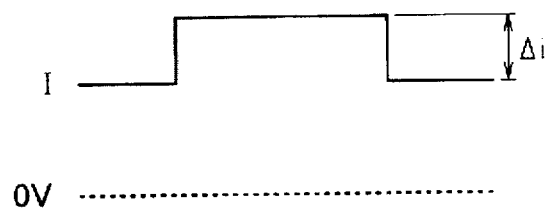
Figure 17C:
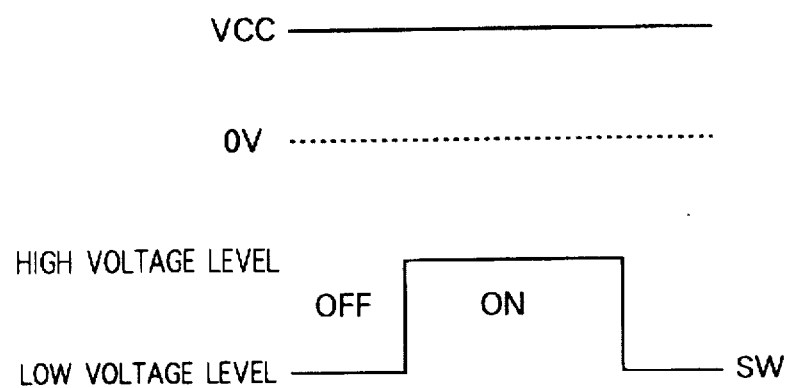

When the switch 57 is turned off, a voltage level of the transistor 13 is a high level. At this time, an operating state of the transistor 13 is an open state. When the position indicating pen 6 comes in contact with the surface of a liquid crystal panel 42, the switch 57 is turned on as shown in FIG. 17a. Thus, the transistor 13 attains a turning-on state so that an electric current flows through the resistor R2. When an increasing amount of this electric current is set to Δi, an electric current obtained by adding this increasing amount Δi to an electric current I corresponding to a power voltage flows through the signal line 11a as shown in FIG. 17b. When the position indicating pen 6 is separated from the liquid crystal panel 42, the voltage level of the transistor 13 is returned to the high voltage level. At this time, a voltage is induced in an electrode 58 arranged in an end tip portion of the indicating pen 6 by a floating capacity between the electrode 58 of the indicating pen 6 and each of segment electrodes X1 to Xm and common electrodes Y1 to Yn to which the voltage is applied. The voltage induced in the indicating pen 6 is amplified by an amplifier 29 arranged within the indicating pen 6 and is provided to each of an X-coordinate detecting circuit 30 and a Y-coordinate detecting circuit 31 through the position information signal line POUT of the cable 11. X and Y coordinates are respectively calculated by the X-coordinate detecting circuit 30 and the Y-coordinate detecting circuit 31 on the basis of generation of the induced voltage of the indicating pen 6 and a timing signal from a control circuit 27. When the switch 57 is turned off in the separating circuit 9, the following voltage Vbe $$Vbe = I \times R3$$

is applied between the base and the emitter of the transistor 12. However, the resistor R3 is determined such that no transistor 12 is turned on. When the switch 57 is turned on, the following voltage Vbe $$Vbe = (I + \Delta i) \times R3$$

is applied between the base and the emitter of the transistor 12. Accordingly, the voltage between the base and the emitter of the transistor 12 is increased by the following amount ΔV $$\Delta V = \Delta i \times R3$$

in comparison with the turning-off case of the switch 57. At this time, the resistor R3 is set such that the transistor 12 is turned on. When the resistor R3 is determined such that the transistor 12 is turned on, the switching signal SW is obtained as a low voltage level in a turning-off state of the switch 57 and a high voltage level in a turning-on state of the switch 57 as shown in FIG. 17c.

Figure 18:
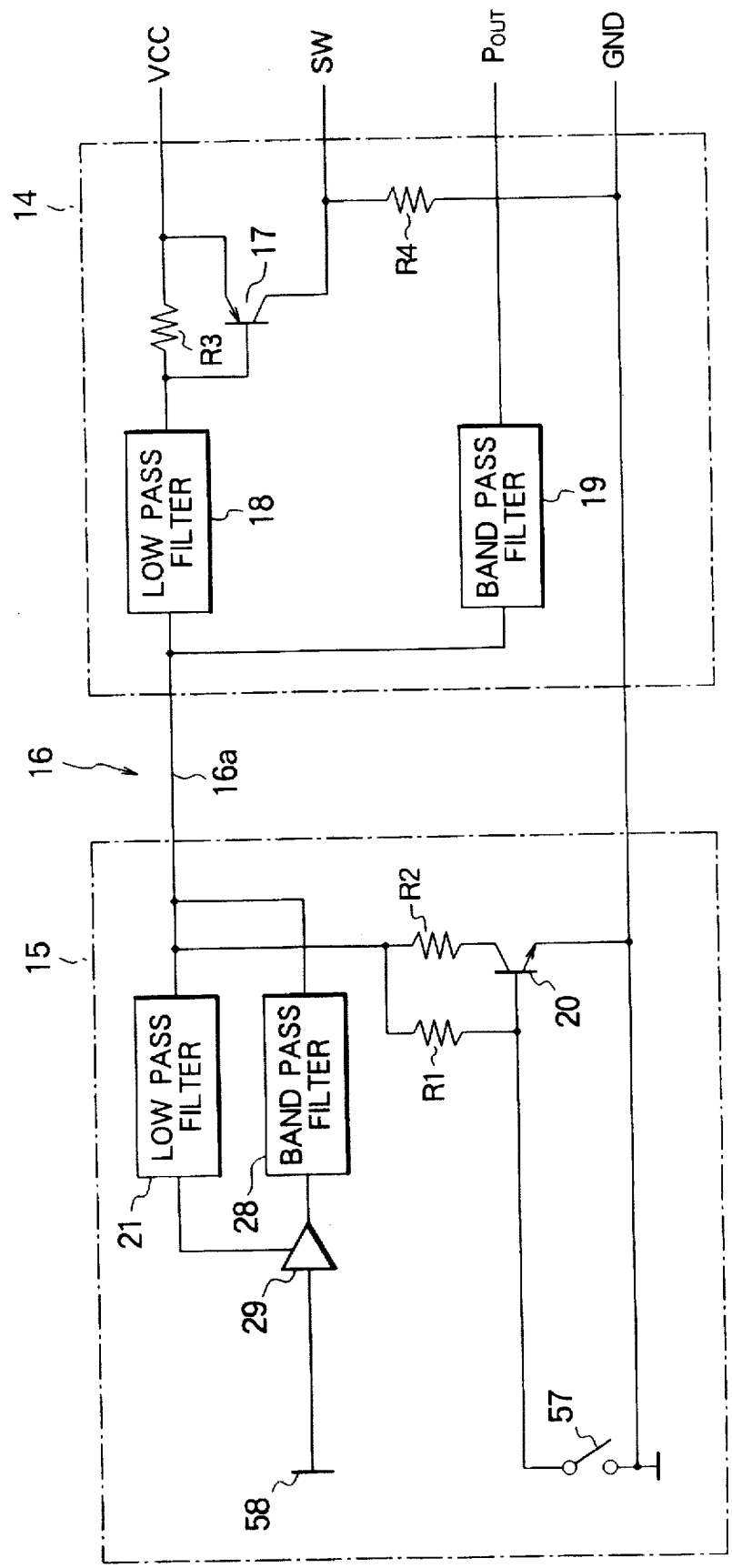
FIG. 18 is a block diagram showing a main portion of a coordinate inputting apparatus in accordance with a third embodiment of the present invention.

A coordinate inputting apparatus in a third embodiment of the present invention will next be explained with reference to FIG. 18.

The coordinate inputting apparatus in this third embodiment has a separating circuit 14 for separating signals from each other, a cable 16 as a cable means and a position indicating pen 15 as a position indicating means. The cable 16 connects the separating circuit 14 and the position indicating pen 15 to each other. The cable 16 is constructed by a signal line 16a used as a power line VCC, a switching signal line SW and a position information signal line POUT and is also constructed by a ground line GND. The separating circuit 14 has a transistor 17. An emitter and a base of this transistor 17 are connected to the power line VCC. A collector of this transistor 17 is connected to the switching signal line SW. A resistor R3 is connected between the emitter and the base of the transistor 17. A resistor R4 is connected between the switching signal line SW and the ground line GND. The separating circuit 14 has a low pass filter 18 for removing an alternating current component from a signal transmitted to the signal line 16a. The separating circuit 14 also has a band pass filter 19 for passing only a position information signal in a frequency band from 10 kHz to 100 kHz with respect to the signal transmitted to the signal line 16a. A transistor 20 is arranged in the position indicating pen 15. An emitter of this transistor 20 is connected to the ground line GND. A collector of the transistor 20 is connected to the signal line 16a through a resistor R2. A base of the transistor 20 is connected to one terminal of a switch 57. A resistor R1 is connected between the base of the transistor 20 and the resistor R2. The position indicating pen 15 has a low pass filter 21 for removing an alternating current component from a signal transmitted through the signal line 16a. The position indicating pen 15 also has a band pass filter 28 for passing only a position information signal in a frequency band from 10 kHz to 100 kHz.

An operation of the coordinate inputting apparatus in the third embodiment will next be explained.

Figure 19A:
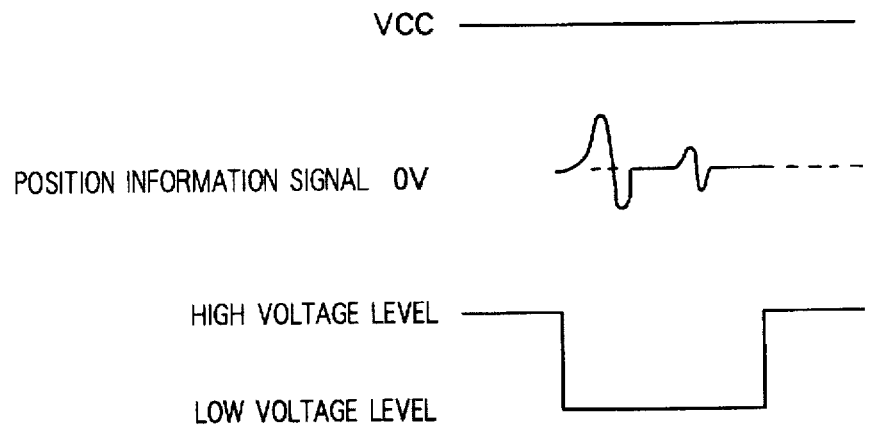
Figure 19B:
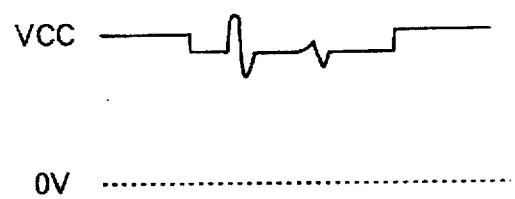
Figure 19A:
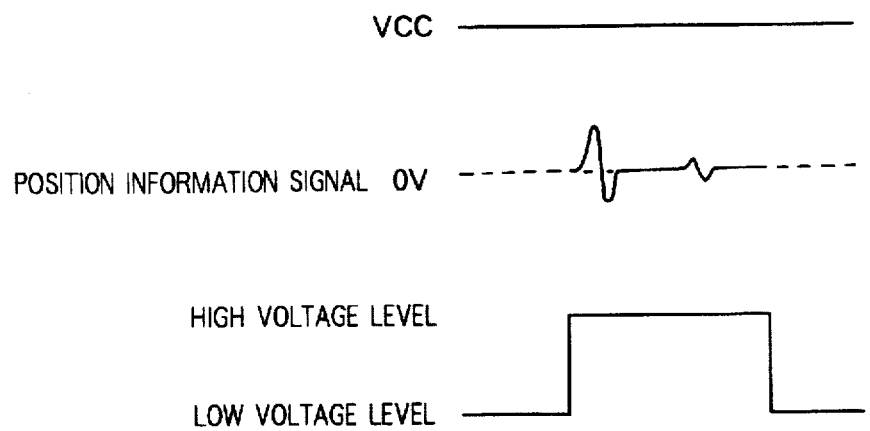

When the switch 57 is turned off, a voltage level of the transistor 20 is a high level. At this time, an operating state of the transistor 20 is an open state. When the position indicating pen 15 comes in contact with the surface of a liquid crystal panel 42, the switch 57 is turned on as shown in FIG. 19a. Thus, the transistor 20 attains a turning-on state so that an electric current flows through the resistor R2. When an increasing amount of this electric current is set to Δi, an electric current obtained by adding this increasing amount Δi to an electric current I corresponding to a power voltage flows through the signal line 16a. When the position indicating pen 15 is separated from the liquid crystal panel 42 in this case, the voltage level of the transistor 20 is returned to the high level. At this time, a voltage is induced in an electrode 58 arranged in an end tip portion of the indicating pen 15 by a floating capacity between the electrode 58 of the indicating pen 15 and each of segment electrodes X1 to Xm and common electrodes Y1 to Yn to which the voltage is applied. The voltage induced in the indicating pen 15 is amplified by an amplifier 29 arranged within the indicating pen 15. Only a position information signal in a frequency band from 10 kHz to 100 kHz passes through the band pass filter 28 with respect to this amplified voltage signal. As shown in FIG. 19b, the position information signal and a switching signal are superposed on the power voltage signal and are transmitted to the separating circuit 14 through the cable 16. In the separating circuit 14, a position information signal as shown in FIG. 19c is separated from a signal as shown in FIG. 19b by the band pass filter 19. This position information signal is provided to each of an X-coordinate detecting circuit 30 and a Y-coordinate detecting circuit 31. When the switch 57 is turned off in the separating circuit 14, the following voltage Vbe $$Vbe = I \times R3$$

is applied between the base and the emitter of the transistor 17. However, the resistor R3 is determined such that no transistor 17 is turned on. When the switch 57 is turned on, the following voltage Vbe $$Vbe = (I + \Delta i) \times R3$$

is applied between the base and the emitter of the transistor 17. Accordingly, the voltage between the base and the emitter of the transistor 17 is increased by the following amount ΔV $$\Delta V = \Delta i \times R3$$

in comparison with the turning-off case of the switch 57. At this time, the resistor R3 is set such that the transistor 17 is turned on. When the resistor R3 is determined such that the transistor 17 is turned on, the switching signal SW is obtained as a low voltage level in a turning-off state of the switch 57 and a high voltage level in a turning-on state of the switch 57 as shown in FIG. 19c. X and Y coordinates are respectively calculated by the X-coordinate detecting circuit 30 and the Y-coordinate detecting circuit 31 on the basis of generating timing of an induced voltage of the indicating pen 15 and a timing signal from a control circuit 27.

In accordance with a first construction of the present invention, a coordinate inputting apparatus has a signal line for supplying power from a coordinate detecting means to a position indicating means and transmitting a detecting signal from the position indicating means to the coordinate detecting means. Accordingly, the number of signal lines is reduced so that the diameter of a cable can be reduced. Further, the cable can be made soft by reducing the diameter of the cable so that it is possible to cope with an automatic reel mechanism.

In accordance with a second construction of the present invention, a coordinate inputting apparatus has a signal line for supplying power from a coordinate detecting means to a position indicating means and transmitting each of signals showing turning-on and turning-off states of a switching means from the position indicating means to the coordinate detecting means. Accordingly, the number of signal lines is reduced so that the diameter of a cable can be reduced. Further, the cable can be made soft by reducing the diameter of the cable so that it is possible to cope with an automatic reel mechanism.

In accordance with a third construction of the present invention, a coordinate inputting apparatus has a signal line for supplying power from a coordinate detecting means to a position indicating means and transmitting each of signals showing turning-on and turning-off states of a switching means from the position indicating means to the coordinate detecting means. This signal line is also used to transmit a detecting signal from the position indicating means to the coordinate detecting means. Accordingly, the number of signal lines is reduced so that the diameter of a cable can be reduced. Further, the cable can be made soft by reducing the diameter of the cable so that it is possible to cope with an automatic reel mechanism.

Figure 20:
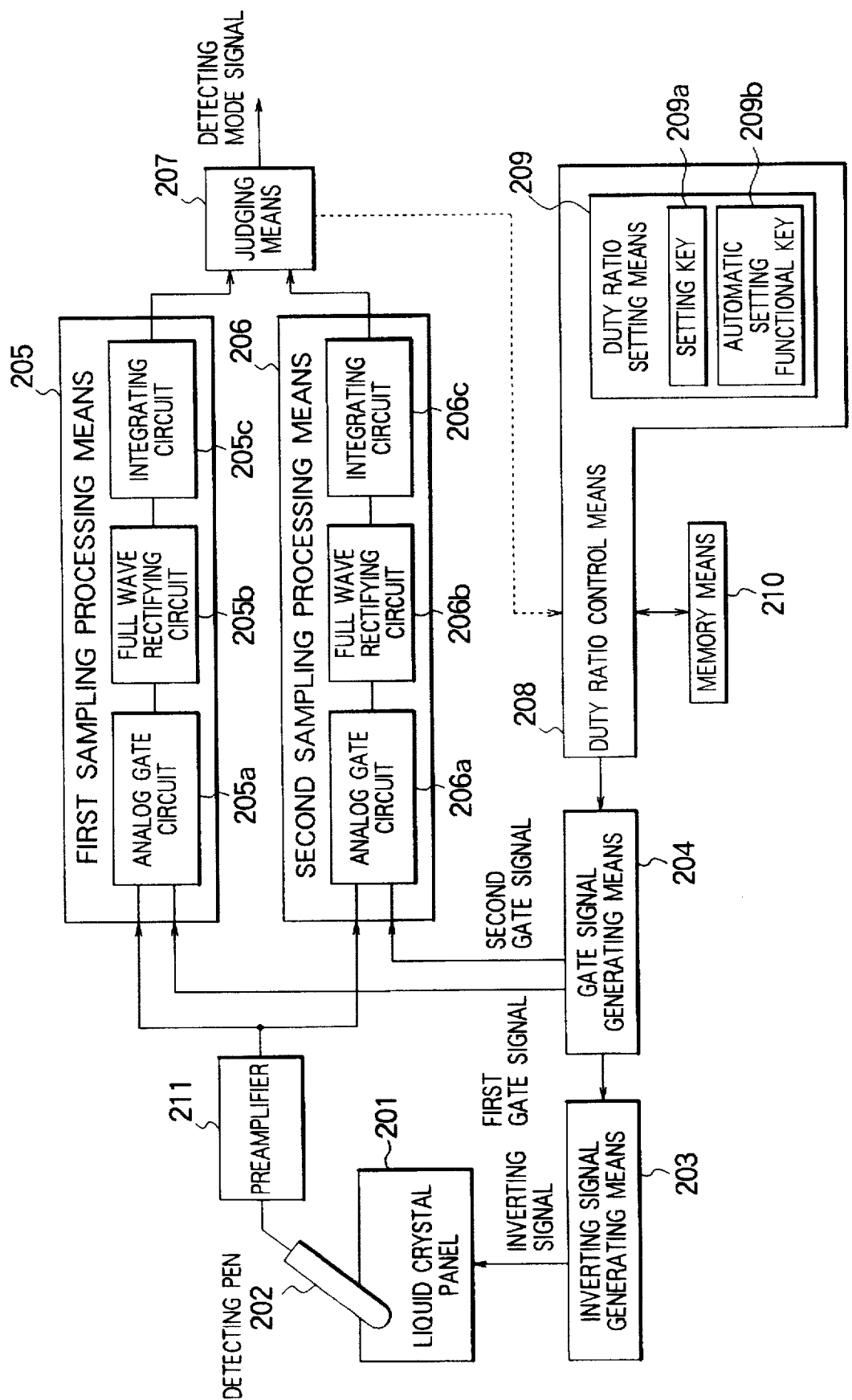
FIG. 20 is a block diagram showing the basic construction of a pen inputting apparatus in the present invention.

A technical means of the present invention for achieving the second object is provided as follows. FIG. 20 is a block diagram showing the basic construction of a pen inputting apparatus in the present invention. In FIG. 20, the pen inputting apparatus in the present invention comprises:

a liquid crystal panel 201 constructed by a liquid crystal and an electrode for operating this liquid crystal;

a detecting pen 202 having an end tip electrode electrostatically coupled to the electrode of the liquid crystal panel 201 and detecting an induced voltage induced at each of rising and falling times of a signal for operating the liquid crystal;

inverting signal generating means 203 for operating the liquid crystal of the liquid crystal panel 201 and generating an inverting signal for inverting applying directions of a voltage applied to the liquid crystal;

gate signal generating means 204 for generating a first gate signal synchronized with each of rise and fall of the inverting signal and a second gate signal provided except for a transmitting time of this first gate signal;

first sampling processing means 205 for sampling the induced voltage induced in the end tip electrode of the detecting pen 202 by the first gate signal and converting this induced voltage to a direct current voltage when the rise and fall of the inverting signal are changed;

second sampling processing means 206 for sampling an induced voltage induced after the sampling of the first sampling processing means 205 by the second gate signal;

the second sampling processing means 206 converting this induced voltage to a direct current voltage;

judging means 207 for judging whether or not an end tip of the detecting pen 202 approaches a display screen of the liquid crystal panel 201 on the basis of comparison of levels of the direct current voltages converted by the first and second sampling processing means 205 and 206;

the judging means 207 outputting results of this judgment as a detecting mode/nondetecting mode signal; and duty ratio control means 208 for controlling a duty ratio of the first and second gate signals generated by the gate signal generating means 204.

In this pen inputting apparatus, the duty ratio control means 208 controls sampling times of the gate signals supplied to the first and second sampling processing means 205 and 206 on the basis of a set duty ratio, and adjusts the levels of the direct current voltages converted by the first and second sampling processing means 205 and 206 so that the judging means 207 stably judges the detecting mode/nondetecting mode signal.

In accordance with the above construction, voltages for operating the liquid crystal are simultaneously changed by supplying an inverting signal for periodically inverting the applying directions of a voltage applied to the liquid crystal. When the detecting pen approaches a surface of the liquid crystal panel 201, a spike-shaped induced voltage is induced and this voltage depends on a distance between the end tip electrode of the detecting pen 202 and the electrode of the liquid crystal panel 201.

It is possible to set and change a duty ratio of a sampling time for sampling the induced voltage induced in the end tip electrode of the detecting pen 202 by the first gate signal and a sampling time for sampling the induced voltage by the second gate signal. Accordingly, it is possible to accurately judge times at which an end tip of the detecting pen 202 approaches the liquid crystal panel 201 and does not approach this liquid crystal panel 201 with respect to each of manufactured products having dispersion in accuracy of parts. Therefore, a stable detecting mode/nondetecting mode signal can be detected.

The duty ratio control means 208 preferably has duty ratio setting means 209 for setting the duty ratio by numeric value data. The duty ratio setting means 209 is constructed by a setting key 209a, etc.

Accordingly, the duty ratio of the first and second gate signals can be set and changed by numeric value data from the setting key 209a externally arranged so that a detecting mode/nondetecting mode signal suitable for each of manufactured products can be stably detected.

The duty ratio setting means 209 further preferably comprises an automatic setting functional key 209b for indicating an automatic setting function of the duty ratio. The duty ratio control means 208 preferably controls an operation of the gate signal generating means 204 such that the duty ratio of the gate signals is sequentially changed from predetermined numeric value data when the automatic setting function is indicated by the automatic setting functional key 209b and the detecting pen 202 approaches a predetermined region on the display screen of the liquid crystal panel 201. The duty ratio control means 208 also preferably detects the duty ratio of the gate signals when the judging means 207 outputs the detecting mode signal. The duty ratio control means 208 further preferably controls the gate signals by initializing numeric value data of this detected duty ratio.

Accordingly, the detecting mode signal is automatically detected and a duty ratio having high accuracy is set by only indicating the automatic setting function by the automatic setting functional key 209b and making the detecting pen 202 approach a predetermined region on the display screen of the liquid crystal panel 201.

Further, the pen inputting apparatus preferably has memory means 210 for storing the duty ratio by numeric value data.

Accordingly, the duty ratio setting means 209 can easily set and change the duty ratio by storing the duty ratio set from the setting key 209a externally arranged.

A time interval of the first gate signal generated by the above gate signal generating means 204 includes changing time points of rise and fall of the above inverting signal and is shorter than a half period of the inverting signal. A time interval of the second gate signal generated by the gate signal generating means 204 can be set to a time interval started after termination of the generation of the first gate signal and terminated until the inverting signal is changed.

Accordingly, an induced voltage caused by inverting the applying directions of a voltage applied to the liquid crystal can be sampled by the first gate signal. Further, an induced voltage caused by noises can be sampled by the second gate signal. Accordingly, it can be correctly judged whether an end tip of the detecting pen approaches the display screen of the liquid crystal panel or not.

Each of the inverting signal and the gate signals is preferably constructed by a clock signal forming a signal for operating the liquid crystal and is also preferably formed as a signal integer times this clock signal.

Accordingly, numeric value data of the duty ratio and the number of clock signals can be controlled in a state in which the numeric value data correspond to the number of clock signals.

It is preferable to further arrange a preamplifier 211 for amplifying the induced voltage induced in the end tip electrode of the detecting pen 202 in voltage and/or electric current.

Accordingly, each of the first and second sampling processing means 205 and 206 can stably sample the induced voltage since the preamplifier 211 amplifies the induced voltage induced in the end tip electrode of the detecting pen 202 in voltage and/or electric current.

The first sampling processing means 205 can be constructed by an analog gate circuit 205a for sampling the above induced voltage by the first gate signal, a full wave rectifying circuit 205b for making a full wave rectification of the sampled induced voltage, and an integrating circuit 205c for converting the full wave rectified induced voltage to a direct current voltage. The second sampling processing means 206 can be constructed by an analog gate circuit 206a for sampling the above induced voltage by the second gate signal, a full wave rectifying circuit 206b for making a full wave rectification of the sampled induced voltage, and an integrating circuit 206c for converting the full wave rectified induced voltage to a direct current voltage.

Accordingly, when each of the analog gate circuits 205a and 206a samples the induced voltage by each of the first and second gate signals, each of the full wave rectifying circuits 205b and 206b makes the full wave rectification with respect to the sampled induced voltage. The rectified induced voltage is then converted to a direct current voltage by each of the integrating circuits 205c and 206c.

In the present invention, the liquid crystal panel 201 has both a display electrode of the liquid crystal panel and a position detecting electrode of an electrostatic induction type tablet. The detecting pen 202 has an end tip electrode electrostatically coupled to the electrode of the liquid crystal panel and detecting an induced voltage induced at each of rising and falling times of a signal for operating the liquid crystal.

Each of the inverting signal generating means 203, the gate signal generating means 204, the duty ratio control means 208 and the memory means 210 uses a microcomputer composed of a CPU, a ROM, a RAM and an I/O port. In particular, the memory means 210 uses a ROM (E²PROM) in these elements.

The first sampling processing means 205 is constructed by the analog gate circuit 205a, the full wave rectifying circuit 205b and the integrating circuit 205c. The second sampling processing means 206 is constructed by the analog gate circuit 206a, the full wave rectifying circuit 206b and the integrating circuit 206c.

The judging means 207 uses a comparing circuit constructed by an operational amplifier.

The setting key 209a and the automatic setting functional key 209b of the setting means 209 use a keyboard. The preamplifier 211 uses an operational amplifier.

The preferred embodiments of a pen inputting apparatus in the present invention will next be described in detail with reference to FIGS. 21 to 24. The pen inputting apparatus in the present invention is not limited to these embodiments. The pen inputting apparatus in the present invention is suitably used as an apparatus for mainly inputting handwritten characters and figures to a tablet arranged on the display screen of a display unit of a personal computer, a word processor, etc. Each of constructional elements of the pen inputting apparatus constitutes a pen inputting apparatus capable of changing a setting condition for detecting a detecting mode signal in the present invention. Further, each of these constructional elements constitutes a pen inputting apparatus for obtaining a detecting mode signal (a pen input signal) which is not influenced by external noises.

Figure 21:
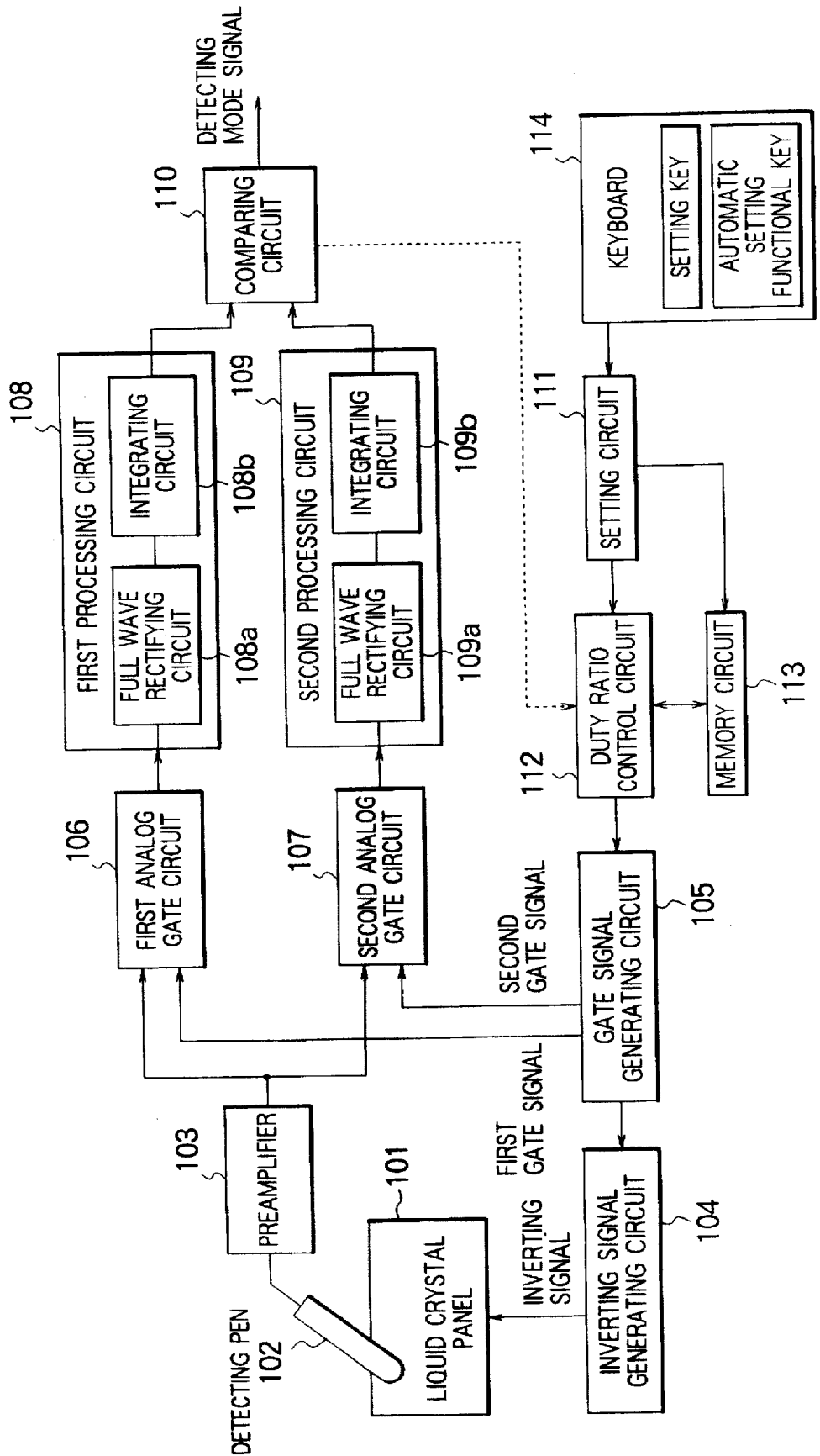
FIG. 21 is a block diagram showing the circuit construction of a pen inputting apparatus in accordance with one embodiment of the present invention.

FIG. 21 is a block diagram showing a pen inputting apparatus in accordance with one embodiment of the present invention.

In FIG. 21, a liquid crystal panel 101 is constructed by a liquid crystal and an electrode functioning as a display electrode for operating this liquid crystal and a position detecting electrode of an electrostatic induction type tablet.

A detecting pen 102 has an end tip electrode electrostatically coupled to the electrode of the liquid crystal panel. The detecting pen 102 detects induced voltages induced at rising and falling times of a signal for operating the liquid crystal when the detecting pen 102 approaches the liquid crystal panel 101.

A preamplifier 103 amplifies an induced voltage induced in the end tip electrode of the detecting pen 102 in voltage and/or electric current.

An inverting signal generating circuit 104 generates an inverting signal for operating the liquid crystal of the liquid crystal panel 101 and setting an inverting time point of applying directions of a voltage applied to the liquid crystal.

A gate signal generating circuit 105 generates a first gate signal synchronized with each of rise and fall of the inverting signal and a second gate signal provided except for a transmitting time of this first gate signal.

A first analog gate circuit 106 samples the induced voltage amplified in voltage and/or electric current by the first gate signal. A second analog gate circuit 107 samples the induced voltage amplified in voltage and/or electric current by the second gate signal. For example, each of the first analog gate circuit 106 and the second analog gate circuit 107 is constructed by an analog switch (FET).

A first processing circuit 108 is constructed by a full wave rectifying circuit 108a for making a full wave rectification with respect to the induced voltage sampled by the first gate signal. The first processing circuit 108 is also constructed by an integrating circuit 108b for converting the rectified induced voltage to a direct current voltage.

A second processing circuit 109 is constructed by a full wave rectifying circuit 109a for making a full wave rectification with respect to the induced voltage sampled by the second gate signal. The second processing circuit 109 is also constructed by an integrating circuit 109b for converting the rectified induced voltage to a direct current voltage.

Each of the full wave rectifying circuits 108a and 109a is constructed by a diode bridge, etc. For example, each of the integrating circuits 108b and 109b is constructed by an operational amplifier.

A comparing circuit 110 compares a level of the direct current voltage converted by the first processing circuit 108 with a level of the direct current voltage converted by the second processing circuit 109. The comparing circuit 110 also judges whether or not an end tip of the detecting pen 102 approaches the display screen of the liquid crystal panel 101. The comparing circuit 110 outputs a detecting mode/ nondetecting mode signal pm at a high or low voltage level by this comparison.

The comparing circuit 110 is constructed by an operational amplifier, but may be constructed by an A/D converting circuit and a microcomputer.

A setting circuit 111 sets a duty ratio. A duty ratio control circuit 112 controls the duty ratio. A memory circuit 113 stores the set duty ratio.

Each of the inverting signal generating circuit 104, the gate signal generating circuit 105, the setting circuit 111, the duty ratio control circuit 112 and the memory circuit 113 can be constructed by a microcomputer composed of a CPU, a ROM, a RAM, an I/O port, etc.

The duty ratio of the memory circuit 113 can be rewritten and initialized from the exterior thereof by arranging a ROM such as a rewritable and non-volatile E²PROM in the memory circuit 113.

A keyboard 114 includes a setting key 114a and an automatic setting functional key 114b.

Figure 22:
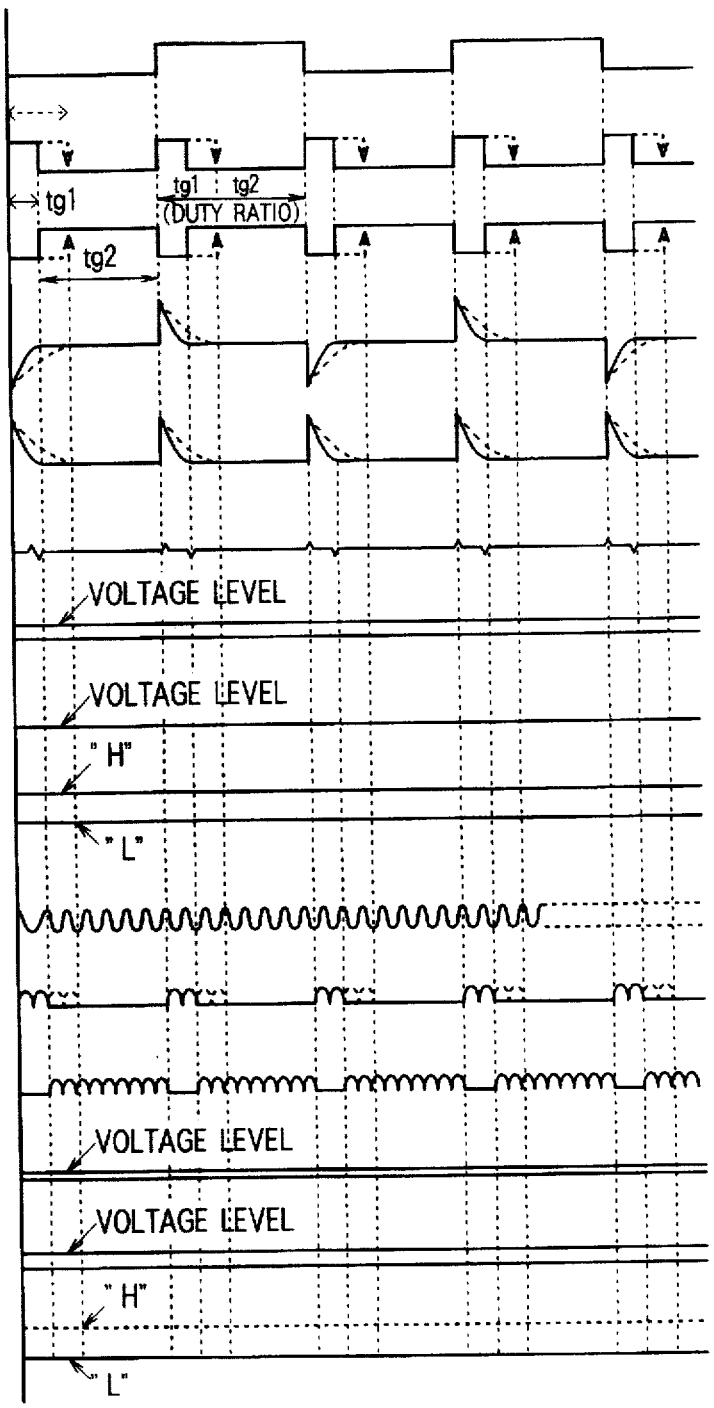
FIG. 22 is a timing chart showing each of waveforms of signals in the circuit construction of the pen inputting apparatus shown in FIG. 21 and timings of these signals.

FIG. 22 is a timing chart showing each of waveforms of signals in the circuit construction of the pen inputting apparatus shown in FIG. 21 and timings of these signals. These signals shown in FIG. 22 will next be explained.

An inverting signal "as" of (1) is generated from the inverting signal generating circuit 104. This inverting signal "as" is used to periodically invert applying directions of a voltage applied to the liquid crystal so as to prevent the liquid crystal of the liquid crystal panel from being deteriorated by electrolysis. At this time, the voltages of driving signals applied to the electrode of the liquid crystal panel are simultaneously changed.

A first gate signal g1 of (2) and a second gate signal g2 of (3) are generated from the gate signal generating circuit 105 and are respectively transmitted to the first analog gate circuit 106 and the second analog gate circuit 107. A duty ratio (tg1:tg2) of the first and second gate signals can be reset by a time constant of an induced voltage.

An induced voltage sk of (4) is obtained by inducing an induced voltage (an electrostatic induced voltage) having a spike shape and depending on a distance between the end tip electrode of the detecting pen 102 and the electrode of the liquid crystal panel 101 every time the applying directions of the voltage applied to the liquid crystal are inverted by the inverting signal "as" when the detecting pen 102 approaches the display screen of the liquid crystal panel 101.

A waveform of a sampling signal sp1 of (5) is obtained by sampling the induced voltage sk by the first gate signal g1 using the first analog gate circuit 106 and making a full wave rectification of this induced voltage sk by the full wave rectifying circuit 108a.

A waveform of a sampling signal sp2 of (6) is obtained by sampling the induced voltage sk by the second gate signal g2 using the second analog gate circuit 107 and making a full wave rectification of this induced voltage sk by the full wave rectifying circuit 109a.

A waveform of a signal dv1 of (7) is obtained by converting the full wave rectified sampling signal sp1 to a direct current voltage by the integrating circuit 108b.

A waveform of a signal dv2 of (8) is obtained by converting the full wave rectified sampling signal sp2 to a direct current voltage by the integrating circuit 109b.

An output signal pm1 of (9) is a signal obtained by comparing levels of the direct current voltages dv1 and dv2 with each other by the comparing circuit 110. The level of the direct current voltage dv1 is greater than the level of the direct current voltage dv2 so that a high ("H") voltage signal is outputted as a detecting mode signal. At this time, it can be judged that the detecting pen 102 approaches the liquid crystal panel 101.

For example, a noise signal ns of (10) shows a high frequency induced voltage. This noise signal ns shows one example of a signal waveform induced when the detecting pen 102 is separated from the display screen of the liquid crystal panel 101.

A waveform of a sampling signal sp3 of (11) is obtained by sampling the noise signal ns by the first gate signal g1 using the first analog gate circuit 106 and making a full wave rectification with respect to this noise signal by the full wave rectifying circuit 108a.

A waveform of a sampling signal sp4 of (12) is obtained by sampling the noise signal ns by the second gate signal g2 using the second analog gate circuit 107 and making a full wave rectification with respect to this noise signal by the full wave rectifying circuit 109a.

A waveform of a direct current voltage signal dv3 of (13) is obtained by converting the full wave rectified sampling signal sp3 to a direct current voltage by the integrating circuit 108b.

A waveform of a direct current voltage signal dv4 of (14) is obtained by converting the full wave rectified sampling signal sp4 to a direct current voltage by the integrating circuit 109b.

A detecting mode signal pm2 of (15) is an output signal obtained by comparing the levels of the direct current voltages dv1 and dv2 with each other by the comparing circuit 110. The level of the direct current voltage dv1 is lower than the level of the direct current voltage dv2 so that a low ("L") voltage signal is outputted as a nondetecting mode signal. At this time, it can be judged that the detecting pen 102 is separated from the liquid crystal panel 101.

Accordingly, the detecting pen 102 can correctly extract the detecting mode/nondetecting mode signal pm by removing the noise signal ns therefrom even when the detecting pen 102 is separated from the liquid crystal panel 101 and the noise signal ns is induced.

When the detecting pen 102 approaches a surface of the liquid crystal panel 101 in inversion of the applying directions of the voltage applied to the liquid crystal as mentioned above, a voltage sk having a spike shape is induced and this voltage sk depends on a distance between the end tip electrode of the detecting pen 102 and the electrode of the liquid crystal panel. It is judged by using this spike-shaped induced voltage sk whether or not the detecting pen 102 approaches the liquid crystal panel 101.

First, the spike-shaped induced voltage sk induced in the end tip electrode of the detecting pen 101 is sampled by each of the first and second gate signals g1 and g2 generated by the gate signal generating circuit 105 and each of the first and second analog gate circuits 106 and 107.

Next, a full wave rectification of the spike-shaped induced voltage sk as a sampled signal is made by the full wave rectifying circuits 108a and 109a in the first processing circuit 108 and the second processing circuit 109, respectively. The rectified voltage is converted to each of direct current voltages dv1 and dv2 by each of the integrating circuits 108b and 109b. These direct current voltages are compared with each other by the comparator 110. When the voltage dv1 of the sampling signal sampled by the gate signal g1 is higher than the voltage dv2, a detecting mode signal pm becomes a high ("H") voltage signal. Accordingly, it can be judged that the detecting pen 102 sufficiently approaches the liquid crystal panel 101.

In contrast to this, when the end tip electrode of the detecting pen 102 is separated from the liquid crystal panel 101 and a noise signal ns (as a noise of a high frequency induced voltage) is induced, the voltage dv2 of the sampling signal sampled by the second gate signal g2 is higher than the voltage dv1 so that the detecting mode signal pm does not become a high ("H") voltage signal, but becomes a low ("L") voltage signal.

Accordingly, when the detecting mode signal pm is a high voltage signal, it is considered to be continuously effective that a coordinate signal is detected from the detecting pen 102. In contrast to this, when a nondetecting mode signal is a low voltage signal, detection of the coordinate signal is stopped so that only correct coordinates can be detected.

Figure 23:
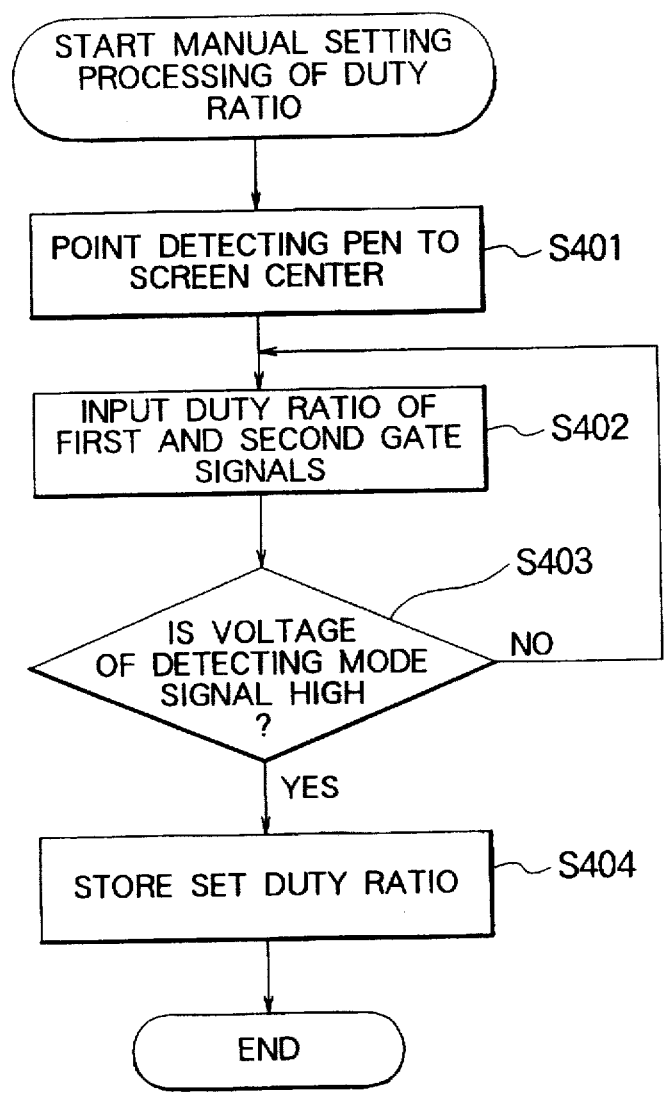
FIG. 23 is a flow chart showing processing for manually setting a duty ratio.

FIG. 23 is a flow chart showing processing for manually setting a duty ratio. FIG. 23 shows a method for directly inputting a set value of the duty ratio of the first and second gate signals for setting the detecting mode signal pm to a high voltage signal from the keyboard 114, etc. in a state in which an inputting operation of the detecting pen 102 is performed at a designating point on the display screen such as a central point of the display screen.

In a step S401, the inputting operation of the detecting pen 102 is performed at a designating point on the display screen of the liquid crystal panel such as a center of the display screen.

In a step S402, the duty ratio of the first and second gate signals is inputted to the pen inputting apparatus by numeric value data from the setting key 114a.

In a step S403, it is checked whether the detecting mode signal pm becomes a high voltage signal or not. The set duty ratio is changed until a pen input signal becomes a high voltage signal.

In a step S404, if the detecting mode signal pm becomes a high voltage signal, the setting operation of the duty ratio is completed so that numeric value data of this duty ratio are automatically stored to the memory circuit 113.

Figure 24:
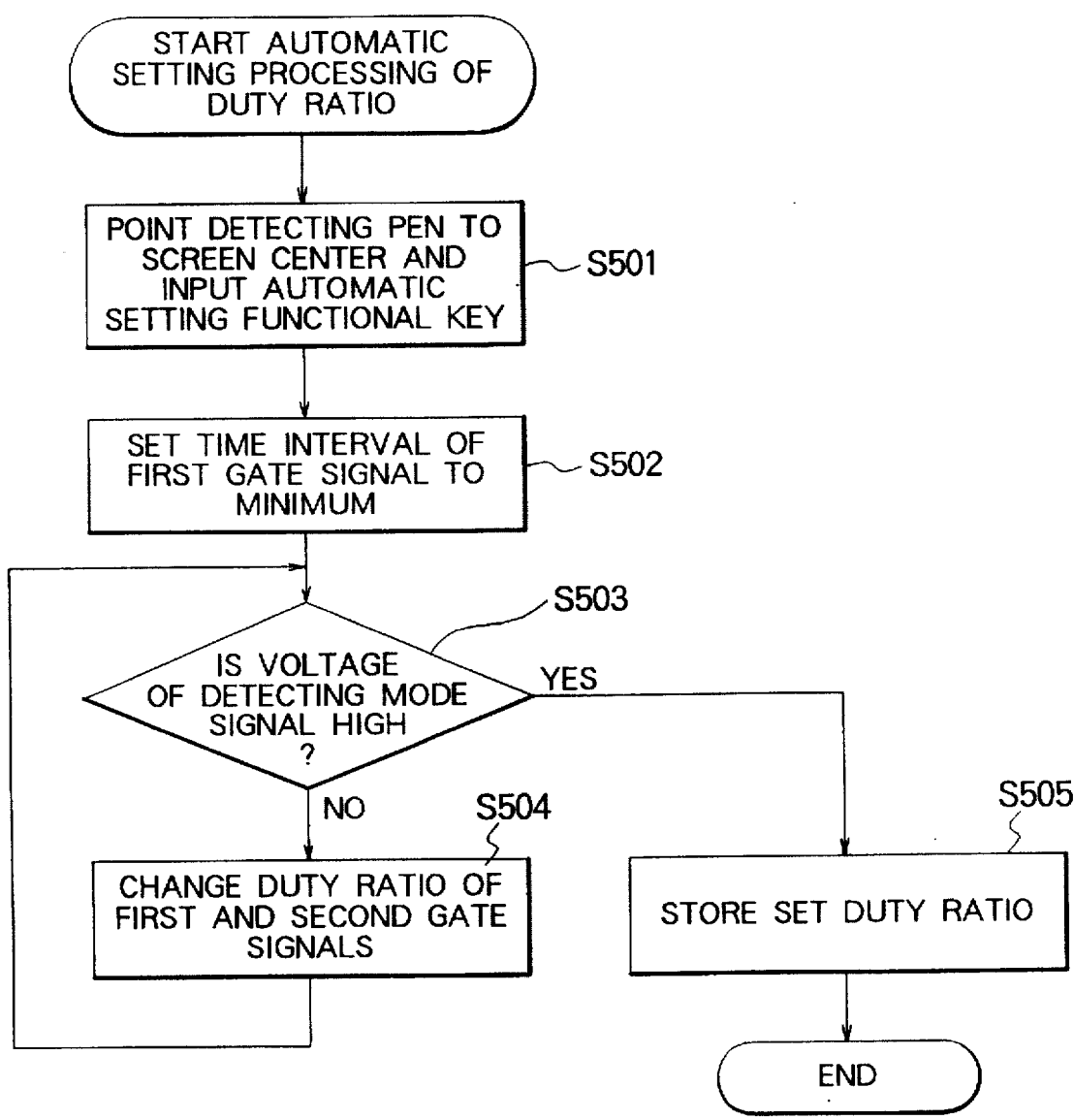
FIG. 24 is a flow chart showing processing for automatically setting the duty ratio.

FIG. 24 is a flow chart showing processing for automatically setting the duty ratio. FIG. 24 shows a method for automatically retrieving and storing a set value of the duty ratio of the first and second gate signals for setting the detecting mode signal pm to a high voltage signal in a state in which an inputting operation of the detecting pen 102 is performed at a designating point on the display screen such as a central point of the display screen.

In a step S501, the inputting operation of the detecting pen 102 is performed at a designating point on the display screen of the liquid crystal panel. The inputting operation of an automatic setting functional key 114b is then performed.

In a step S502, a sampling time (tg1) of the first gate signal g1 is set to be minimized.

In a step S503, it is checked whether the detecting mode signal pm becomes a high voltage signal or not.

In a step S504, the sampling time of the first gate signal g1 is gradually increased and the duty ratio is changed until the detecting mode signal pm becomes a high voltage signal.

In a step S505, if the detecting mode signal becomes a high voltage signal, the sampling time of the first gate signal g1 is fixed and the duty ratio (tg1:tg2) is determined. Numeric value data of this duty ratio is stored to the memory circuit 113 so that an automatic setting operation of the duty ratio is completed.

Accordingly, the duty ratio control circuit 112 adjusts the sampling times of the gate signals g1 and g2 supplied to the first and second analog gate circuits 106 and 107 by controlling an operation of the gate signal generating circuit 105 based on the set duty ratio so that levels of the direct current voltages dv1 and dv2 outputted from the first and second processing circuits 108 and 109 can be controlled.

Further, it is possible to accurately judge times at which an end tip of the detecting pen 102 approaches the liquid crystal panel 101 and does not approach this liquid crystal panel 101 with respect to each of manufactured products having dispersion in accuracy of parts. Accordingly, a stable detecting mode signal can be obtained.

The following effects can be obtained from the above-mentioned construction of the pen inputting apparatus in the present invention.

(1) Voltages for operating a liquid crystal are simultaneously changed by supplying an inverting signal for periodically inverting applying directions of a voltage applied to the liquid crystal. When a detecting pen approaches the surface of a liquid crystal panel, a spike-shaped induced voltage is induced and this voltage depends on a distance between an end tip electrode of the detecting pen and an electrode of the liquid crystal panel.

It is possible to change and control a duty ratio of a sampling time for sampling the induced voltage induced in the end tip electrode of the detecting pen by a first gate signal and a sampling time for sampling this induced voltage by a second gate signal. Accordingly, it is possible to accurately judge times at which an end tip of the detecting pen approaches the liquid crystal panel and does not approach this liquid crystal panel with respect to each of manufactured products having dispersion in accuracy of parts. Therefore, a stable detecting mode/nondetecting mode signal can be detected.

(2) If the duty ratio of the first and second gate signals is set and changed by numeric value data from a setting key externally arranged, a detecting mode/nondetecting mode signal suitable for each of manufactured products can be stably detected.

(3) When an automatic setting functional key is arranged, a detecting mode signal is automatically detected and a duty ratio having high accuracy can be set by only indicating an automatic setting function and making the detecting pen approach a predetermined region on the display screen of the liquid crystal panel.

(4) The duty ratio can be more easily set and changed if the duty ratio set from the setting key externally arranged is stored.

(5) The induced voltage caused by inverting the applying directions of the voltage applied to the liquid crystal is sampled by the first gate signal. An induced voltage caused by noises is sampled by the second gate signal. Accordingly, it can be correctly judged whether the end tip of the detecting pen approaches the display screen of the liquid crystal panel or not.

(6) A duty ratio having high accuracy can be set by controlling numeric value data of the duty ratio and the number of clock signals in a state in which the numeric value data correspond to the number of clock signals.

Figure 25:
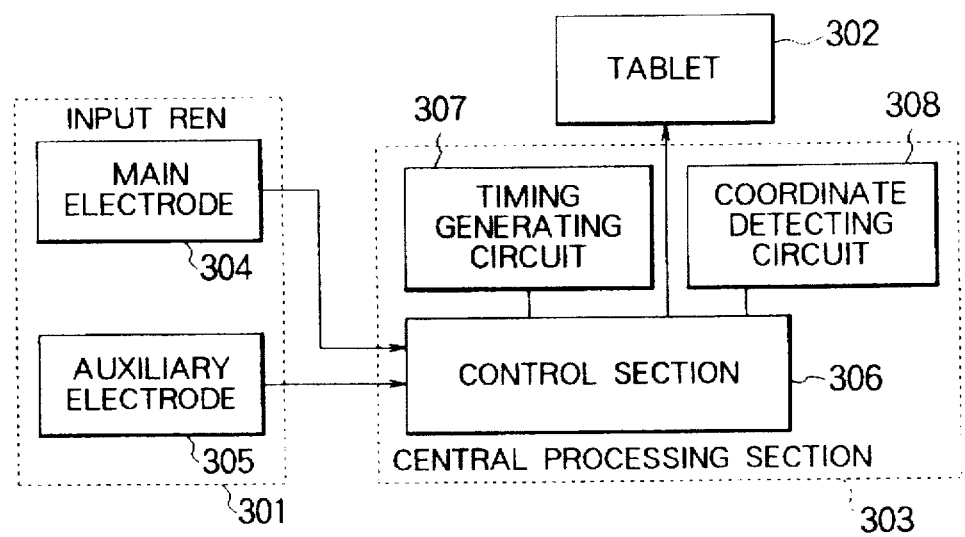
FIG. 25 is a block diagram of a tablet inputting apparatus in accordance with one embodiment of the present invention.

FIG. 25 is a block diagram of a tablet inputting apparatus in accordance with one embodiment of the present invention.

A tablet 302 is connected to a central processing section 303. As described later, an input pen 301 is constructed by a main electrode 304 projecting from an end tip of a pen shaft 310 and an auxiliary electrode 305 arranged in a peripheral portion of this main electrode 304. The auxiliary electrode 305 is slidably moved with respect to the pen shaft.

For example, a surface of the main electrode 304 is covered with an insulator made of resin as described later.

The central processing section 303 is constructed by a control section 306, a timing generating circuit 307, a coordinate detecting circuit 308, etc. X and Y coordinate signals are transmitted to the tablet 302 by timing control of the central processing section 303.

For example, the tablet 302 is constructed by a tablet of an electrostatic system as shown in Japanese Patent Application Laying Open (KOKAI) No. 5-53726.

Figure 26A:
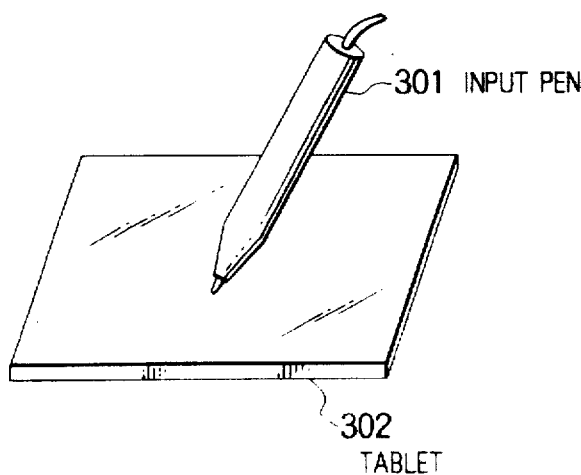
FIG. 26a is a perspective view of the tablet inputting apparatus in a using state thereof.
Figure 26B:
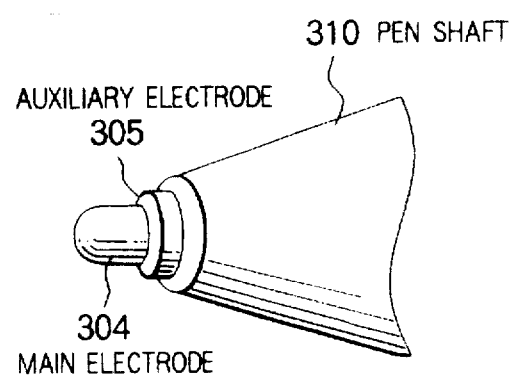
FIG. 26b is an enlarged perspective view of an end tip of an input pen in the tablet inputting apparatus.

FIG. 26a is a perspective view of the tablet inputting apparatus in a using state thereof. FIG. 26b is an enlarged perspective view of an end tip of the input pen 301 in the tablet inputting apparatus. The main electrode 304 covered with resin is arranged at an end tip of the pen shaft 310. The auxiliary electrode 305 is arranged around this main electrode 304. The auxiliary electrode 305 is slid with respect to the pen shaft 310. A spring is arranged within the pen shaft 310 so that the pen shaft 310 is moved up and down by increasing and decreasing a writing pressure. As shown in FIG. 26a, the input pen 301 is normally used in a state in which the input pen 301 is inclined with respect to the tablet 302. When characters are written with force, the pen shaft 310 is pressed against the tablet 302. For example, a liquid crystal plate is arranged on a surface of the tablet 302 so that characters, figures, etc. inputted with the input pen can be directly seen.

The auxiliary electrode 305 is actually arranged in a cylindrical shape in an outer circumference of the main electrode 304, but is not limited to this shape.

Figure 27A:
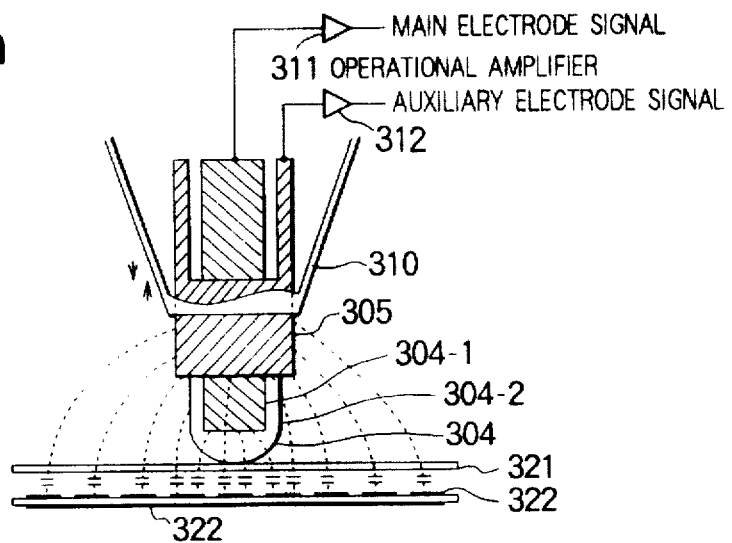
FIG. 27a is an explanatory view of the tablet inputting apparatus when a writing pressure is weak.
Figure 27B:
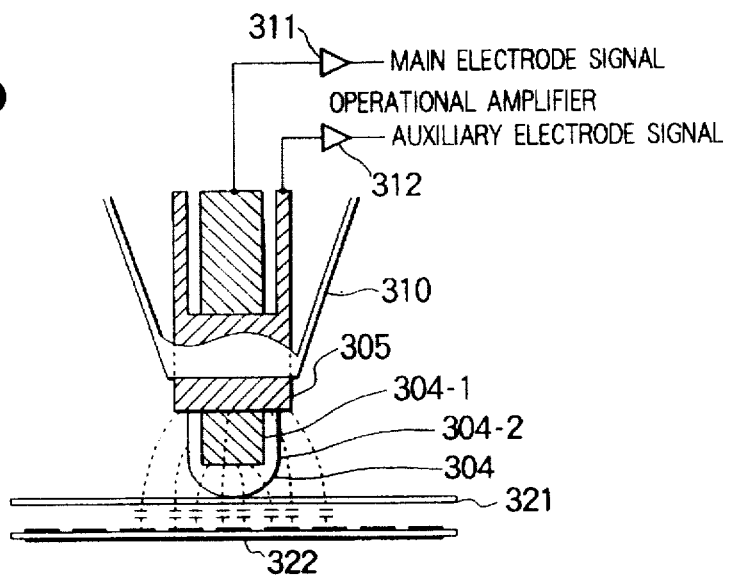
FIG. 27b is an explanatory view of the tablet inputting apparatus when the writing pressure is strong.
Figure 27C:
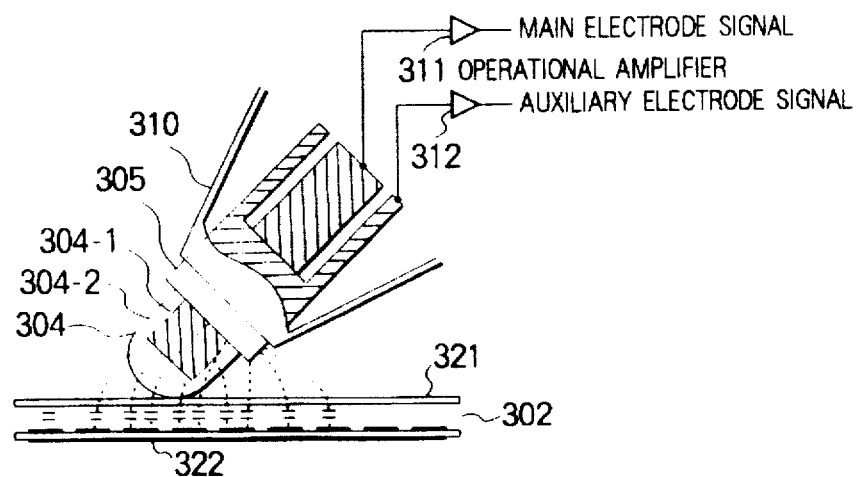
FIG. 27c is an explanatory view of the tablet inputting apparatus when a pen shaft is inclined.

Each of FIGS. 27a to 27c is a view for explaining a main portion of the tablet inputting apparatus when characters are inputted with the input pen. For example, the main electrode 304 is made of resin 304-2 in a portion thereof coming in contact with a glass plate 321 of a liquid crystal display portion on a surface of the tablet 302. A metallic bar 304-1 is arranged within the main electrode 304. An output of the main electrode 304 is transmitted to the central processing section 303 through an operational amplifier 311. The auxiliary electrode 305 is made of a metal and is attached to a peripheral portion of the resin portion 304-2 of the main electrode 304. For example, the pen shaft 310 formed by a dielectric substance is slid along the auxiliary electrode 305. An output of the auxiliary electrode 305 is transmitted to the central processing section 303 through an operational amplifier 312.

FIG. 27a shows a state in which the writing pressure is weak and the input pen vertically comes in contact with the tablet 302. FIG. 27b shows a state in which the writing pressure is strong and the input pen vertically comes in contact with the tablet 302. From comparison of FIGS. 27a and 27b, a portion of the auxiliary electrode 305 is hidden in the pen shaft 310 in FIG. 27b, and an electrostatic capacity between the auxiliary electrode 305 and a metallic electrode 322 within the liquid crystal display portion on the tablet surface is reduced.

FIG. 27c shows a case in which the writing pressure is strong and the input pen is inclined 45° with respect to the tablet 302. In FIGS. 27a and 27b, a shape of the electrostatic capacity is formed with right and left symmetry with respect to the main electrode. However, in FIG. 27c, no shape of the electrostatic capacity is formed with right and left symmetry with respect to the main electrode. This is because no peak of the electrostatic capacity provided by the main electrode 304 is in conformity with a peak of the electrostatic capacity provided by the auxiliary electrode 305 by inclining the pen shaft.

Figure 28A:
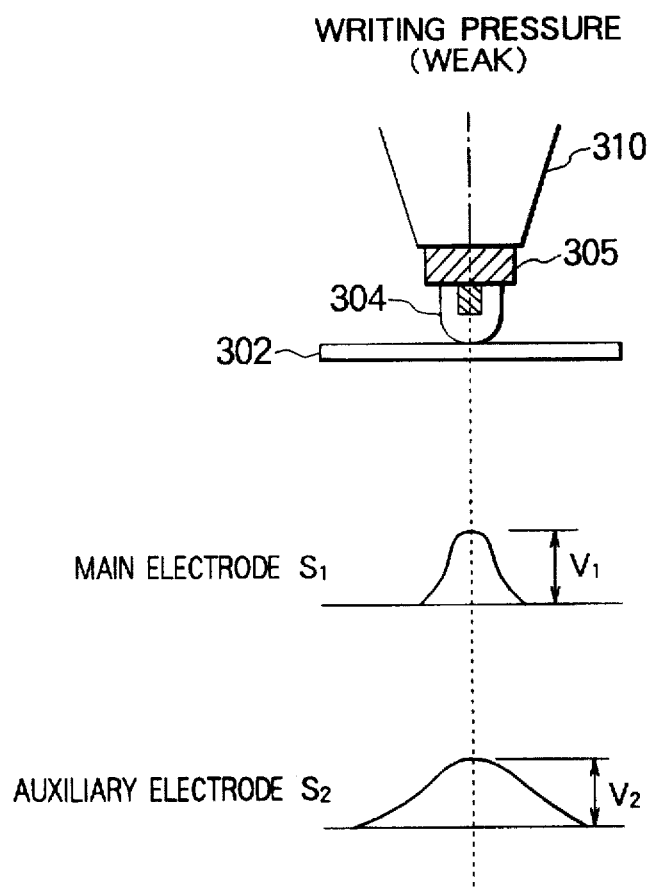
FIG. 28a is a graph showing an output waveform of each of electrodes of the tablet inputting apparatus when the writing pressure is weak.
Figure 28B:
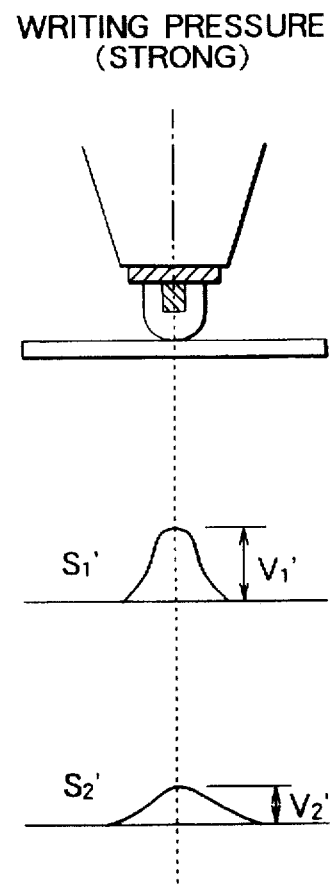
FIG. 28b is a graph showing an output waveform of each of the electrodes of the tablet inputting apparatus when the writing pressure is strong.

FIG. 28a shows waveforms of output signals provided by the main and auxiliary electrodes when the writing pressure is weak. FIG. 28b shows waveforms of output signals provided by the main and auxiliary electrodes when the writing pressure is strong. When the writing pressure is weak, a voltage $V_1$ of an output signal $S_1$ provided by the main electrode in FIG. 28a is similar to a voltage $V_{1'}$ of an output signal $S_{1'}$ provided by the main electrode when the writing pressure is strong in FIG. 28b. In contrast to this, when the writing pressure is weak, a voltage $V_2$ of an output signal $S_2$ provided by the auxiliary electrode in FIG. 28a is reduced like a voltage $V_{2'}$ of an output signal $S_{2'}$ provided by the auxiliary electrode when the writing pressure is strong in FIG. 28b.

FIG. 29a shows waveforms of output signals provided by the main and auxiliary electrodes when the input pen is vertically located with respect to the tablet 302. FIG. 29b shows waveforms of output signals provided by the main and auxiliary electrodes when the input pen is inclined 45° with respect to the tablet 302. In FIG. 29a, timing $t_1$ of a peak of an output signal $S_3$ provided by the main electrode is in conformity with timing $t_1$ of a peak of an output signal $S_4$ provided by the auxiliary electrode.

In FIG. 29b, the pen shaft is inclined and a right-hand end of the auxiliary electrode approaches the tablet so that peaks of the output signals are moved. Accordingly, a time difference is caused between timing $t_2$ of a peak of an output signal $S_{3'}$ provided by the main electrode and timing $t_3$ of a peak of an output signal $S_{4'}$ provided by the auxiliary electrode. This is because detecting coordinates provided by the main and auxiliary electrodes are different from each other since X and Y coordinate signals are transmitted by time division every row of the tablet as mentioned above.

The above explanation relates to cases in which the input pen is vertically located and is inclined 45° with respect to the tablet. However, an arbitrary angle of the input pen with respect to the tablet can be set to an inclination angle in a standard state in accordance with differences in habit when the detecting pen is individually used.

As mentioned above, the tablet inputting apparatus in the present invention can determine position coordinates of characters and figures to be inputted by the main electrode. The tablet inputting apparatus can detect two kinds of data composed of data showing large and small output signals provided by differences in electrostatic capacity between the tablet and the main and auxiliary electrodes, and data showing time differences between peaks of output signals of the main and auxiliary electrodes. Accordingly, a line width and a density of characters can be further precisely expressed. In the above explanation, the writing pressure and the inclination of the input pen are detected in the central processing section. However, means for detecting the writing pressure and inclination information of the input pen can be also arranged within the input pen.

The tablet of an electrostatic system is explained in the above-mentioned embodiments of the tablet inputting apparatus. However, the above embodiments can be also applied to a tablet of another system if the main and auxiliary electrodes are used and it is possible to detect large and small output signals caused by the writing pressure using the pen shaft and time differences between peaks of output signals of the main and auxiliary electrodes provided by inclining the pen shaft.

In the above embodiments, the electrostatic capacity is changed by moving the pen shaft and covering the auxiliary electrode. However, the auxiliary electrode can be also arranged at an end tip of the pen shaft slid with respect to the main electrode. In this case, a change in electrostatic capacity can be detected by a change in distance between the auxiliary electrode and the tablet.

In accordance with the present invention, data of both the writing pressure applied to the pen shaft and the inclination of the pen shaft can be obtained by the main and auxiliary electrodes. Accordingly, a line width and a density of inputted characters can be further accurately displayed. For example, wide and narrow widths of lines, etc. can be adjusted by a density and an inclination of characters by a detected writing pressure.

Figure 30:
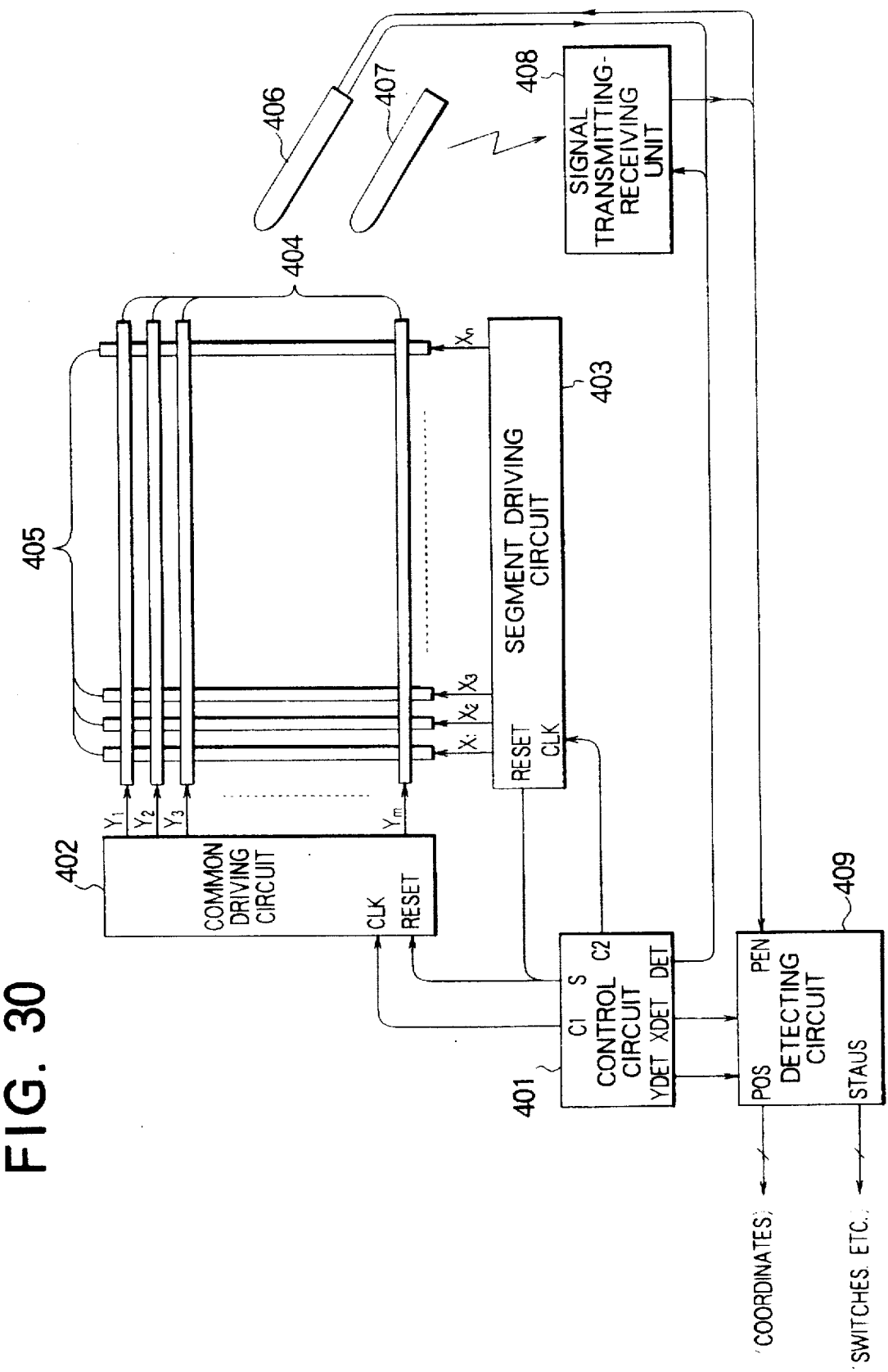
FIG. 30 is a view for explaining the construction of a coordinate inputting apparatus in accordance with one embodiment of the present invention.

FIG. 30 is a view for explaining the construction of a coordinate inputting apparatus in accordance with one embodiment of the present invention. FIG. 30 shows one example of an electrostatic induction type tablet. In FIG. 30, reference numerals 401, 402 and 403 respectively designate a control circuit, a common driving circuit and a segment driving circuit. Reference numerals 404, 405 and 406 respectively designate common electrodes Y1 to Ym, segment electrodes X1 to Xn and a wire pen. Reference numerals 407, 408 and 409 respectively designate a cordless detecting pen, a signal transmitting-receiving unit and a detecting circuit.

Figure 35:
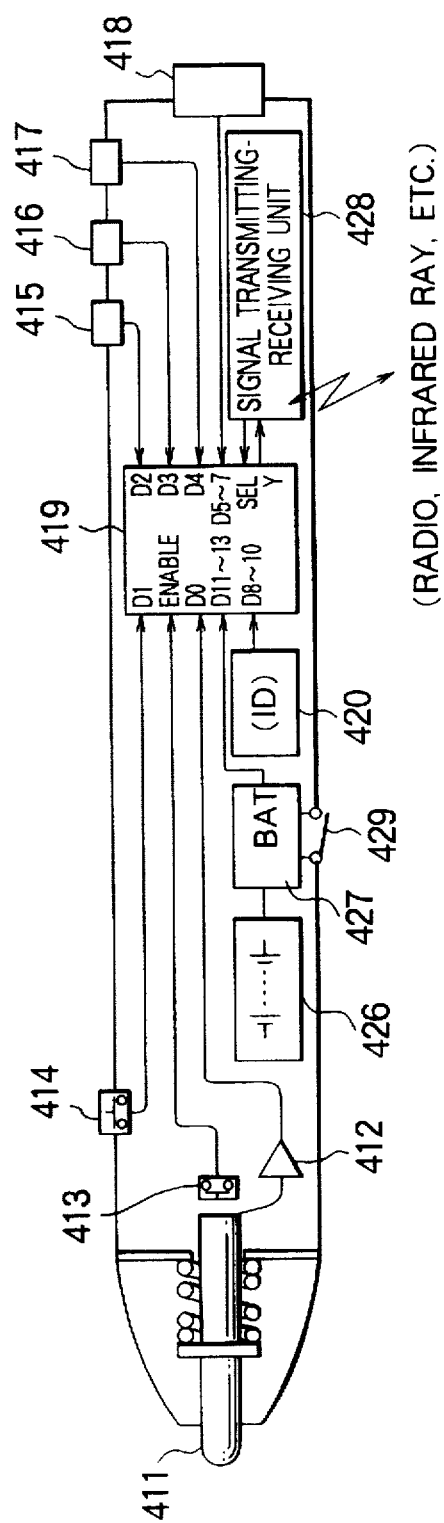
FIG. 35 is a view showing a cordless system detecting pen in accordance with another embodiment of the present invention.

A tablet has a grid of n×m units constructed by the common electrodes 404 arranged in a Y-direction and the segment electrodes 405 arranged in an X-direction. In FIG. 30, the segment electrodes 405 are located on an X-side and the common electrodes 404 are located on a Y-side. This is because reference numerals common to those of an LCD tablet in an embodiment of the present invention shown in FIG. 35 are used for convenience. These common and segment electrodes are respectively turned on or off by the common driving circuit 402 and the segment driving circuit 403.

The control circuit 401 performs timing control for operating each of the driving circuits 402 and 403 and the detecting pens 406 and 407. The detecting pen is constructed by a detecting pen 406 of a wire system connected to an apparatus body through a cable and a detecting pen 407 of a cordless system for transmitting and receiving data by a radio, an infrared ray, etc. One of the wire system and the cordless system is normally used. However, it is possible to use a system in which a plurality of detecting pens can be used. A body of the cordless system using the detecting pen 407 has the signal transmitting-receiving unit 408 for communicating with the detecting pen 407. A signal directly transmitted from the detecting pen 407 or transmitted through the signal transmitting-receiving unit 408 is separated and converted to coordinate data and various kinds of additional information by the detecting circuit 409.

Figure 31:
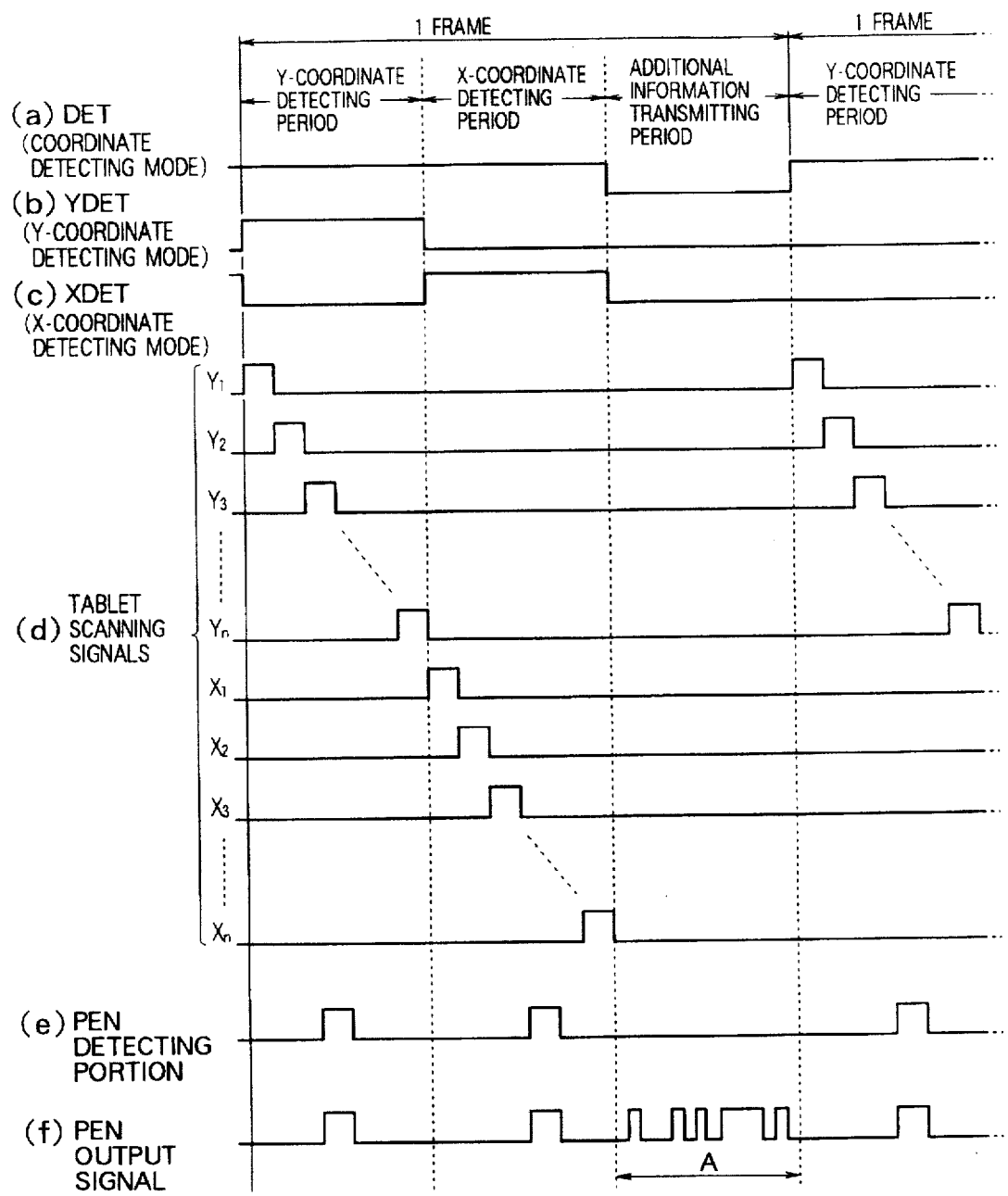
FIG. 31 is a view showing operating timings of signals in the coordinate inputting apparatus shown in FIG. 30.

FIG. 31 is a view showing operating timings of signals in the coordinate inputting apparatus shown in FIG. 30.

One cycle of a systematic operation of the coordinate inputting apparatus is shown as one frame in FIG. 31 and is constructed by three periods composed of a Y-coordinate detecting period, an X-coordinate detecting period and an additional information transmitting period. The control circuit 401 controls the systematic operation by outputting a signal YDET (shown in FIG. 31(b)) for prescribing the Y-coordinate detecting period, a signal XDET (shown in FIG. 31(c)) for prescribing the X-coordinate detecting period and a signal DET (shown in FIG. 31(a)) for prescribing the entire coordinate detecting periods.

As shown in FIG. 31(d), the electrodes Y1 to Ym at Y-coordinates are sequentially turned on in the Y-coordinate detecting period, and the electrodes X1 to Xn at X-coordinates are sequentially turned on in the X-coordinate detecting period. As shown in FIG. 31(e), a detecting portion of the detecting pen outputs a signal when an electrode closest to a pen tip is turned on. Accordingly, it is possible to discriminate a position of the pen tip on the tablet by timing of the signal from the detecting pen. Concretely, a Y-coordinate is shown by a time from rise of the signal YDET to rise of the pen signal and an X-coordinate is shown by a time from rise of the signal XDET to rise of the pen signal.

Figure 32:
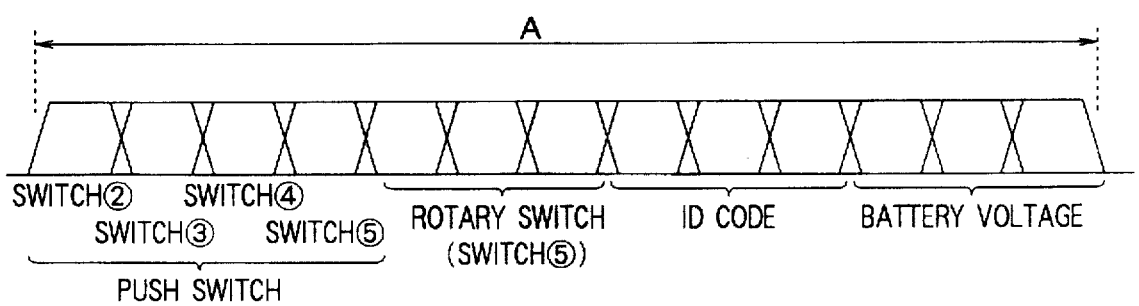
FIG. 32 is an enlarged view of a portion A shown in FIG. 31.

When the pen signal never has a high voltage during the period of a high voltage level of the signal YDET, it can be judged that the pen tip is separated from the tablet. The same arguments can also hold true with respect to the signal XDET. The additional information transmitting period is a period for receiving additional information from the detecting pen. As shown in FIG. 31(f) and FIG. 32, the detecting pen outputs additional information in this additional information transmitting period. FIG. 32 is an enlarged view of a portion A shown in FIG. 31.

The detecting circuit 409 extracts coordinate information and the additional information from the output signal of the detecting pen. The detecting circuit 409 obtains the Y-coordinate from the time from rise of the signal YDET to rise of the pen signal and obtains the X-coordinate from the time from rise of the signal XDET to rise of the pen signal. The detecting circuit 409 has an internal clock for measuring each of these times. The detecting circuit 409 interprets the pen signal from fall of the signal XDET as additional information. The detecting circuit 409 also has a second internal clock having the same frequency as an additional information transfer clock of the detecting pen to separate bits of the additional information serially transmitted from each other.

Figure 33:
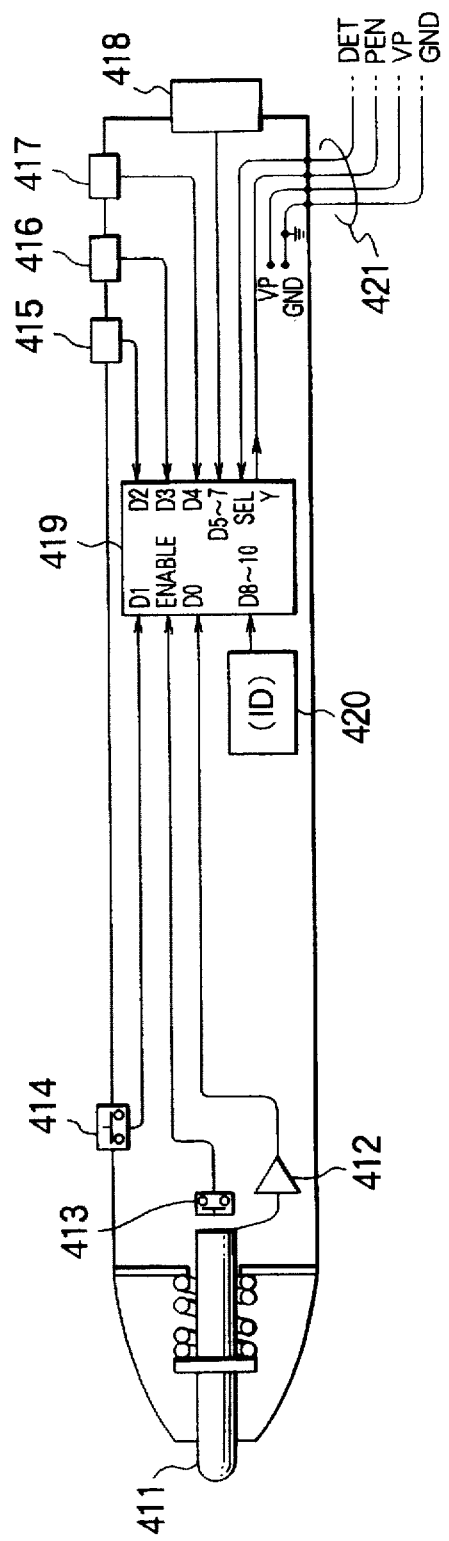
FIG. 33 is a view showing a wire system detecting pen in accordance with one embodiment of the present invention.

FIG. 33 is a view showing a first embodiment of the detecting pen of a wire system. In FIG. 33, reference numerals 411, 412 and 413 respectively designate a pen tip as a detecting portion, a comparator and a first switch (a pen down switch: switch ①). Reference numerals 414, 415 and 416 respectively designate a second switch (switch ②), a third switch (switch ③) and a fourth switch (switch ④). Reference numerals 417 and 418 respectively designate a fifth switch (switch ⑤) and a sixth switch (a rotary switch: switch ⑥). Reference numerals 419 and 420 respectively designate an output selecting circuit and an ID code generating circuit. Reference numeral 421 designates a pen connecting cable and a connector. Each of reference numerals 414 to 417 designates a push switch.

The end tip portion 411 of the detecting pen is capacity-coupled to each of electrodes 404 and 405 of a tablet. The comparator 412 detects a peak of an induced voltage caused in the end tip portion of the detecting pen by a scanning signal of a tablet electrode. The comparator 412 then outputs a logic signal having each of high and low voltage levels. The comparator 412 outputs a high voltage signal at a peak detecting time. The detecting pen has the pen down switch 413 for detecting a press in the end tip portion of the detecting pen. The detecting pen also has the push switches 414 to 417 and the rotary switch 418 operated by a user and has the ID code generating circuit 420 for outputting an ID code of the detecting pen. Uses of the push switches 414 to 417 and the rotary switch 418 are determined at application levels and are not limited particularly in this embodiment. Selection of a color and a thickness of a drawn line, switching of writing (posting) and erasing modes, etc. are considered as the uses of these switches.

These information composed of a coordinate detecting signal as a comparator output, an operating state of each of the push switches and the rotary switch and the ID code are selected by the output selecting circuit 419 and are sequentially outputted. The connecting cable 421 is constructed by four lines composed of an output selecting signal line, an output signal line and two power lines. The connecting cable 421 is connected to the detecting pen through a connector so that the detecting pen can be easily attached, detached and exchanged.

Figure 34:
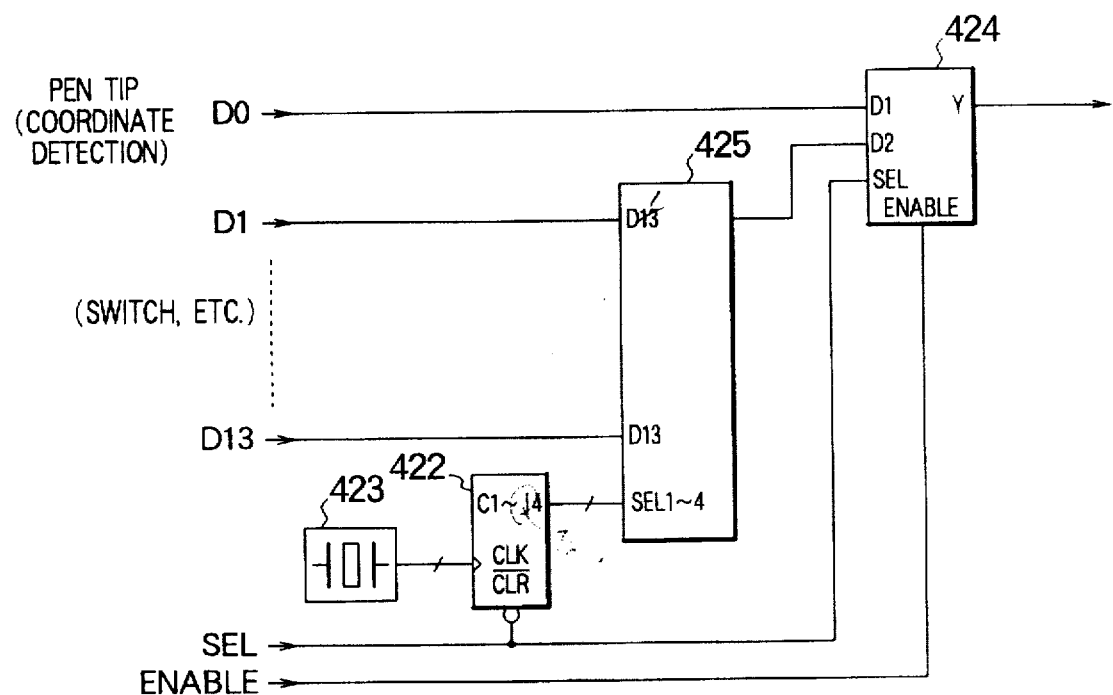
FIG. 34 is a detailed view of an output selecting circuit of the detecting pen shown in FIG. 33.

FIG. 34 is a detailed view of the output selecting circuit shown in FIG. 33. In FIG. 34, reference numerals 422, 423, 424 and 425 respectively designate a counter, an oscillator, a multiplexer (A) and a multiplexer (B).

No output selecting circuit outputs a signal when the pen down switch 413 is turned off. The output selecting circuit performs the following operation when the pen down switch 413 is turned on. The multiplexer 424 selects a signal from the pen end tip portion/comparator (coordinate detecting portion) when an input selecting signal SEL (transmitted as a signal DET from the control circuit) has a low voltage, i.e., in the coordinate detecting period. In contrast to this, the multiplexer 424 selects an output of the multiplexer 425 when the signal SEL(DET) has a high voltage, i.e., in the additional information transmitting period. Input selection of the multiplexer 425 is determined by the counter 422.

The counter 422 is in a reset state while the signal SEL has a low voltage. The counter 422 counts up by the oscillator 423 in a period in which the signal SEL has a high voltage. With respect to inputs of the multiplexer 424, operating states of the push switches 414 to 417 are inputted to terminals D1 to D4, and an operating state of the rotary switch 418 (the rotary switch 418 has eight contacts and an output of this rotary switch is decoded to three bits) is inputted to terminals D5 to D7, and an output of the ID code generating circuit 420 is inputted to terminals D8 to D10. Accordingly, these information are outputted in a sequence of FIG. 32 in this period. In this embodiment, no battery voltage information is used. When the voltage level of the signal SEL becomes high, an output signal of the multiplexer 424 is again switched to a signal of the coordinate detecting portion so that a counter for selecting an output of the multiplexer 425 is reset.

The output selecting circuit 419 outputs the coordinate detecting signal in the coordinate detecting period and operating states of the respective pen switches in the additional information detecting period as shown in FIG. 31(d) by the above-mentioned operation. The ID code generating circuit 420 in this embodiment is constructed by three switches or a rotary switch having eight contacts. This ID code generating circuit 420 generates any one of codes 0 to 7 by setting each of these switches in advance.

FIG. 35 is a view showing a second embodiment of the detecting pen of a cordless system. In FIG. 35, reference numerals 426, 427, 428 and 429 respectively designate a battery, a power circuit, a signal transmitting-receiving unit and a power switch. Other constructional portions each performing the same operation as FIG. 33 are designated by the same reference numerals.

The detecting pen and an apparatus body are not connected to each other through a cable. The signal transmitting-receiving unit 428 built in the detecting pen and the signal transmitting-receiving unit 408 of a tablet body communicate with each other by a radio, an infrared ray, etc. No circuit power is supplied to the detecting pen from the apparatus body. Accordingly, the battery 426, the power circuit 427 and the power switch 429 are built in the detecting pen itself. The power circuit 427 supplies a stabilized power voltage to an electric circuit of the detecting pen. The power circuit 427 also detects a voltage of the battery 426 and transmits this detected voltage to terminals D11 to D13 of an output selecting circuit 419 as data of three bits. Accordingly, a format of additional information is provided as shown in FIG. 32. In this embodiment, no switch for setting an ID code of the detecting pen is arranged as in the first embodiment shown in FIG. 33 and the ID code can be set by a specifying operation of another switch.

Figure 36:
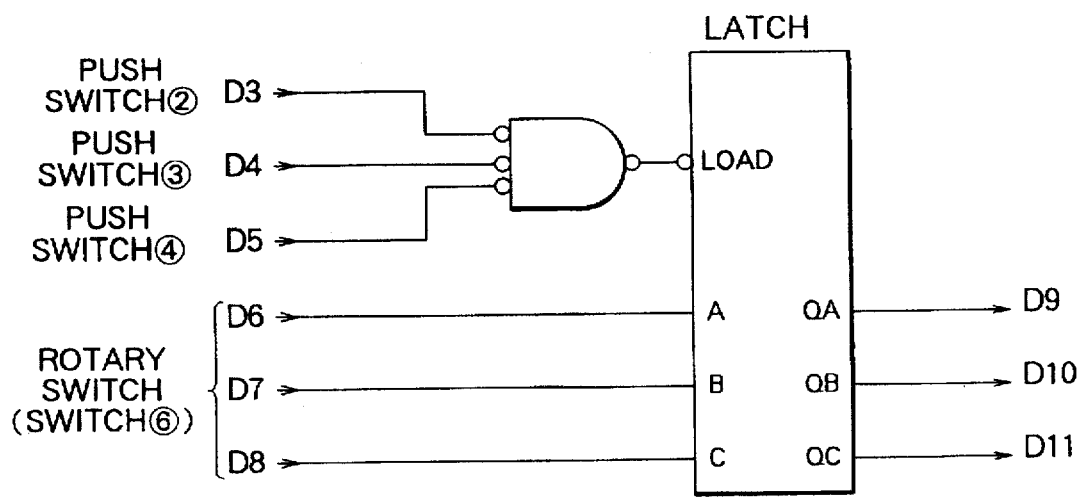
FIG. 36 is a detailed view of an ID code generating circuit of the detecting pen shown in FIG. 35.

FIG. 36 is a detailed view of an ID code generating circuit shown in FIG. 35. FIG. 36 shows a latch circuit backed up by the battery. When a value to be registered as the ID code is set in a rotary switch 418 and all push switches 415 to 417 are simultaneously pushed, the set value of the rotary switch 418 is latched as the ID code. This value is backed up at any time by the built-in battery of the detecting pen.

Figure 37:
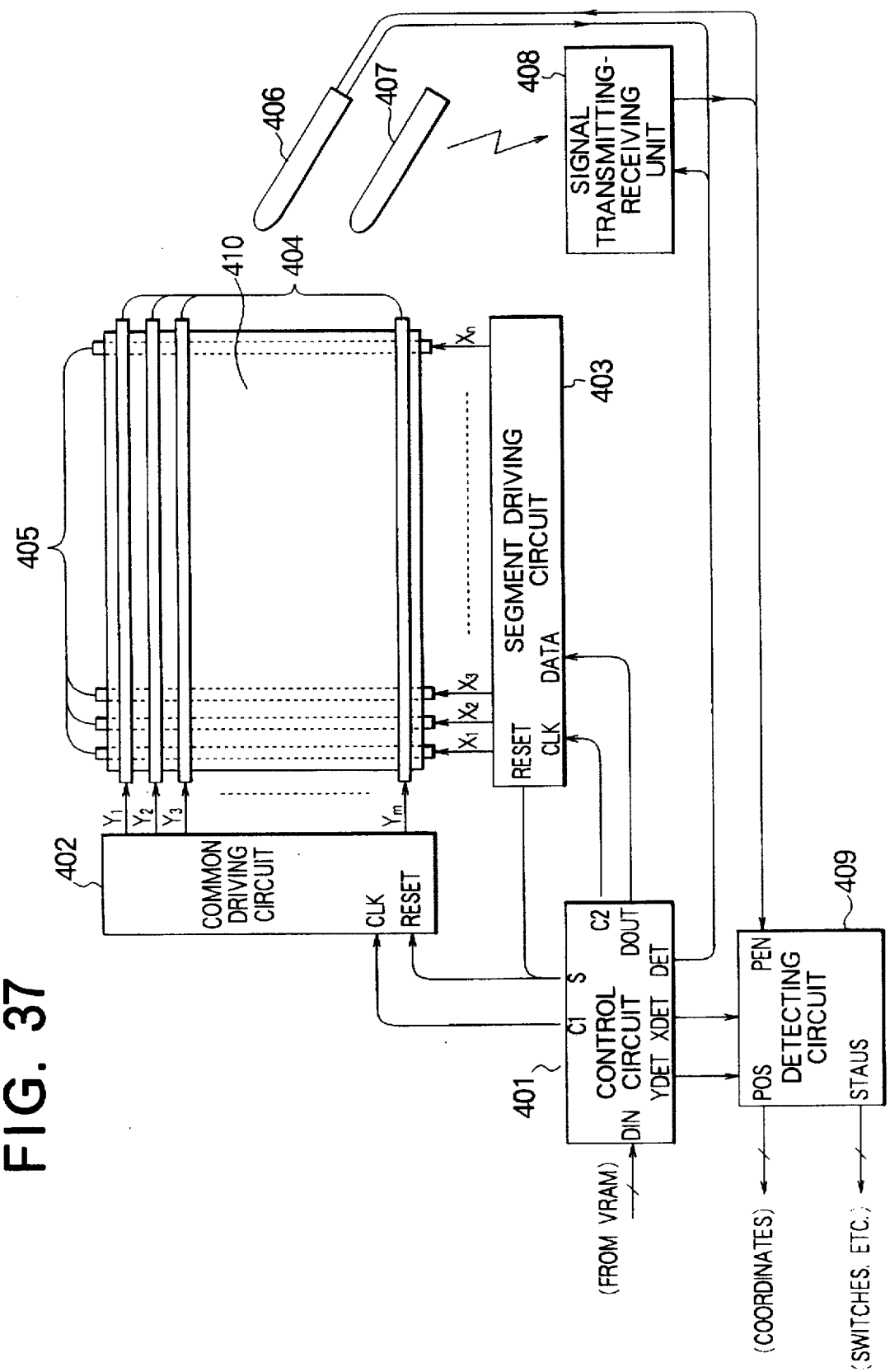
FIG. 37 is a view for explaining the construction of a coordinate inputting apparatus in accordance with another embodiment of the present invention.

FIG. 37 is a view for explaining the construction of a coordinate inputting apparatus in accordance with another embodiment of the present invention. FIG. 37 shows one example of a liquid crystal display (LCD) which also functions as an electrostatic induction type tablet. In FIG. 37, reference numeral 410 designates a liquid crystal panel. Other constructional portions each performing the same operation as FIG. 30 are designated by the same reference numerals.

Electrodes 404 and 405 are used to detect coordinates and operate the liquid crystal panel 410. A control circuit 401 generates timings of the coordinate detection and display and transfers data of an unillustrated video RAM to a segment driving circuit 403 in a display period. Polarities of signals transmitted to the electrodes 404 and 405 are periodically inverted to prevent a liquid crystal from being deteriorated by electrolysis although this construction is not illustrated in FIG. 37. In this embodiment, the same detecting pen as the first embodiment shown in FIG. 33 is used.

Figure 38:
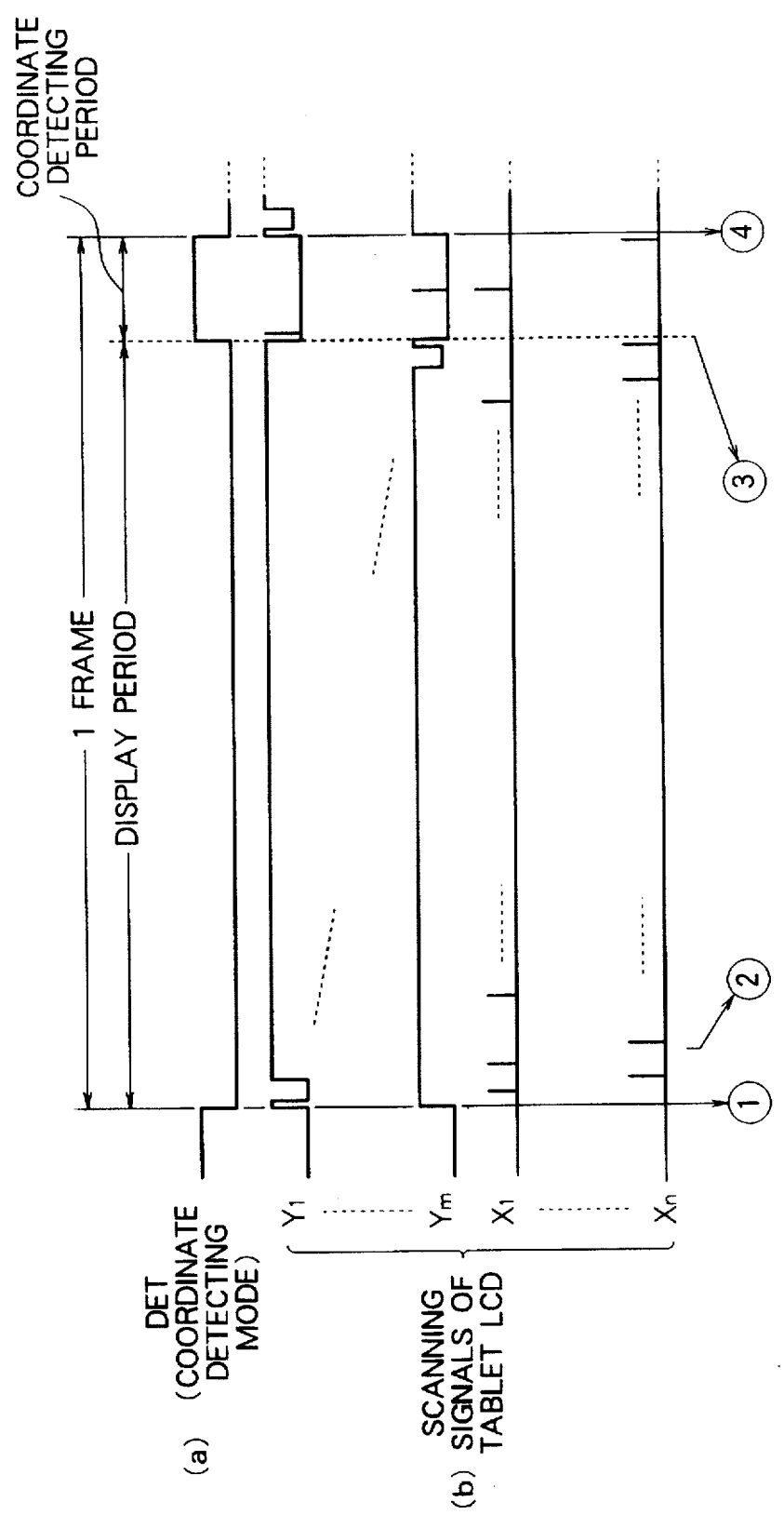
FIG. 38 is a first view showing operating timings of signals in the coordinate inputting apparatus shown in FIG. 37.
Figure 39:
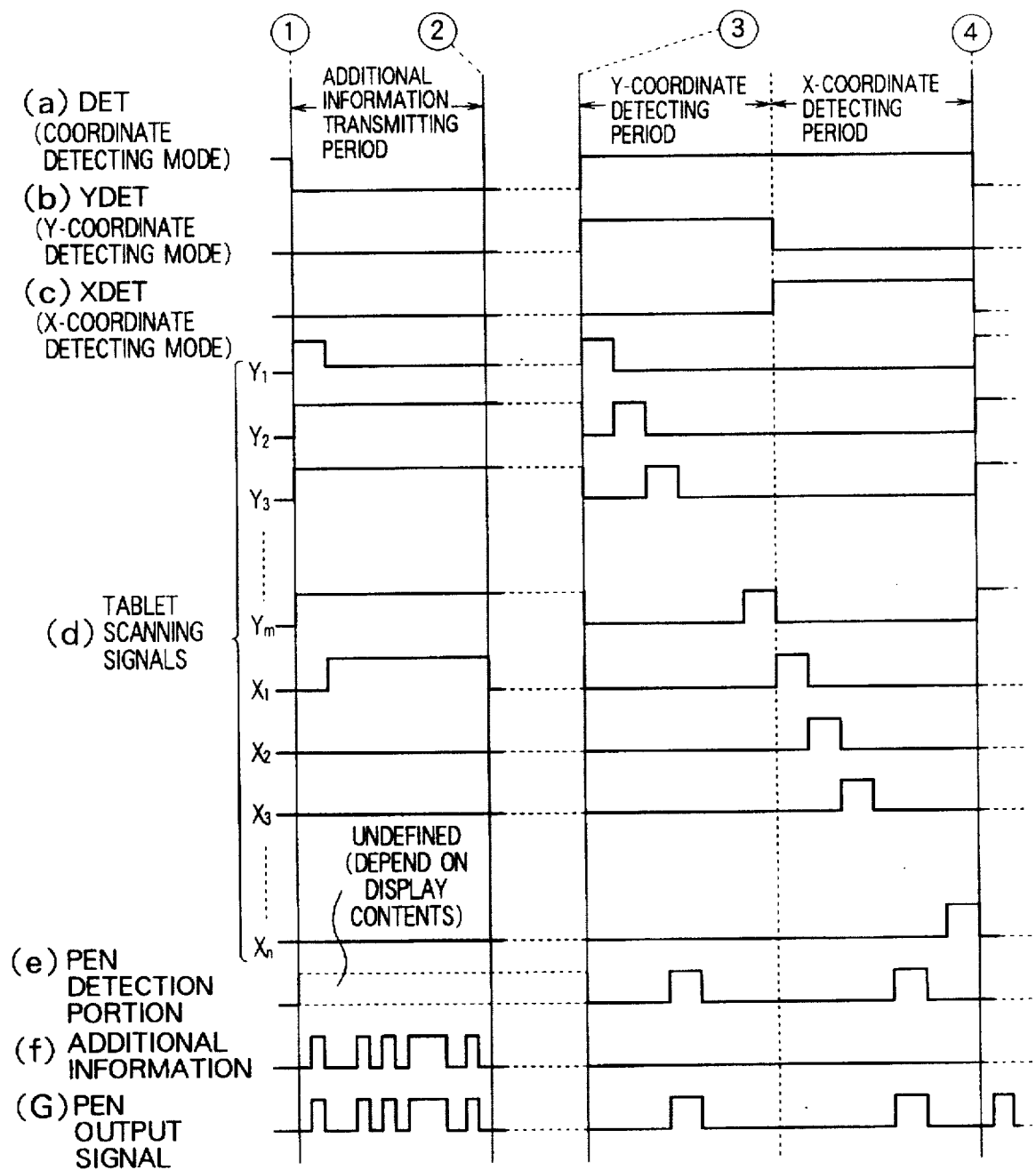
FIG. 39 is a second view showing operating timings of signals in the coordinate inputting apparatus shown in FIG. 37.

FIGS. 38 and 39 are views showing operating timings of the coordinate inputting apparatus shown in FIG. 37.

As shown in FIG. 38, one cycle of a systematic operation of the coordinate inputting apparatus is shown as one frame and is composed of a display period and a coordinate detecting period. The display period is also an additional information transmitting period. The coordinate detecting period is divided into a Y-coordinate detecting period and an X-coordinate detecting period. The control circuit 401 controls the systematic operation by outputting a signal YDET (shown in FIG. 39(b)) for prescribing the Y-coordinate detecting period, a signal XDET (shown in FIG. 39(c)) for prescribing the X-coordinate detecting period and a signal DET (shown in FIG. 39(a)) for prescribing the entire coordinate detecting period.

The control circuit 401 sequentially scans common electrodes Y1 to Ym in the display period and sequentially scans segment electrodes X1 to Xn in a period in which each of the common electrodes is turned on. Only a segment electrode corresponding to a pixel turning on the liquid crystal on the basis of data of the video RAM is turned on with respect to the segment electrodes. Operating timing of the coordinate inputting apparatus in the coordinate detecting period is equal to that in the first embodiment shown in FIG. 33.

An output signal of the detecting pen is switched to a coordinate signal when a signal DET shown in FIG. 39(a) has a high voltage. In contrast to this, this output signal of the detecting pen is switched to additional information as shown in FIG. 39(f) when the signal DET has a low voltage. A detecting circuit 409 obtains a Y-coordinate from a time from rise of a signal YDET to rise of a pen signal and obtains an X-coordinate from a time from rise of a signal XDET to rise of the pen signal. The detecting circuit 409 also interprets the pen signal from fall of the signal DET as additional information. The additional information is repeatedly outputted during the display period in which the signal DET has a low voltage. However, the detecting circuit 409 uses only first additional information of the repeated outputs.

In reality, polarities of a scanning signal (shown in FIG. 39(d)) of a tablet electrode are periodically inverted in at least the display period to prevent the liquid crystal from being deteriorated by electrolysis by applying a direct electric current to the liquid crystal. However, a mechanism for inverting these signal polarities is omitted in FIG. 39.

As mentioned above, in a signal transmitting system of a coordinate inputting apparatus in the present invention, information of operating states of switches arranged in a detecting pen are transmitted by time division on a single signal line without increasing the number of signal lines. The signal transmitting system has a period for detecting a coordinate indicated by the detecting pen and transmitting information showing this coordinate. The signal transmitting system also has a period for transmitting information of turning-on and turning-off states of the pen switches. These periods are repeatedly alternated with each other. A display period and a coordinate detecting period are set in an operating cycle of the coordinate inputting apparatus which also functions as a display unit. Accordingly, the display period is allocated to a signal transmitting period in a pen switching state.

A plurality of pen switches can be arranged in the coordinate inputting apparatus. Operating states of the pen switches are sequentially transmitted in synchronization with an internal clock of the detecting pen in the signal transmitting period in switching states. Further, the detecting pen can have various kinds of additional information except for the operating states of the pen switches and these additional information can be also transmitted in this signal transmitting period. In the above embodiments of the present invention, each of plural detecting pens has information of an ID code so as to discriminate the plural detecting pens from each other.

When the detecting pen of a cordless system is used, an independent power source is required in the detecting pen. When a low battery warning of a built-in battery of the detecting pen is displayed on a display screen, a missing possibility of this warning by a user is low in comparison with a case in which this warning is displayed by the detecting pen itself. In the present invention, various kinds of additional information except for the operating states of the pen switches can be transmitted. Therefore, information with respect to a battery voltage is transmitted to a body of the signal transmitting system so that the low battery warning can be displayed on the display screen.

As clearly seen from the above explanation, the following effects can be obtained in the signal transmitting system of the present invention.

(1) Effects corresponding to the first construction of the signal transmitting system are as follows.

Many additional information except for coordinate information are transmitted to a body of the coordinate inputting apparatus from the detecting pen so that an additional value of the coordinate inputting apparatus can be increased and problems caused by an increase in the number of signals can be avoided.

Many switches variously applicable in applications can be arranged as a merit by transmitting many additional information. For example, changes in color and thickness of a drawn line, switching of writing (posting) and erasing modes, etc. are considered as uses of these switches. The size of a working screen can be increased by manually operating the pen switches in comparison with an icon selecting system. Further, it is not necessary to perform a complicated operation in which the detecting pen is moved until an icon region in functional selection and is again returned to a working region after an icon is selected. The detecting pen can have various information sources except for the pen switches and can transmit these information sources to the signal transmitting system. Such a construction is realized in second and third constructions of the signal transmitting system.

The following problems can be solved by avoiding an increase in the number of signals. Namely, the number of cores of a connecting cable of the detecting pen is reduced in the case of a wire system so that cost of the coordinate inputting apparatus can be reduced. Further, no operability of the detecting pen is badly influenced since it is not necessary to thicken the connecting cable. In the case of a cordless system, the number of signal transmitting channels is small so that cost of the coordinate inputting apparatus is reduced.

(2) Effects corresponding to the second construction of the signal transmitting system are as follows.

The same effects as the first construction can be obtained. Further, it is possible to solve problems about reductions in display contrast and follow-up property of coordinate detection since no scanning period is lengthened by transmitting additional information.

(3) Effects corresponding to the third construction of the signal transmitting system are as follows.

A means for discriminating the possessor of a detecting pen by an ID code of this detecting pen can be provided. Each of users of the signal transmitting system has a dedicated detecting pen and uses this detecting pen by connecting this detecting pen to the signal transmitting system. The signal transmitting system discriminates the pen possessors from each other by the ID code of the used detecting pen and can provide services according to the respective users. For example, parallax data of each of users registered to the signal transmitting system are called out and a parallax is automatically corrected. Thus, it is not necessary to recorrect the parallax every time the users of the signal transmitting system are changed.

Further, plural pens can have functions different from each other. This case is particularly suitable for a detecting pen of a cordless system. The signal transmitting system discriminates a used pen by the ID code and switches colors, thicknesses, writing (posting) and erasing by the used pen. Thus, each of the users can obtain an operating sense as if each of the users separately uses plural pens having different tip thicknesses and colors. Accordingly, preferable operability of each of the detecting pens can be expected in comparison with a functional selecting system using pen switches in a certain case.

(4) Effects corresponding to the fourth solving means are as follows.

A warning of battery consumption of a detecting pen can be displayed on a display screen. When this warning is displayed on the display screen, a missing possibility of the warning is low in comparison with a system in which an indicator for giving the warning is arranged in the detecting pen.

Many, widely different embodiments of the present invention may be constructed without departing from the spirit and scope of the present invention. It should be understood that the present invention is not limited to the specific embodiments described in the specification, except as defined in the appended claims.

What is claimed is:

1. A coordinate inputting apparatus comprising:

liquid crystal panel having a liquid crystal layer interposed between plural segment electrodes and plural common electrodes, said plural segment electrodes and plural common electrodes arranged perpendicular to each other;

a position indicator electrostatically coupled to said segment electrodes and said common electrodes in an indicated position for outputting a position information signal on a first signal line;

a switch arranged in the vicinity of an end tip of said position indicator and turned on and off by making the switch come in contact with said liquid crystal panel and separating this switch from said liquid crystal panel for outputting a signal indicating the state of said switch on said first signal line supplying power for said position indicator and said switch;

coordinate detector for detecting coordinates in said indicated position on the basis of an induced voltage induced in said position indicator and application timing of a scanning voltage applied to said segment electrodes and said common electrodes, including a separating circuit for separating each of said position information signal and said signal indicating the state of said switch from said first signal line; and a cable for connecting said position indicator with said coordinate detector including signal lines of said first signal line and a second signal line connected to the ground.

2. A pen inputting apparatus comprising:

a liquid crystal panel constructed by a liquid crystal and an electrode for operating this liquid crystal;

a detecting pen having an end tip electrode electrostatically coupled to the electrode of said liquid crystal panel and detecting an induced voltage induced at each of rising and falling times of a signal for operating the liquid crystal;

an inverting signal generator for operating the liquid crystal of said liquid crystal panel and generating an inverting signal for inverting applying directions of a voltage applied to the liquid crystal;

a gate signal generator for generating a first gate signal synchronized with each of rise and fall of said inverting signal and a second gate signal provided except for a transmitting time of this first gate signal;

a first sampling processor for sampling the induced voltage induced in the end tip electrode of said detecting pen by the first gate signal and converting this induced voltage to a first direct current voltage in response to the rising and falling of said inverting signal;

a second sampling processor for sampling an induced voltage induced after the sampling of the first sampling processor by the second gate signal and converting this induced voltage to a second direct current voltage;

a judging circuit for judging whether or not an end tip of said detecting pen approaches a display screen of said liquid crystal panel on the basis of level difference between said first and second direct current voltages and outputting results of this judgment as a detecting mode/nondetecting mode signal; and a duty ratio control circuit for controlling a duty ratio of the first and second gate signals generated by said gate signal generator and for controlling sampling times of the gate signals supplied to the first and second sampling processors by controlling the duty ratio of the first and second gate signals, and adjusting the levels of the first and second direct current voltages so that the judging circuit stably outputs the detecting mode/nondetecting mode signal.

3. A pen inputting apparatus as claimed in claim 2, wherein the duty ratio control circuit has a duty ratio setting circuit for setting said duty ratio by numeric value data.

4. A pen inputting apparatus as claimed in claim 2 or 3, wherein the pen inputting apparatus further comprises an automatic setting functional key for indicating an automatic setting function of said duty ratio;

said duty ratio control circuit controls an operation of said gate signal generator such that the duty ratio of said gate signal is sequentially changed from predetermined numeric value data when the automatic setting function is indicated by said automatic function key and said detecting pen approaches a predetermined region on the display screen of said liquid crystal panel;

said duty ratio control circuit also detects the duty ratio of the gate signals when the judging circuit outputs the detected mode signal; and said duty ratio control circuit further controls said gate signals with numeric value data of this detected duty ratio as initial set data.

5. A tablet inputting apparatus comprising:

an input pen having a pen shaft, a main electrode attached to the pen shaft and an auxiliary electrode attached to the pen body so that the relative position of the auxiliary electrode with respect to the main electrode will change in response to a writing pressure such that an electrostatic capacity between the auxiliary electrode and a tablet can be changed in accordance with the writing pressure, and for outputting a first signal representing an electrostatic capacity between the main electrode and the tablet, and a second signal representing the electrostatic capacity between the auxiliary electrode and the tablet;

the tablet for sliding the input pen along a surface thereof;

a first detector for detecting a change in the second signal caused by the writing pressure; and a second detector for detecting a time difference between peaks of the first and second signals representing an inclination of the pen.

6. A tablet inputting apparatus as claimed in claim 5, wherein the auxiliary electrode is formed in a ring shape having a hollow portion and the main electrode is inserted into the hollow portion of the auxiliary electrode through an insulator.

* * * * *

UNITED STATES PATENT AND TRADEMARK OFFICE
CERTIFICATE OF CORRECTION

PATENT NO. : 5,736,980
DATED : April 7, 1998
INVENTOR(S) : Shigeki Iguchi; Katsumi Hirano; Tomohiko Nishimura; Kunio Hiromoto and Kazuyoshi Nomiya It is certified that error appears in the above-indentified patent and that said Letters Patent is hereby corrected as shown below:

Drawing Figures 1-13 should be labeled as --PRIOR ART--.

Signed and Sealed this

Eighteenth Day of August, 1998

Attest:

BRUCE LEHMAN

Attesting Officer

Commissioner of Patents and Trademarks